(12) United States Patent
Lakic et al.

(10) Patent No.: US 11,962,177 B1
(45) Date of Patent: *Apr. 16, 2024

(54) CHARGING SYSTEM FOR PORTABLE ELECTRONIC DEVICES

(71) Applicant: Pioneer Square Brands, Inc., High Point, NC (US)

(72) Inventors: Nemanja Lakic, Greensboro, NC (US); Vrushank Deepak Balutkar, Jamestown, NC (US)

(73) Assignee: Pioneer Square Brands, Inc., High Point, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/506,991

(22) Filed: Nov. 10, 2023

(51) Int. Cl.
*H02J 7/00* (2006.01)

(52) U.S. Cl.
CPC ................................ *H02J 7/0044* (2013.01)

(58) Field of Classification Search
CPC ...... H01R 33/74; H01R 33/76; H01R 13/516; H01R 13/518; H02J 7/0042; H02J 7/0044; H02J 7/0045
USPC ...................................................... 439/38–40
See application file for complete search history.

(56) References Cited

U.S. PATENT DOCUMENTS

| | | | | |
|---|---|---|---|---|
| 6,014,011 A | * | 1/2000 | DeFelice | H02J 7/0036 320/114 |
| D506,972 S | * | 7/2005 | Parel | D13/107 |
| 7,541,774 B2 | * | 6/2009 | Zedell | H02J 7/0045 320/112 |
| 8,575,887 B1 | * | 11/2013 | Pomare | H02J 7/0044 320/101 |
| 11,769,976 B1 | | 9/2023 | Lakic et al. | |
| D1,008,171 S | * | 12/2023 | Haskins | D13/107 |
| 11,855,397 B1 | * | 12/2023 | Lynch | H01R 12/91 |
| 2009/0284216 A1 | * | 11/2009 | Bessa | H02J 7/0044 320/101 |
| 2015/0288215 A1 | * | 10/2015 | Zhang | G06F 1/1632 320/108 |
| 2021/0045510 A1 | * | 2/2021 | Okada | B65D 81/22 |
| 2021/0242695 A1 | * | 8/2021 | Zadehsoltan | H02J 50/80 |

* cited by examiner

Primary Examiner — Khiem M Nguyen
(74) Attorney, Agent, or Firm — Grandview Law

(57) ABSTRACT

A system for a portable electronic computing device includes a housing assembly including an elongated base assembly including first and second side assemblies extending along an elongated dimension and a plurality of container assemblies each including first and second sides couplable with the first and second side assemblies of the housing assembly, respectively. In addition, other aspects are described in the claims, drawings, and text forming a part of the present disclosure.

17 Claims, 56 Drawing Sheets

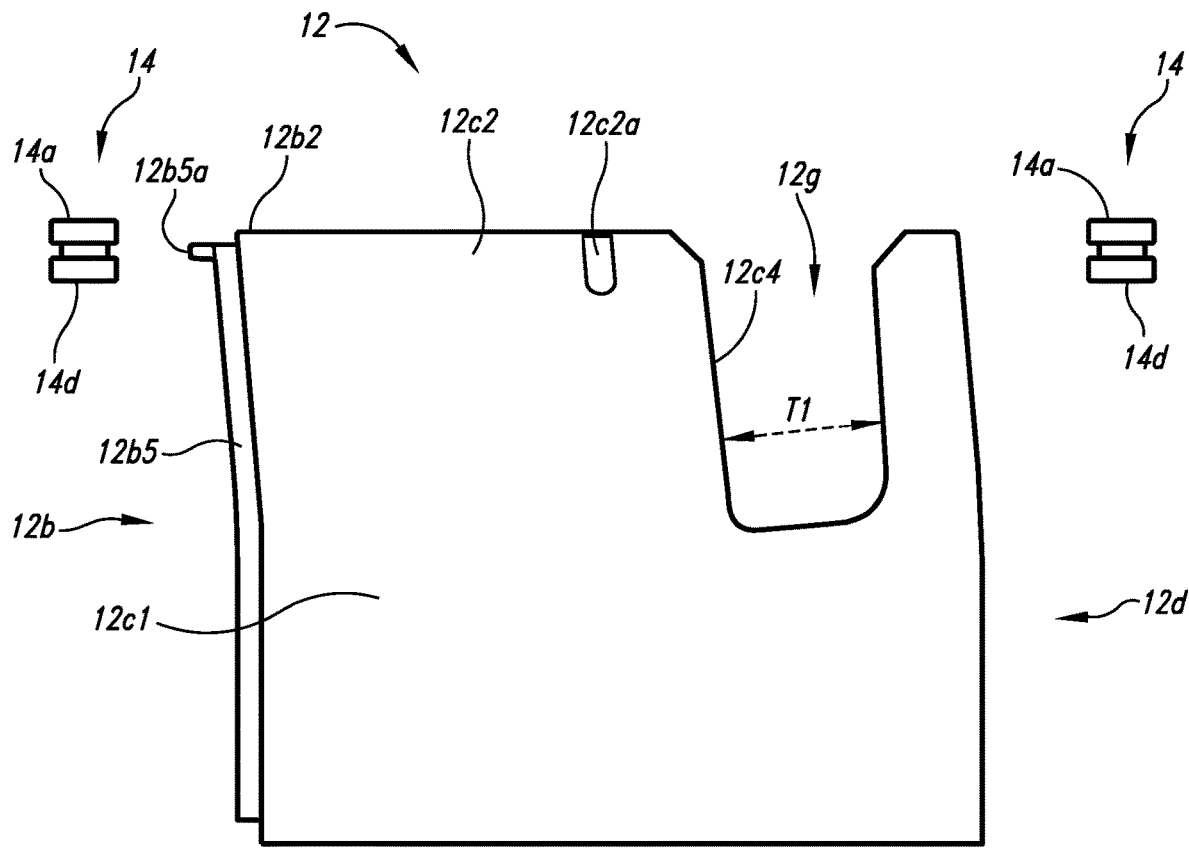
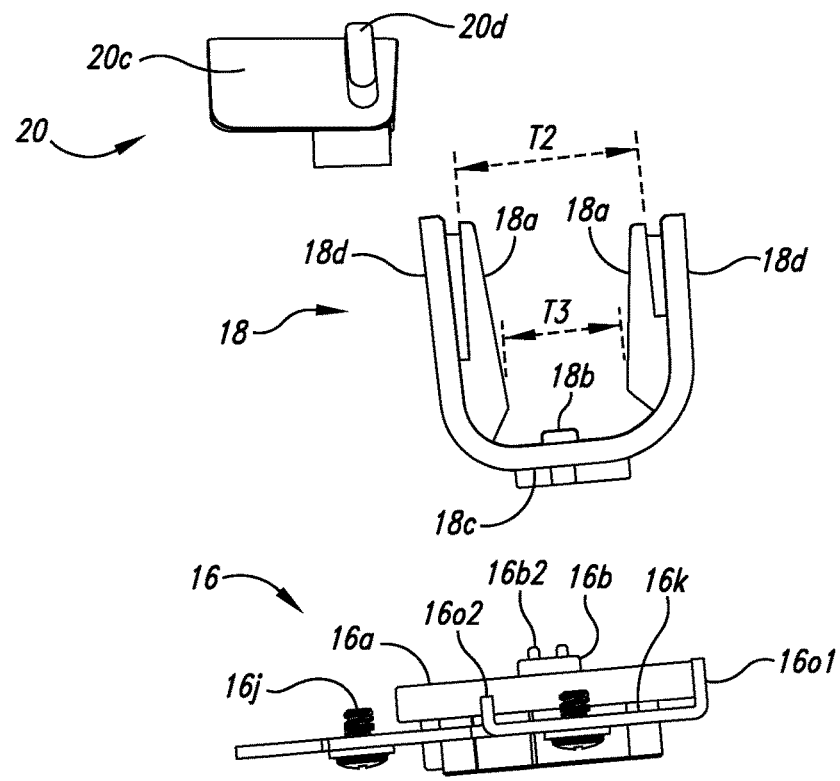
Fig. 4

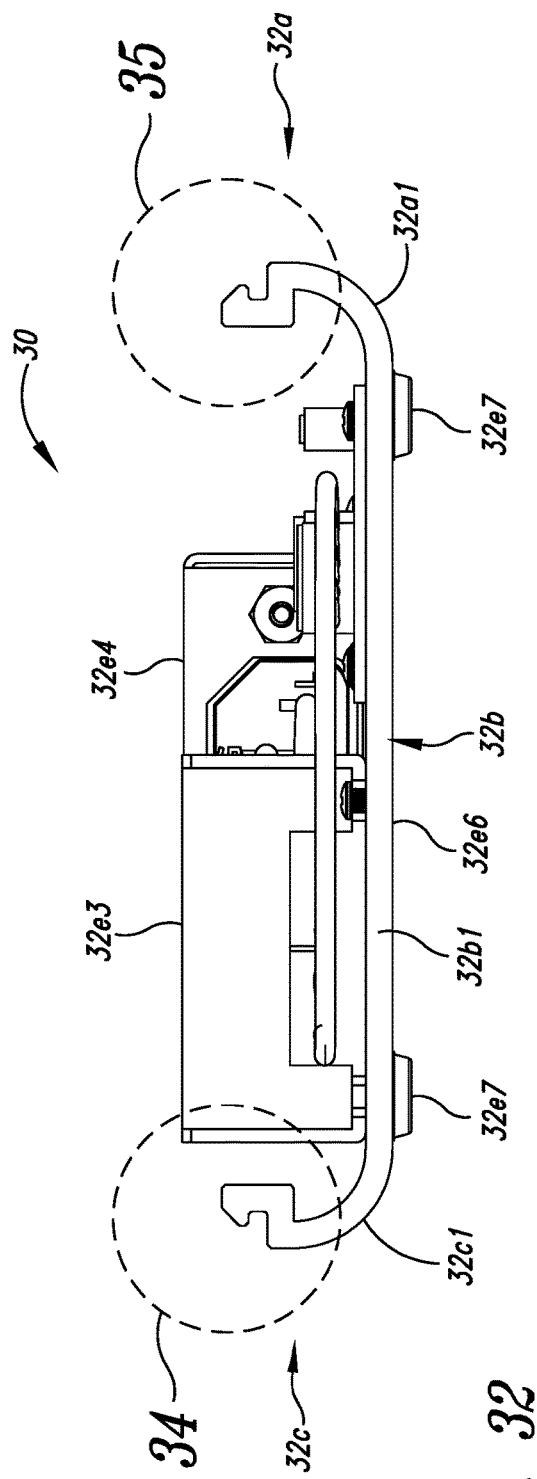
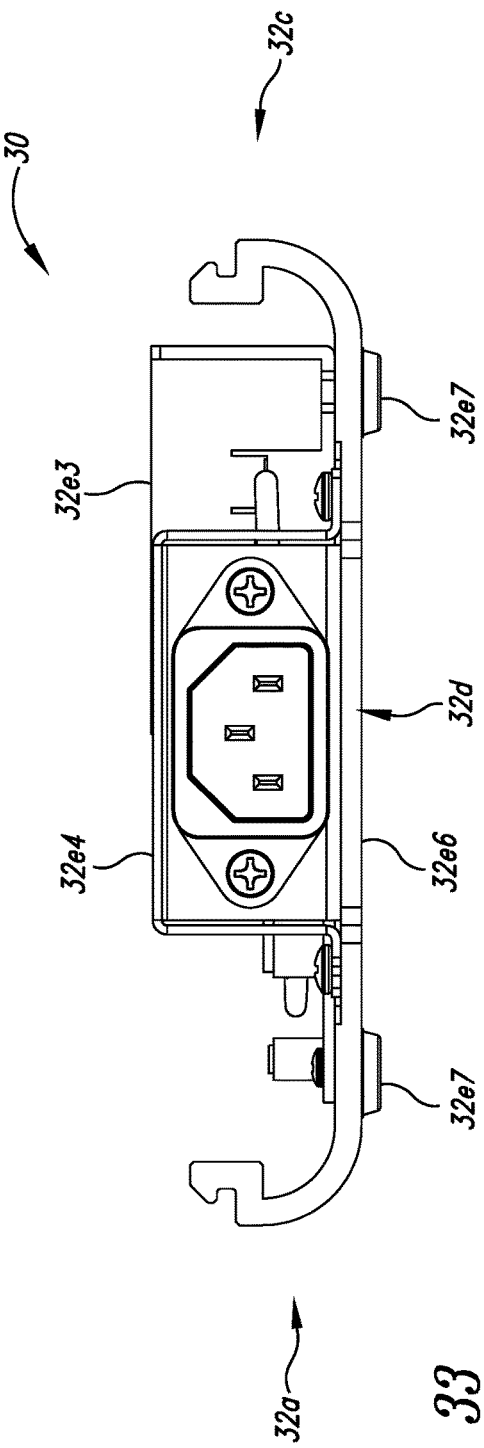
Fig. 32
Fig. 33

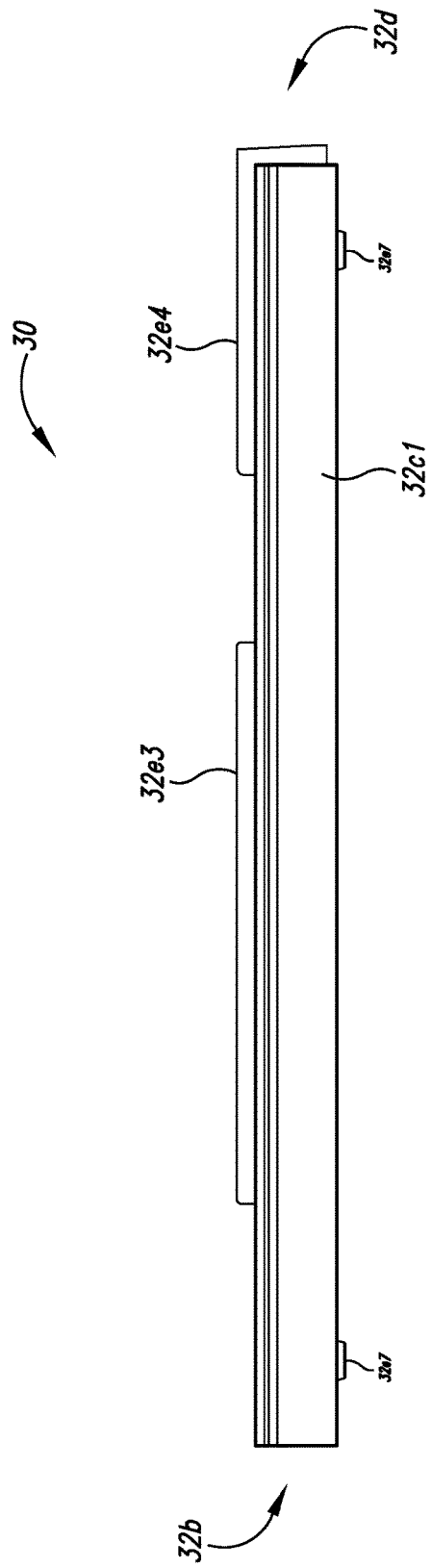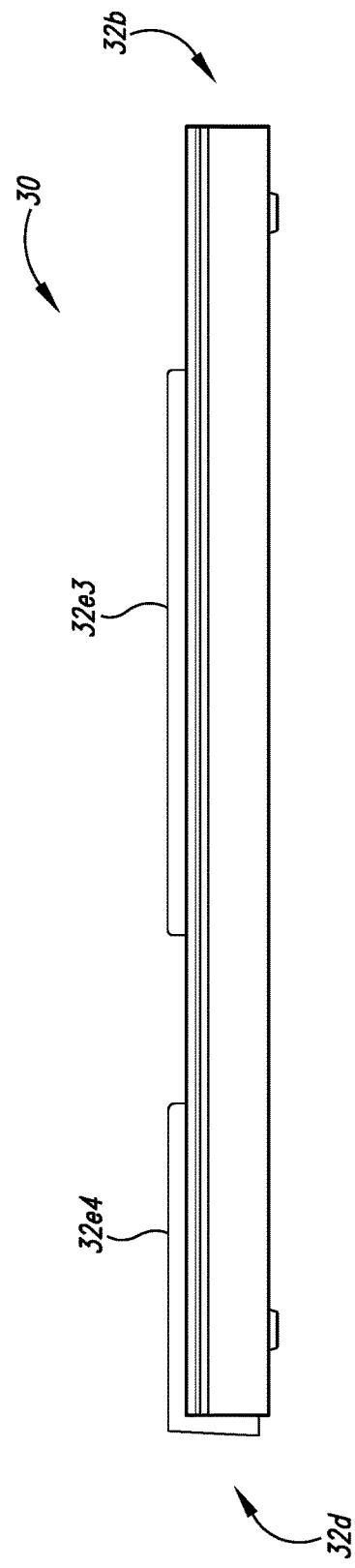

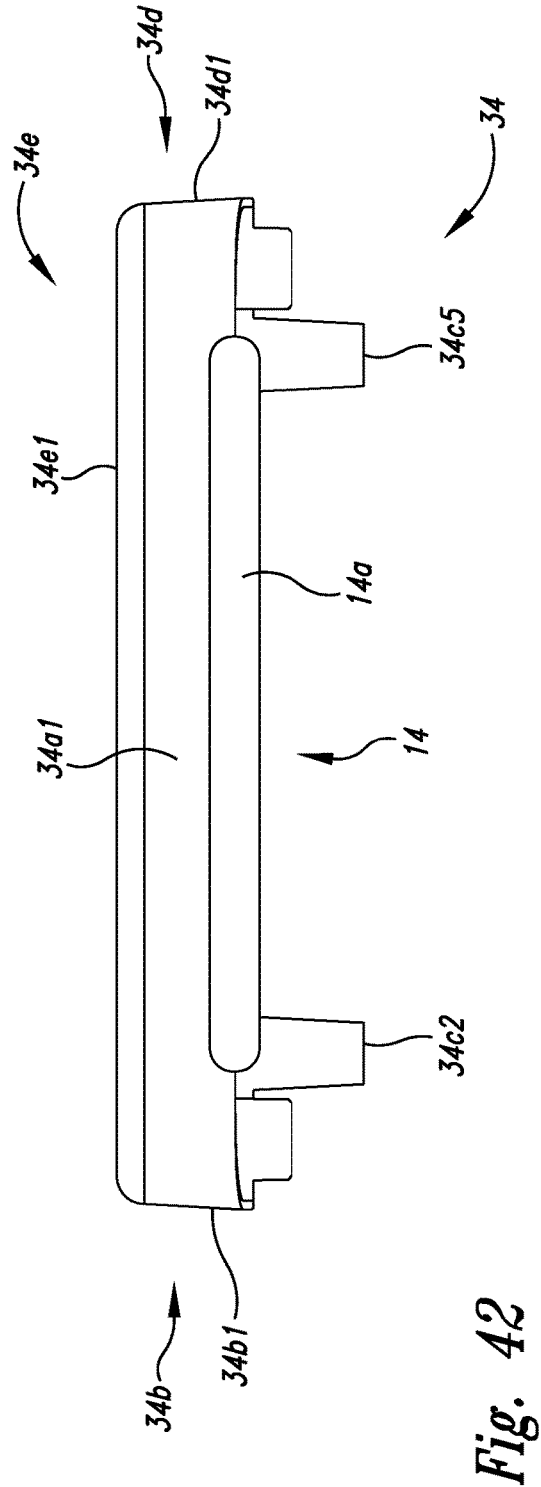
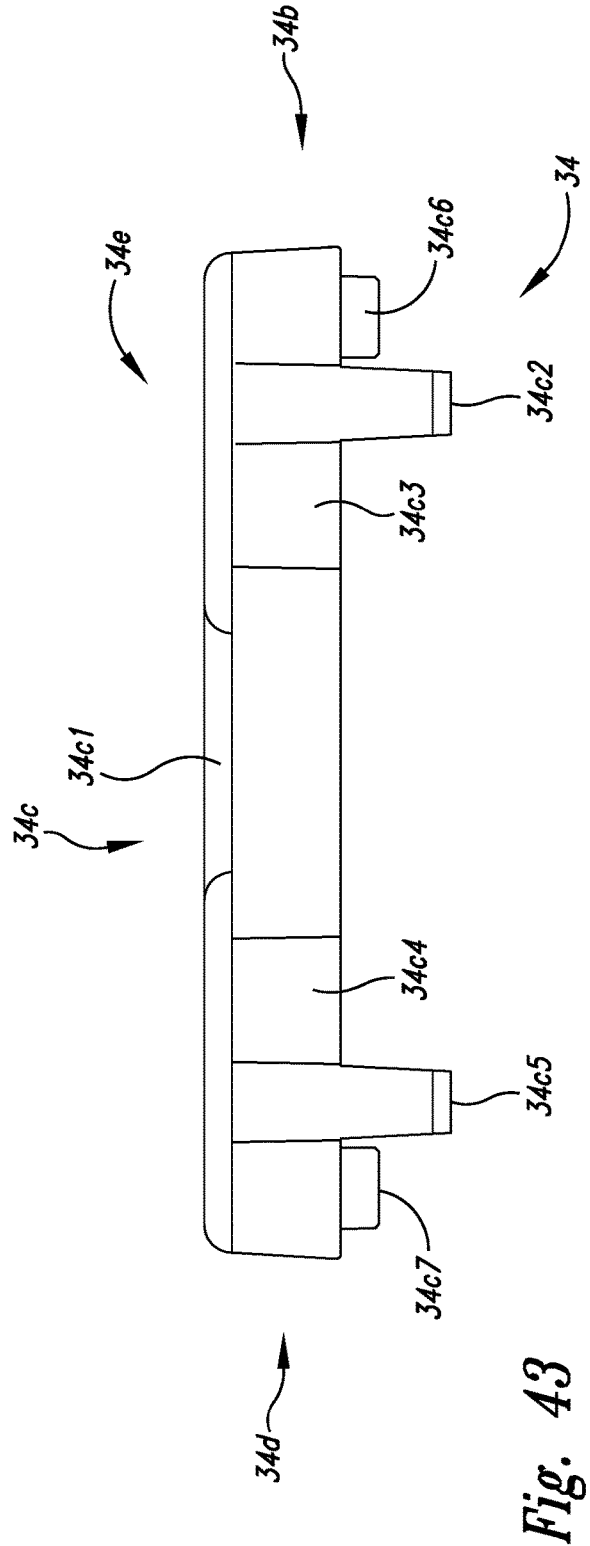
Fig. 42
Fig. 43

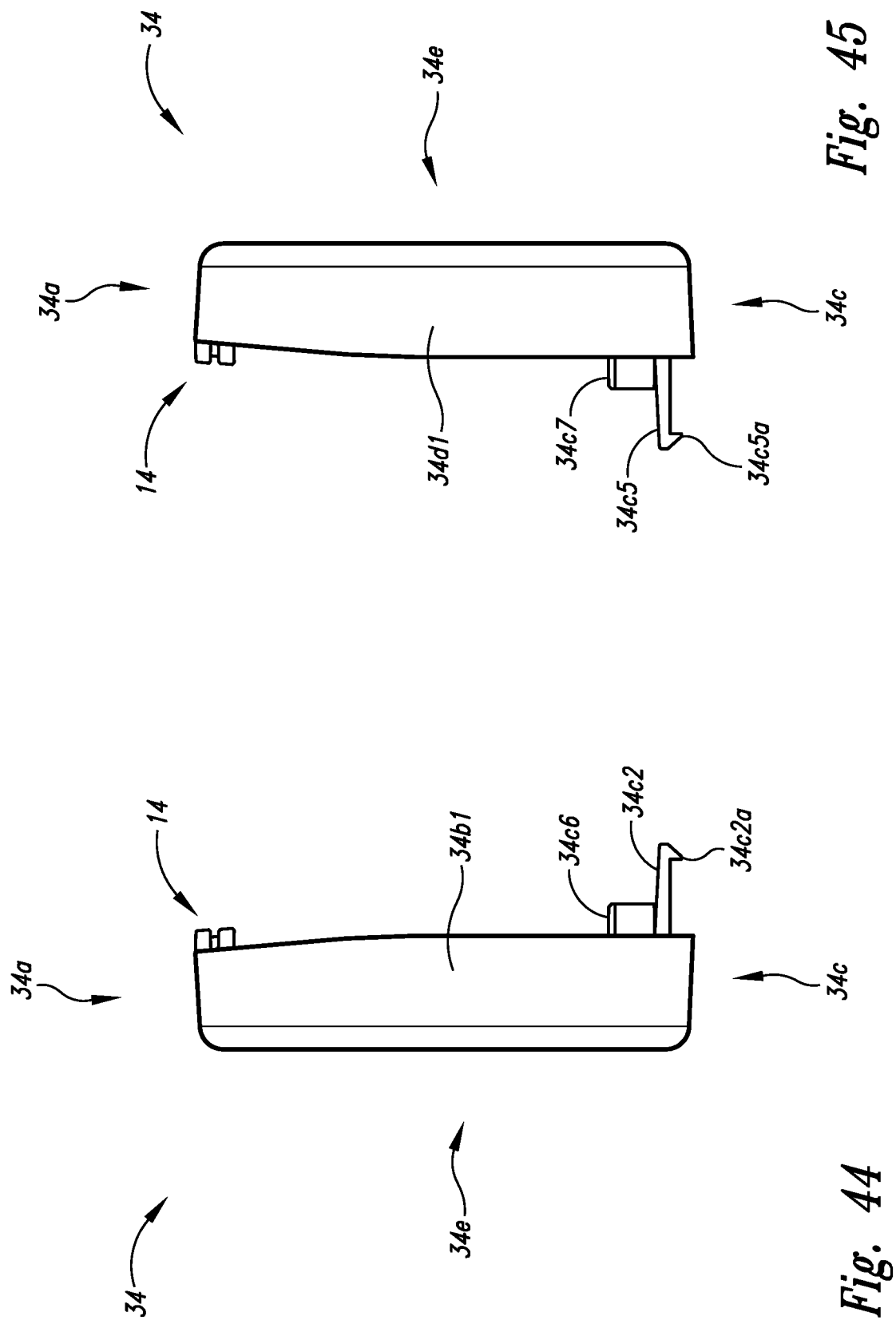

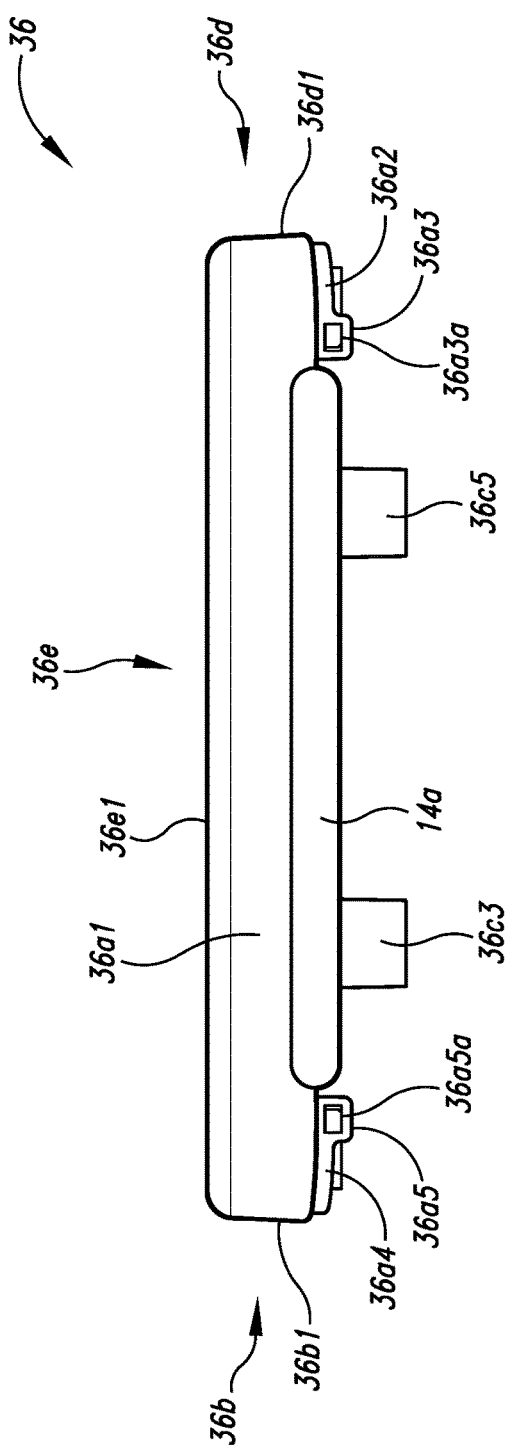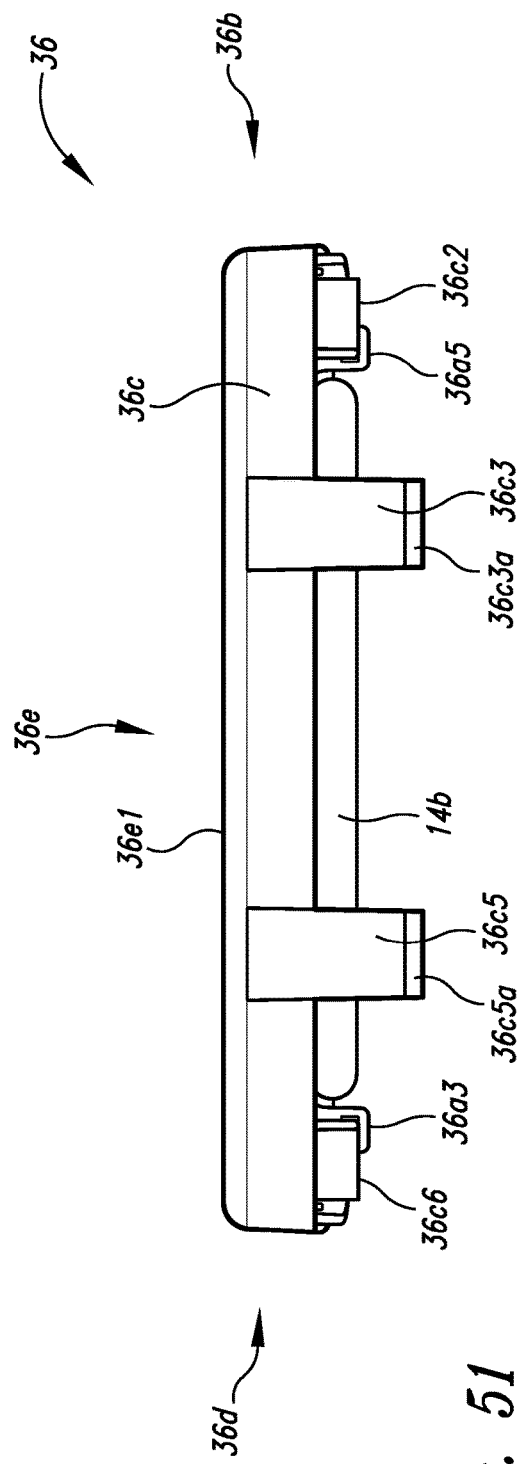

CHARGING SYSTEM FOR PORTABLE ELECTRONIC DEVICES

SUMMARY

In one or more aspects a system for a portable electronic computing device including (I) at least one housing assembly including (A) an elongated base assembly with an elongated dimension, the elongated base assembly including (i) a first end, (ii) a second end, (iii) a first side assembly extending along the elongated dimension between the first end and the second end, (iv) a second side assembly extending along the elongated dimension between the first end and the second end, and (v) a base including an interior, (a) wherein the interior extends between the first and the second end, and (b) wherein the interior extends between the first side assembly and the second side assembly, wherein the first side assembly includes a first portion extending perpendicularly with respect to the interior of the base, the first portion extending along the elongated dimension of the base assembly, wherein the first portion of the first side assembly includes an externally facing groove extending along the longitudinal dimension of the base assembly, wherein the second side assembly includes a first portion extending perpendicularly with respect to the interior of the base, the first portion extending along the elongated dimension of the base assembly, and wherein the first portion of the second side includes an externally facing groove extending along the longitudinal dimension of the base assembly. Wherein in the first side assembly includes a curvilinear portion extending from the base, and wherein in the second side assembly includes a curvilinear portion extending from the base. Wherein the first side assembly includes a beveled edge coupled with the curvilinear portion of the first side assembly, and wherein in the second side assembly includes a beveled edge coupled with the curvilinear portion of the second side assembly. Wherein the first side assembly includes a beveled edge coupled with the curvilinear portion of the first side assembly, and wherein in the second side assembly includes a beveled edge coupled with the curvilinear portion of the second side assembly. Wherein the at least one housing assembly further includes at least one end plate couplable with the first side assembly, the second side assembly, and the base of the elongated base assembly. Wherein the at least one end plate includes an interior and at least one arm extending from the interior. Wherein the at least one arm includes at least one barb. Wherein the base of the base assembly includes at least one aperture sized and positioned to receive the least one barb of the at least one end plate when the at least one end plate is coupled with the base. Wherein the at least one end plate includes at least a first horizontal ledge and a second horizontal ledge. Wherein the first horizontal ledge is sized, shaped, and positioned to couple with the first side assembly when the at least one end plate is coupled with the base assembly, and wherein the second horizontal ledge is sized, shaped, and positioned to couple with the second side assembly when the end plate is coupled with the base assembly. Wherein the at least one clip assembly includes an upper portion including a first side edge and second side edge, wherein the at least one clip assembly includes a lower portion including a first side edge and second side edge, wherein the at least one clip assembly includes a plurality of beams extending between the upper portion and the lower portion, wherein the plurality of beams includes a plurality of first notches and a plurality of second notches, wherein the at least one clip assembly includes a first side and a second side, wherein the first side of the at least one clip assembly includes the first side edge of the upper portion, the first side edge of the lower portion, and the plurality of first notches, wherein the second side of the at least one clip assembly includes the second side edge of the upper portion, the second side edge of the lower portion, and the plurality of second notches, and wherein the at least one end plate assembly includes a side exterior including a portion sized and shaped to couple with the first side of the least one clip assembly. Wherein further including at least one container assembly, wherein the at least one container assembly includes at least one side exterior including at least one edge portion, wherein the at least one end plate assembly includes a side exterior including at least one groove, and wherein the at least one edge portion of the at least one container assembly and the at least one groove portion of the at least one end plate assembly so shaped, sized, and positioned in order for the at least one edge portion of the at least one container assembly to couple with the at least one groove portion of the at least one end plate assembly. Wherein further including at least one container assembly, wherein the at least one end plate assembly includes at least one side exterior including at least one edge portion, wherein the at least one container assembly includes a side exterior including at least one groove, and wherein the at least one edge portion of the at least one end plate assembly and the at least one groove portion of the at least one container assembly are so shaped, sized, and positioned in order for the at least one groove portion of the at least one container assembly to couple with the at least one edge portion of the at least one end plate assembly. Wherein further including at least one container assembly, wherein in the at least one container assembly includes a first side, a second side, at least one first elongated engagement member, and at least one second elongated engagement member, wherein the at least one first elongated engagement member is protruding from the first side, wherein the at least one second elongated engagement member is protruding from the second side, wherein the at least one first elongated engagement member is couplable with the externally facing groove of the first side assembly of the at least one housing assembly, and wherein the at least one second elongated engagement member is couplable with the externally facing groove of the second side assembly of the at least one housing assembly.

In one or more aspects a system for a portable electronic computing device including (I) at least one housing assembly including (A) an elongated base assembly with an elongated dimension, the elongated base assembly including (i) a first side assembly extending along the elongated dimension between the first end and the second end, and (ii) a second side assembly extending along the elongated dimension between the first end and the second end; and (II) at least one container assembly including a first side and a second side, wherein the first side of the at least one container assembly being couplable with at least one portion of the first side assembly of the elongated base assembly, and wherein the second side of the at least one container assembly being couplable with at least one portion of the second side assembly of the elongated base assembly. Wherein wherein the first side assembly including at least one groove portion being extended along the elongated dimension, wherein the at least one container assembly being couplable with the at least one groove portion of the first side assembly, wherein the second side assembly including at least one groove portion being extended along the elongated dimension, and wherein the at least one container assembly being couplable with the at least one groove portion of the second side assembly. Wherein wherein the first side of the at least one container assembly including at least one elongated engagement member being couplable with at least one portion of the first side assembly of the elongated base assembly, and wherein the second side of the at least one container assembly including at least one elongated engagement member being couplable with at least one portion of the second side assembly of the elongated base assembly.

In one or more aspects a system for a portable electronic computing device including (I) at least one housing assembly including (A) an elongated base assembly with an elongated dimension, the elongated base assembly including (i) a first side assembly extending along the elongated dimension, and (ii) a second side assembly extending along the elongated dimension, (iii) a base extending between the first side assembly and the second side assembly, and (II) at least one plate assembly, wherein the at least one plate assembly is couplable to the first side assembly, the second side assembly, and the base. Wherein the at least one plate assembly includes at least one arm, wherein the at least one arm includes at least one barb, and wherein the at least one arm with the at least one barb being couplable with the base. Wherein the at least one plate assembly includes at least one first ledge portion and at least one second ledge portion, wherein the at least one first ledge portion being couplable with the first side assembly, and wherein the at least one second ledge portion being couplable with the second side assembly.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of Charging System for Portable Electronic Devices, articles of manufacture, compositions of matter for same that may provide context, for instance, in introducing one or more processes and/or devices described herein.

FIG. 4 is an exploded left side-elevational view of the holder assembly of FIG. 1.

FIG. 32 is an elevational front end view of the base of FIG. 31.

FIG. 33 is an elevational rear end view of the base of FIG. 31.

FIG. 38 is a side-elevational view of the base of FIG. 31.

FIG. 39 is a side-elevational view of the base of FIG. 31.

FIG. 42 is a top plan view of the rear end plate coupled with the clip assembly of FIG. 40.

FIG. 43 is a bottom plan view of the rear end plate of FIG. 40.

FIG. 44 is a side-elevational view of the rear end plate coupled with the clip assembly of FIG. 40.

FIG. 45 is a side-elevational view of the rear end plate coupled with the clip assembly of FIG. 40.

FIG. 50 is a top plan view of the front end plate coupled with the clip assembly of FIG. 48.

FIG. 51 is a bottom plan view of the front end plate coupled with the clip assembly of FIG. 48.

DETAILED DESCRIPTION

Figure 1:
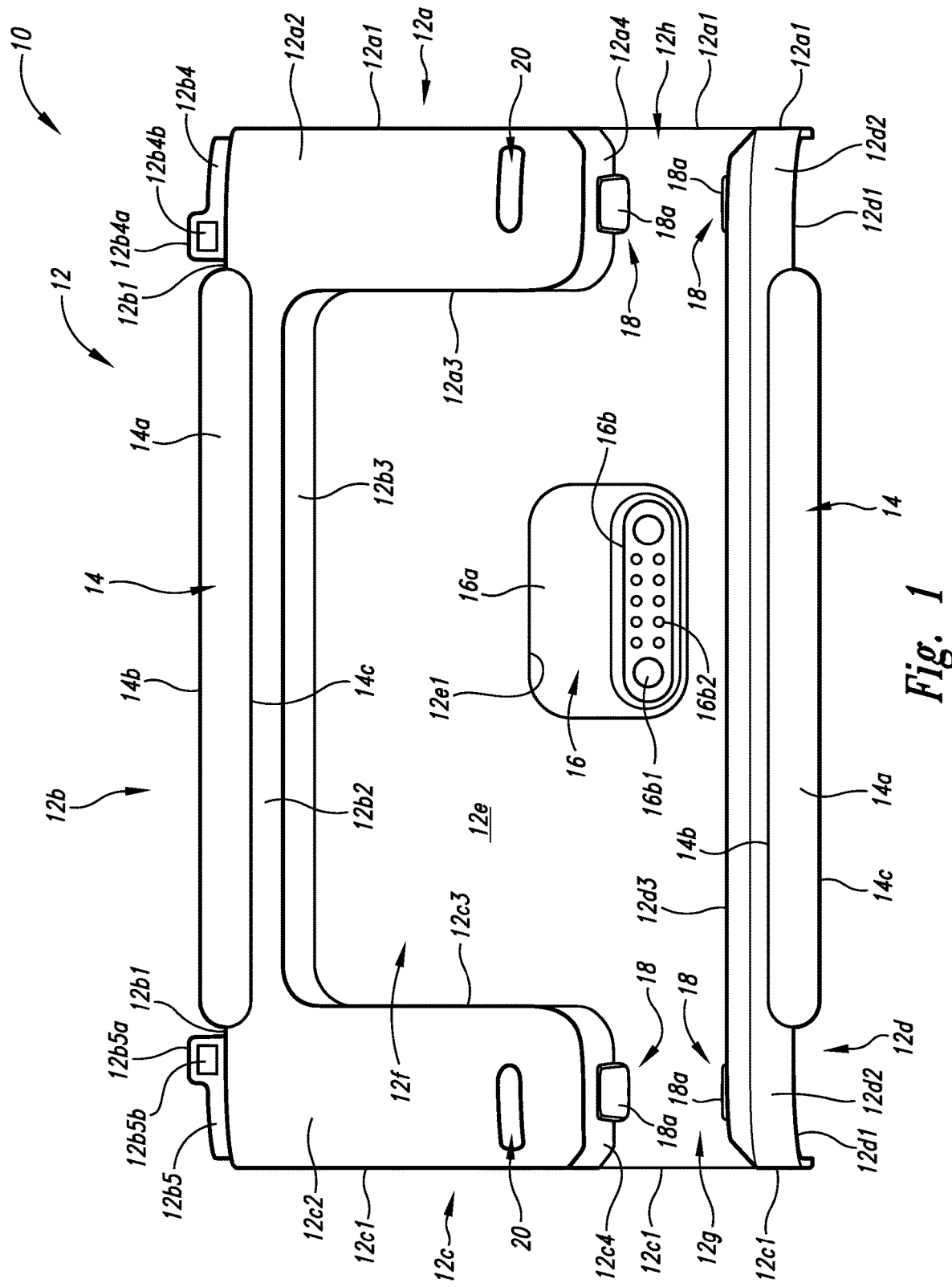
FIG. 1 is a top plan view of a holder assembly for a portable electronic device.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is a top plan view of holder assembly 10 for a portable electronic device. Depicted implementation of holder assembly 10 is shown to include container assembly 12, clip assembly 14, interface assembly 16, pad assembly 18, and illuminator assembly 20.

Depicted implementation of container assembly 12 (e.g. box assembly) is shown to include side 12a, side 12b, side 12c, side 12d, and base 12e shown to in part bound interior area 12f, channel 12g that provides one or more openings into interior area 12f, and channel 12h that provides one or more openings into interior area 12f. As alternatively described, interior area 12f includes a first border and a second border opposite the first border, a third border and a fourth border opposite the third border, the first border distanced from the second border along a first dimension, the third border distanced from the fourth border along a second dimension, the first dimension being perpendicular to the second dimension, the third border being limited to a first portion and a second portion, the fourth being limited to a first portion and a second portion. Wherein in some implementations side 12a, side 12b, side 12c, and side 12d bound portions of first border, second border, third border, and fourth border.

In implementations, side 12a and side 12c are opposingly spaced from one another and side 12b and side 12d are opposingly spaced from one another. As shown side 12a, side 12b, side 12c, side 12d to include side portion 12a1, side exterior 12b1, side exterior 12c1, edge portion 12d1, respectively, facing away from interior area 12f. As depicted, base 12e is being planarly formed to include an interior surface portion occupying a portion of a plane. Implementations of one or more portions of container assembly 12 can include at least one of the following materials: rigid plastic, polycarbonate, acrylonitrile butadiene styrene, thermoplastic polymer, thermoplastic polyurethane, polyethylene terephthalate, and nylon.

Depicted implementation of side 12a is shown to include side portion 12a1, upper exterior 12a2, side interior 12a3, and side interior 12a4. Depicted implementation of side 12b is shown to include side exterior 12b1, upper exterior 12b2, side interior 12b3, and elongated protrusion 12b4. Depicted implementation of elongated protrusion 12b4 is shown to include protrusion 12b4a, and aperture 12b4b. Depicted implementation of elongated protrusion 12b5 is shown to include protrusion 12b5a, and aperture 12b5b.

Depicted implementation of side 12c is shown to include side exterior 12c1, upper exterior 12c2, side interior 12c3, and side interior 12c4. Depicted implementation of side 12d is shown to include edge portion 12d1, upper exterior 12d2, and side interior 12d3. Depicted implementation of base 12e is shown to include aperture 12e1.

Depicted implementation of clip assembly 14 is shown to include upper portion 14a, side edge 14b, and side edge 14c.

Depicted implementation of interface assembly 16 is shown to include platform upper 16a, and lower exterior 16b, with connector 16b1, and connector 16b2.

Depicted implementation of pad assembly 18 is shown to include cushion pad 18a.

Figure 2:
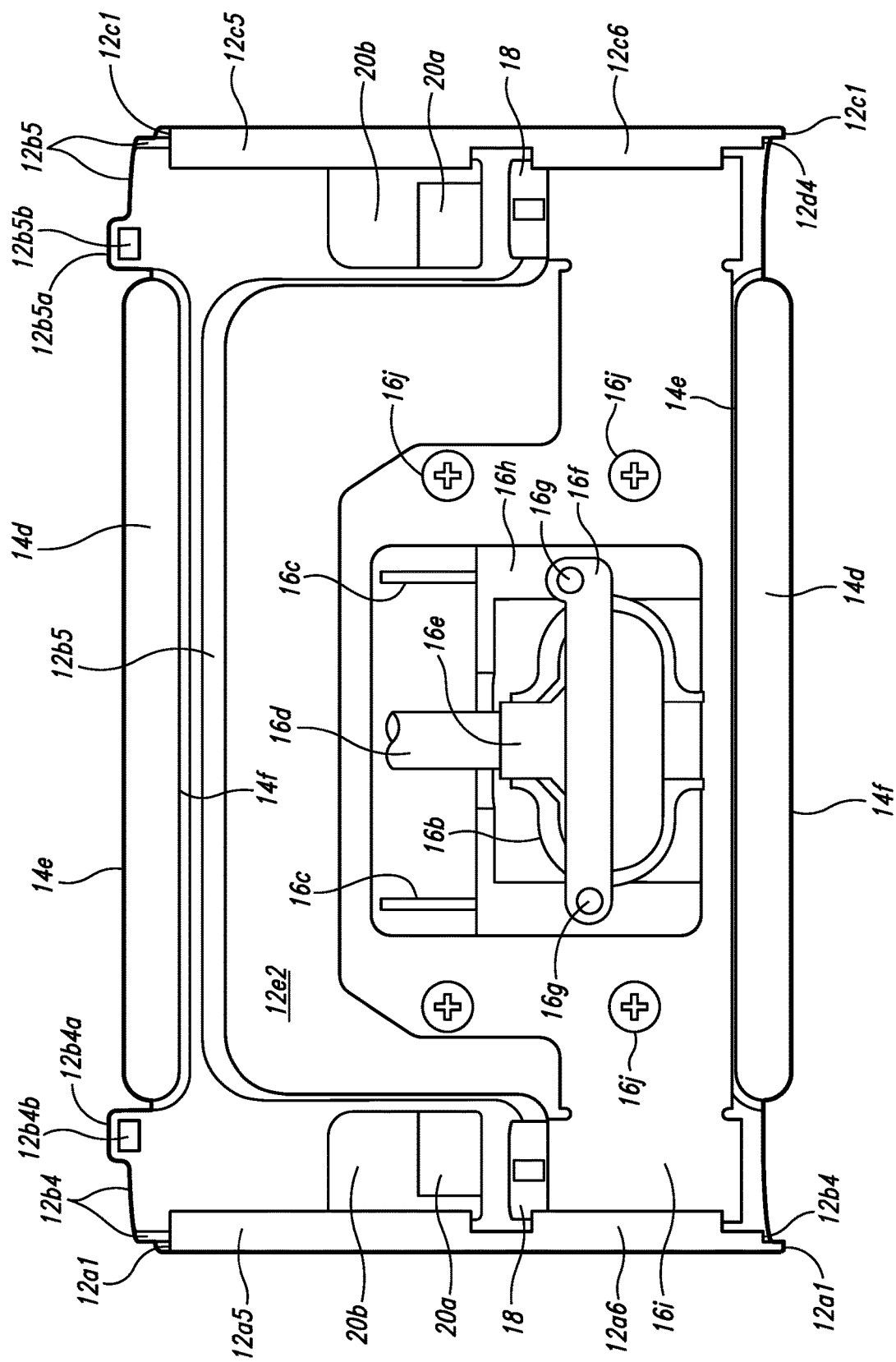
FIG. 2 is a bottom plan view of the holder assembly of FIG. 1.

Turning to FIG. 2, depicted therein is a bottom plan view of holder assembly 10. Depicted implementation of container assembly 12 is shown to include elongated engagement member 12a5, elongated engagement member 12a6, elongated engagement member 12c5, elongated engagement member 12c6, groove 12d4, and lower exterior 12e2.

Depicted implementation of clip assembly 14 is shown to include lower portion 14d, side edge 14e, and side edge 14f. Depicted implementations of interface assembly 16 is shown to include lower exterior 16b, track rail 16c, post 16d, collar 16e, brace 16f, coupling 16g, platform lower 16h, support frame lower 16i, and coupler 16j. Depicted implementations of illuminator assembly 20 is shown to include coupling portion 20a, and support portion 20b.

Figure 3:
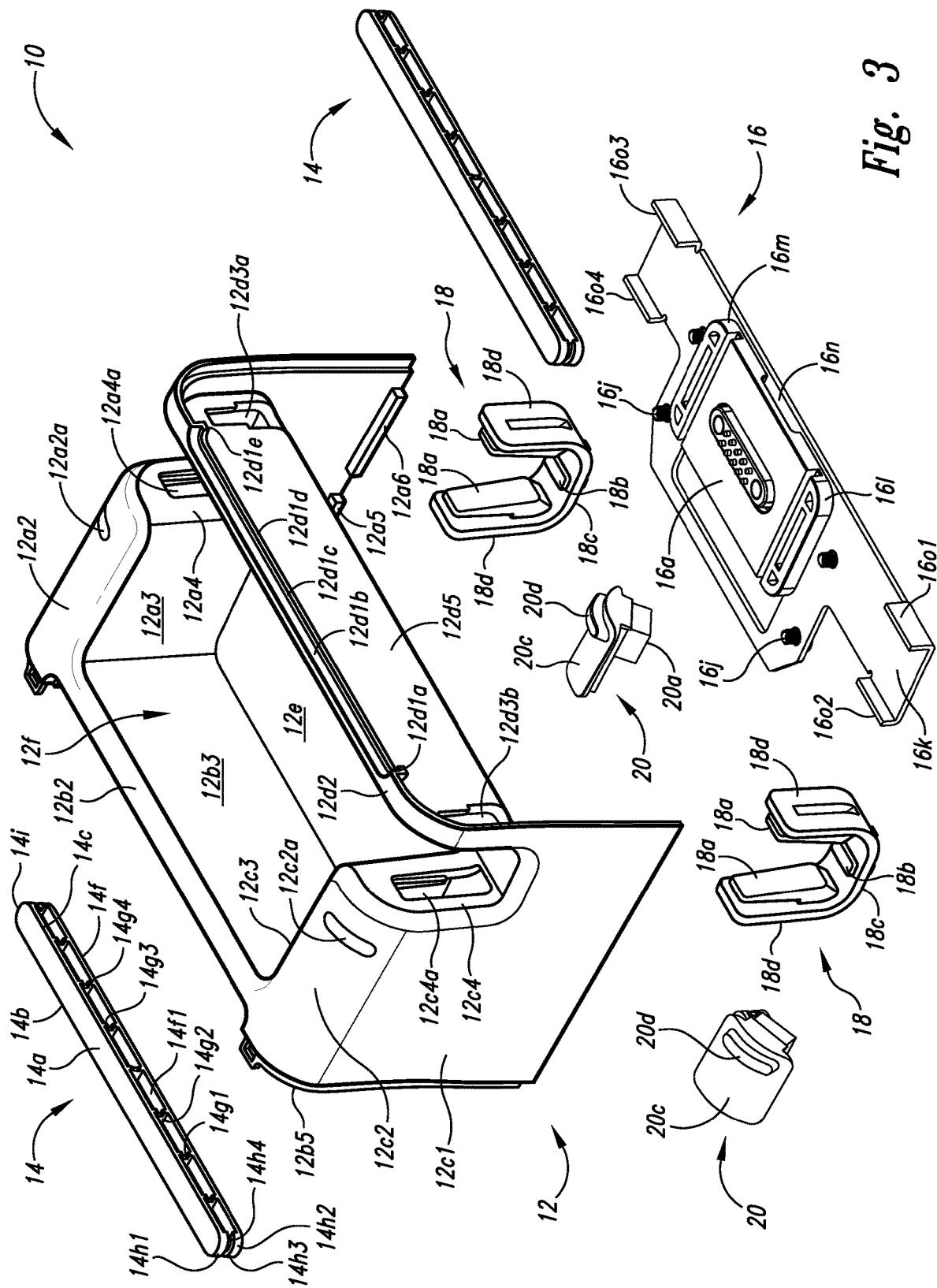
FIG. 3 is an exploded left top front perspective view of the holder assembly of FIG. 1.

Turning to FIG. 3, depicted therein is an exploded left top front perspective view of holder assembly 10. Depicted implementation of container assembly 12 is shown to include aperture 12a2a, aperture 12a4a, aperture 12c2a, aperture 12c4a, protrusion 12d1a, exterior side 12d1b, protruding edge 12d1c, exterior side 12d1d, protrusion 12d1e, aperture 12d3a, aperture 12d3b, and exterior side 12d5. Depicted implementation of clip assembly 14 is shown to include side edge 14f with interior side 14f1, notch 14g1, beam 14g2, ridge 14g3, ridge 14g4, with upper end 14h1, lower end 14h2, notch 14h3, beam 14h4, and end 14i. Depicted implementation of interface assembly 16 is shown to include support frame upper 16k, pad portion 16l, pad portion 16m, notch 16n, standoff 16o1, standoff 16o2, standoff 16o3, and standoff 16o4. Depicted implementation of pad assembly 18 is shown to include cushion pad 18b, base 18c, and extension arm 18d. Depicted implementation of illuminator assembly 20 is shown to include surface portion 20c, and illuminator portion 20d.

Turning to FIG. 4, depicted therein is an exploded left side-elevational view of holder assembly 10. Depicted implementation of container assembly 12 is shown to include thickness dimension T1. Depicted implementation of pad assembly 18 is shown to include thickness dimension T2 and thickness dimension T3.

Figure 5:
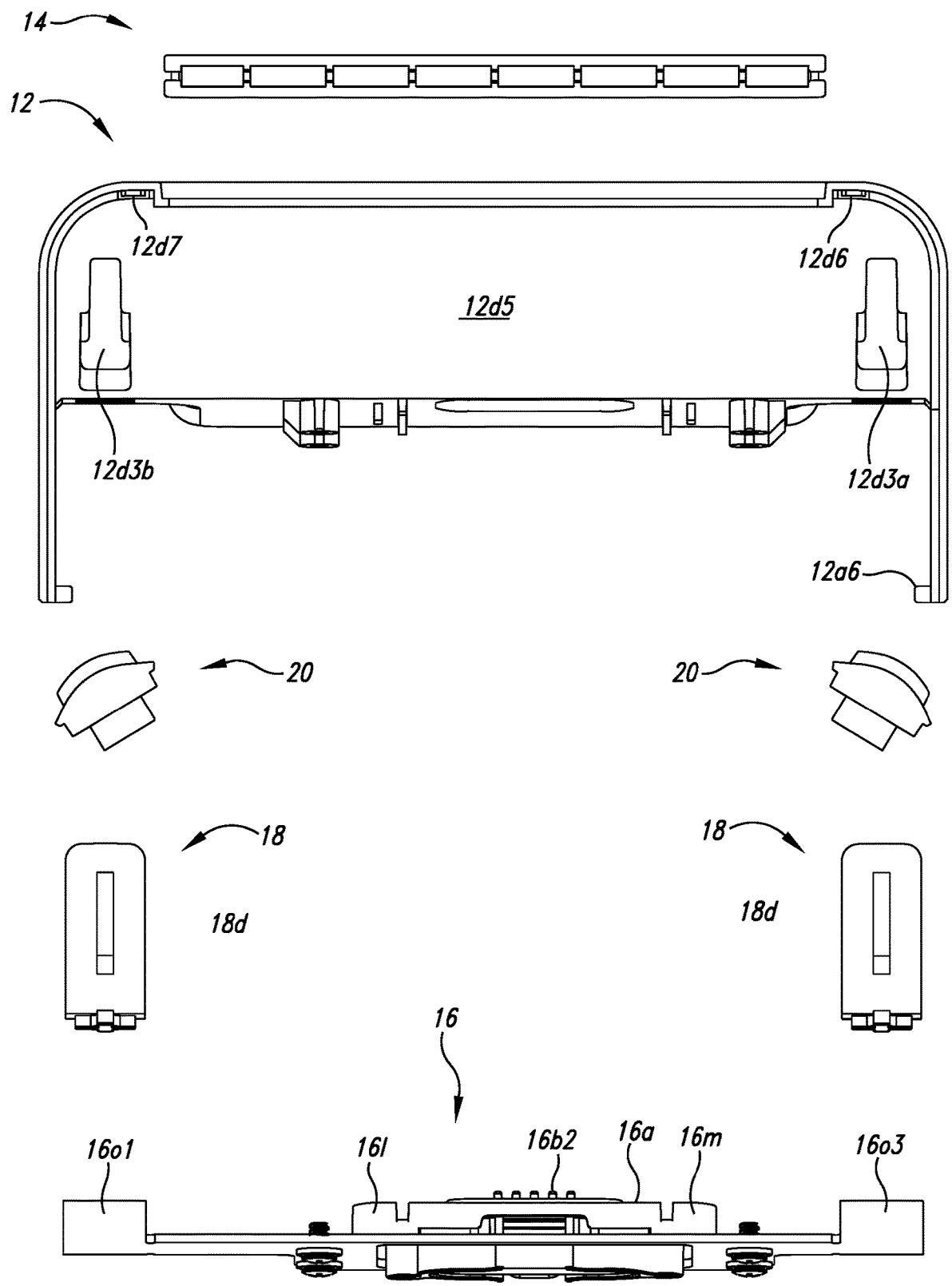
FIG. 5 is an exploded front side-elevational view of the holder assembly of FIG. 1.

Turning to FIG. 5, depicted therein is an exploded front side-elevational view of holder assembly 10 shown to include protrusion 12d6 and protrusion 12d7.

Figure 6:
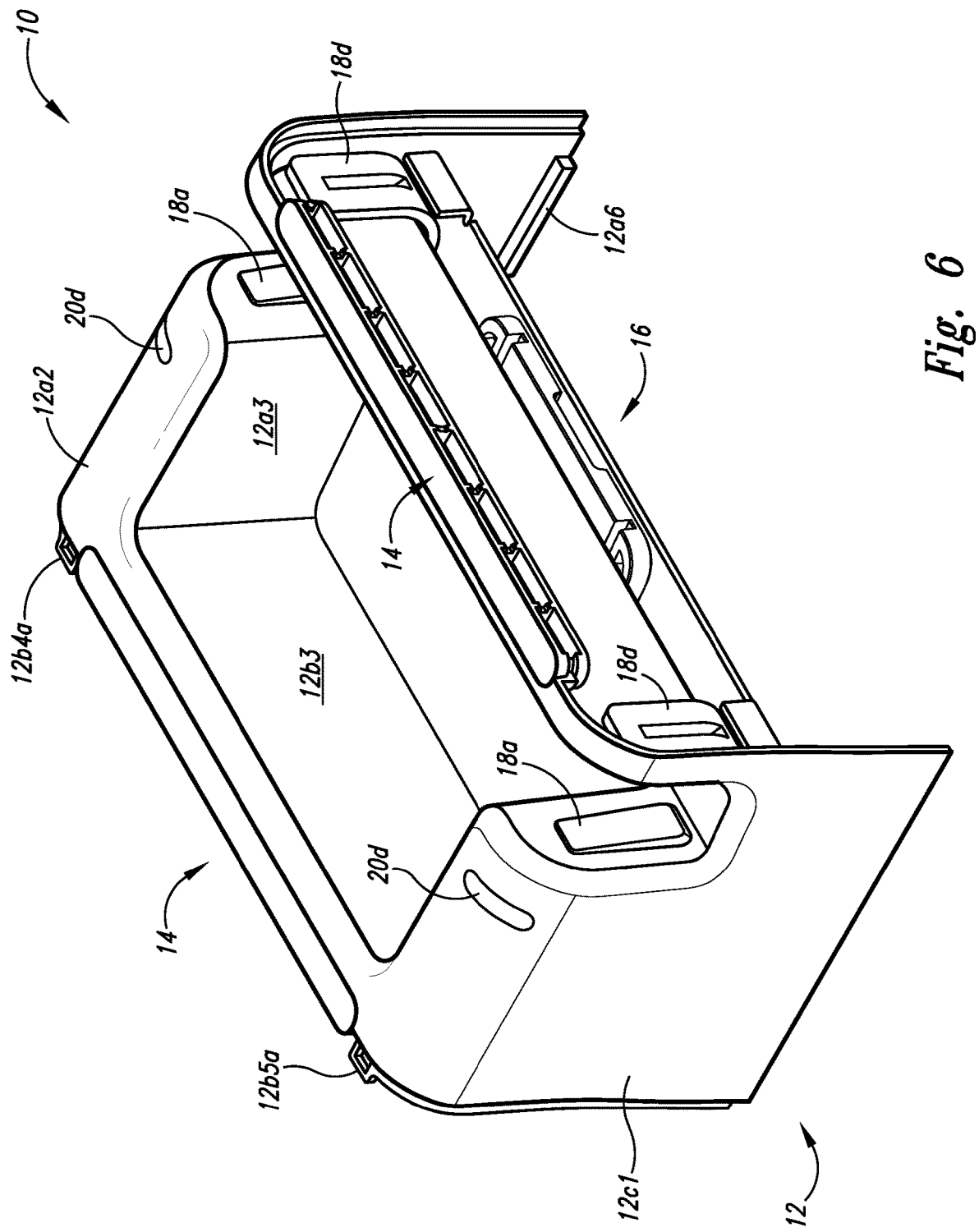
FIG. 6 is a left top front perspective view of the holder assembly of FIG. 1.

Turning to FIG. 6, depicted therein is a left top front perspective view of holder assembly 10.

Figure 7:
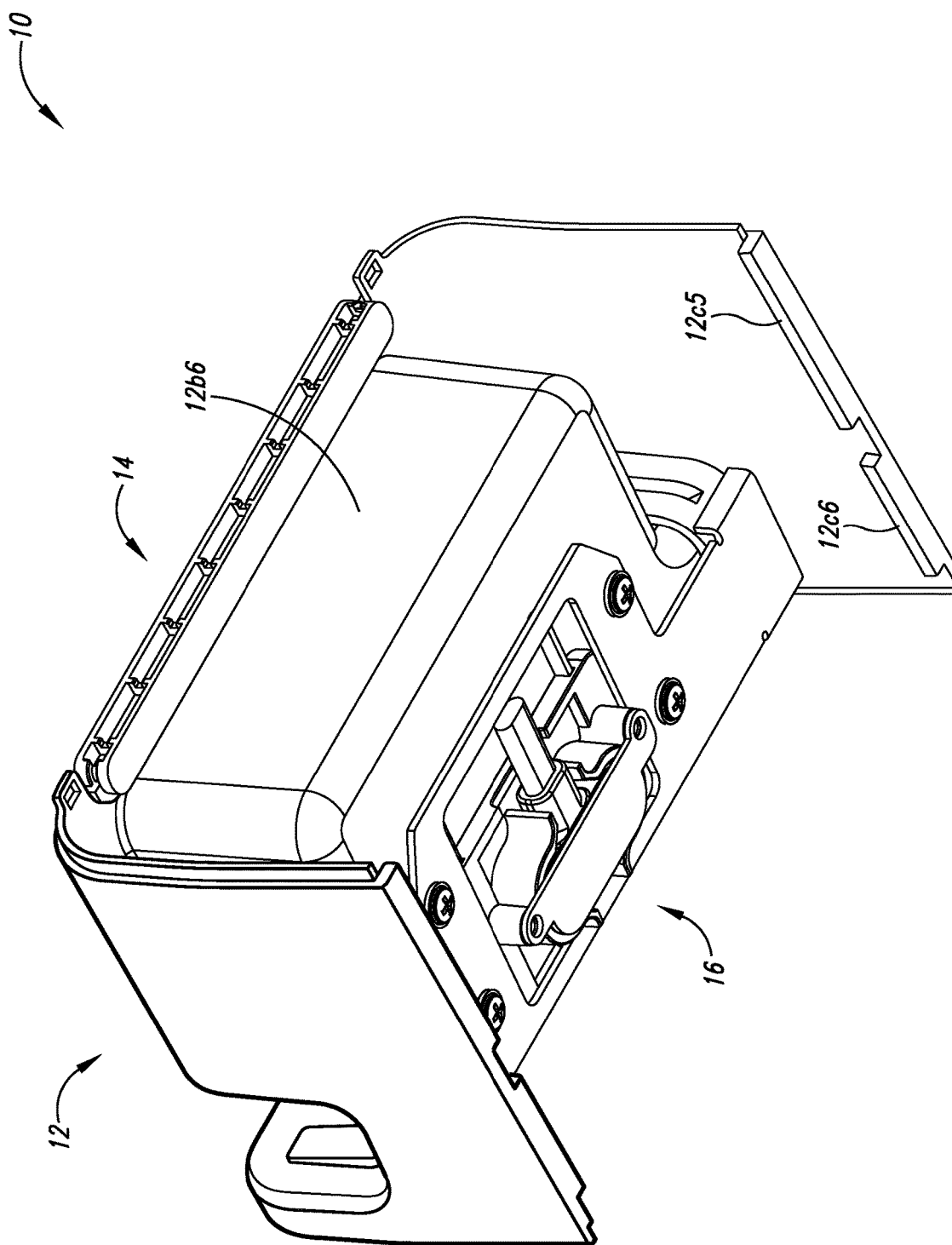
FIG. 7 is a right bottom perspective view of the holder assembly of FIG. 1.

Turning to FIG. 7, depicted therein is a right bottom perspective view of holder assembly 10 including and exterior side 12b6.

Figure 8:
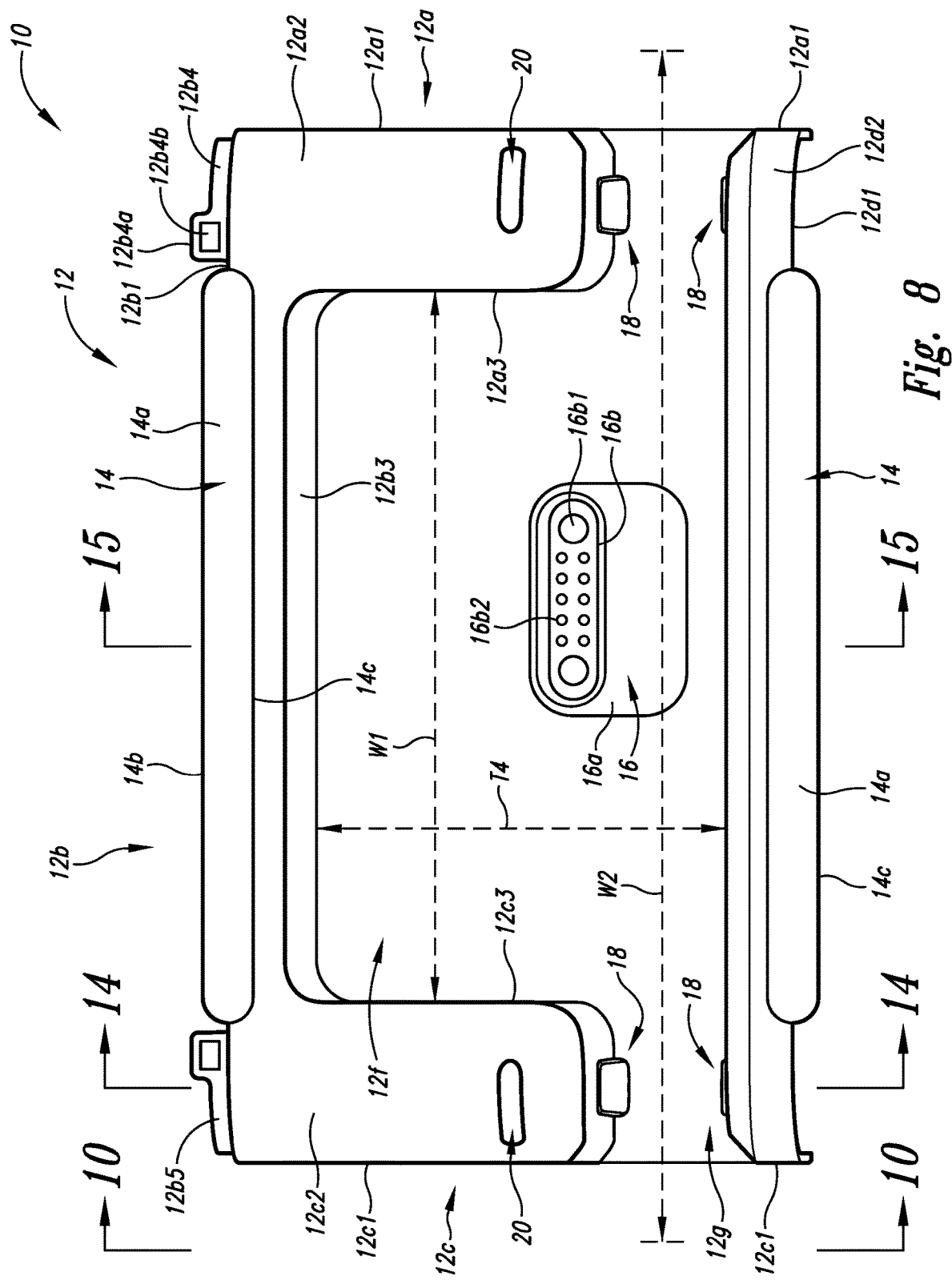
FIG. 8 is a top plan view of the holder assembly of FIG. 1.

Turning to FIG. 8, depicted therein is a top plan view of holder assembly 10 wherein container assembly 12 includes thickness dimension T4, width dimension W1, and width dimension W2.

Figure 9:
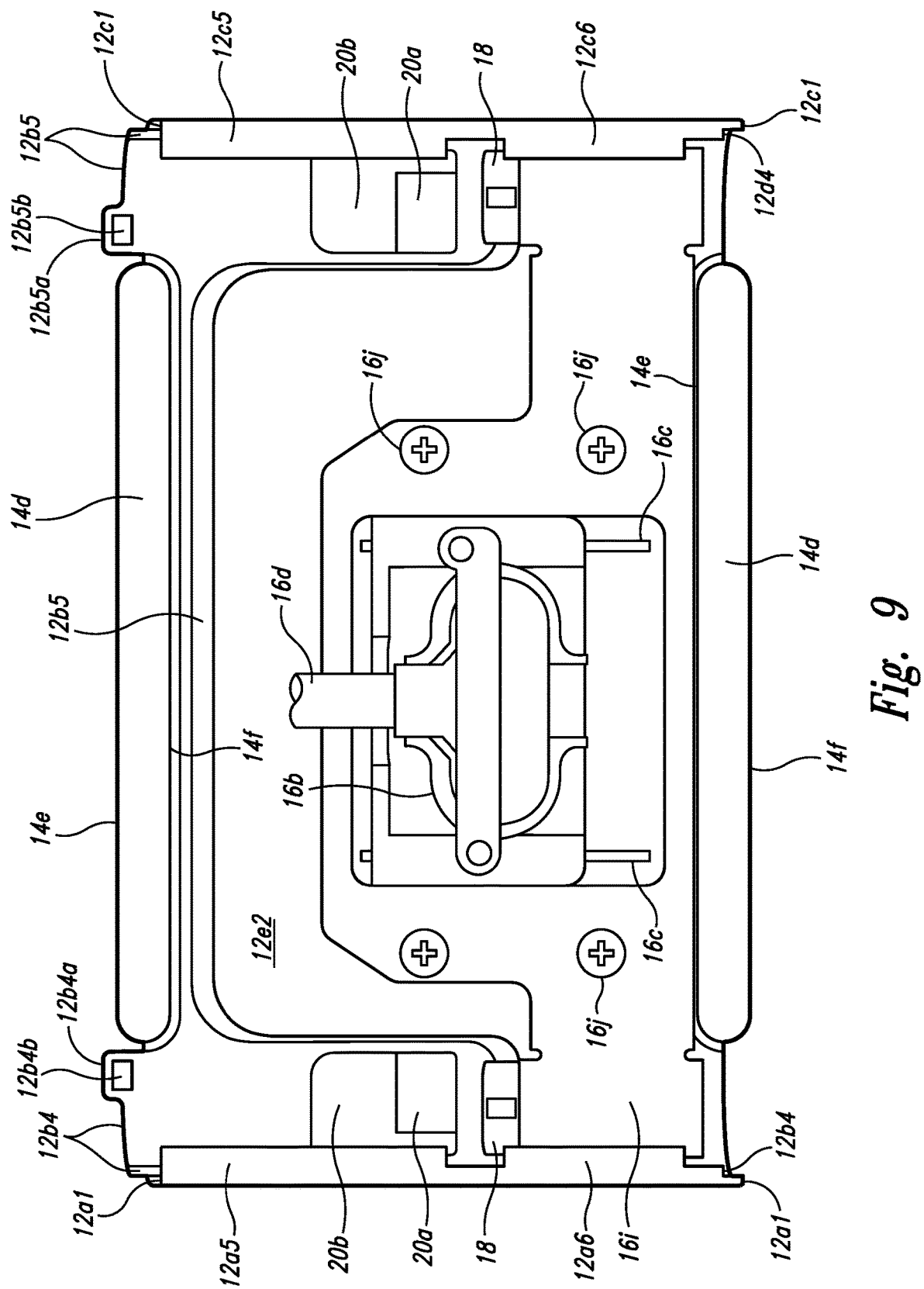
FIG. 9 is a bottom plan view of the holder assembly FIG. 1.

Turning to FIG. 9, depicted therein is a bottom plan view of holder assembly 10.

Figure 10:
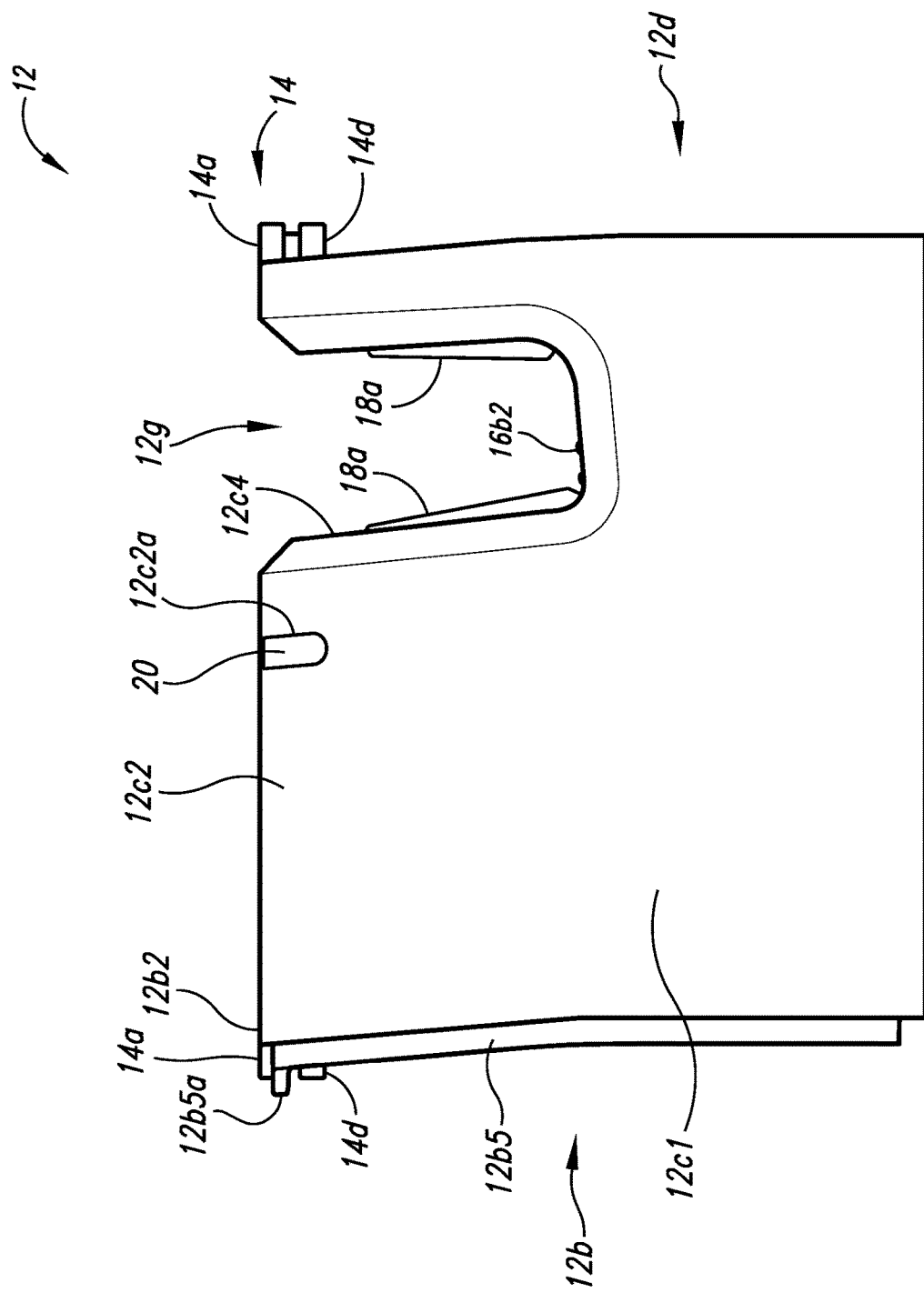
FIG. 10 is a left side-elevational view of the holder assembly of FIG. 1 taken along the 10-10 cutline of FIG. 8.

Turning to FIG. 10, depicted therein is a left side-elevational view of holder assembly 10 taken along the 10-10 cutline of FIG. 8.

Figure 11:
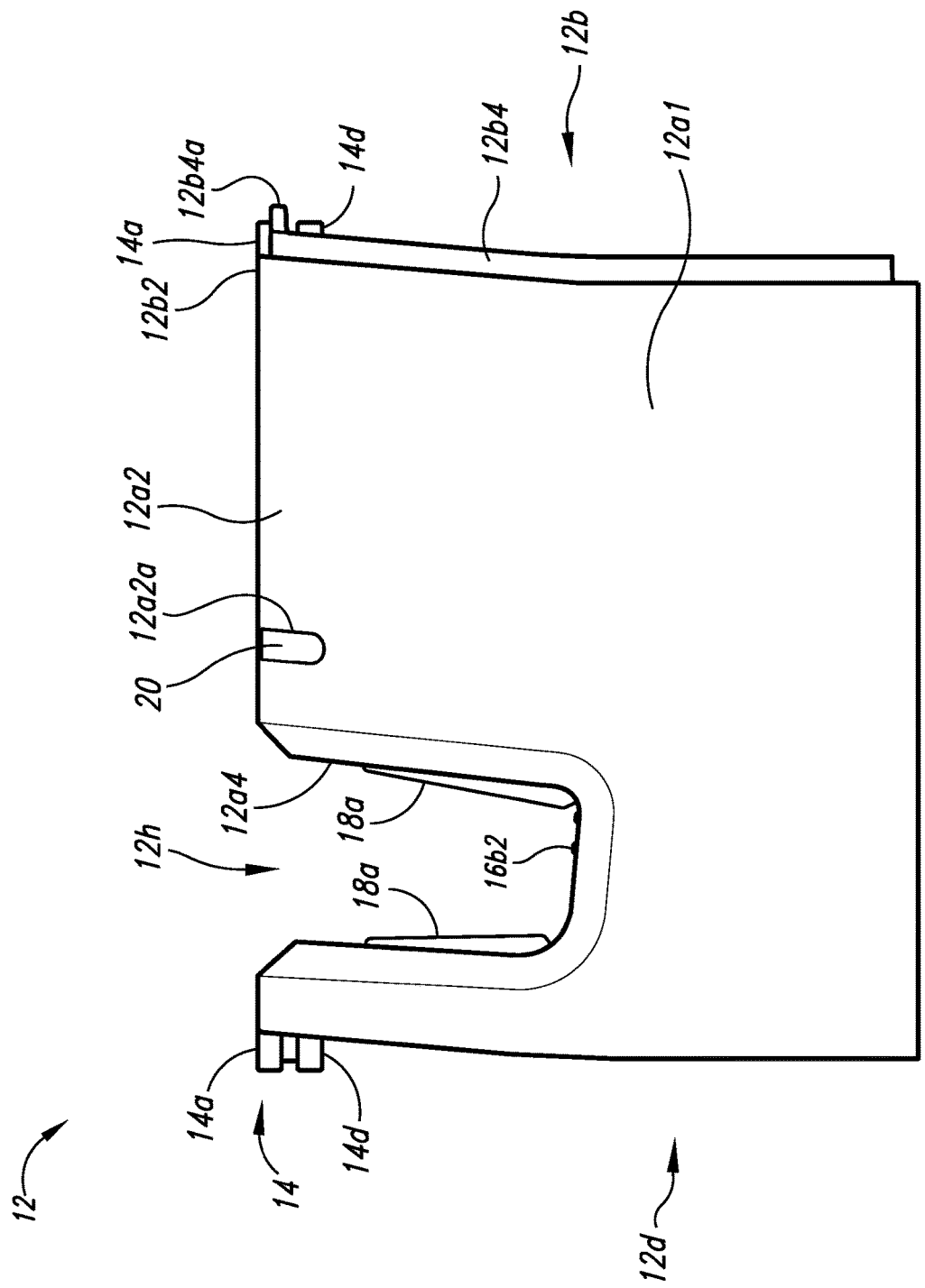
FIG. 11 is a right side-elevational view of the holder assembly of FIG. 1.

Turning to FIG. 11, depicted therein is a right side-elevational view of holder assembly 10.

Figure 12:
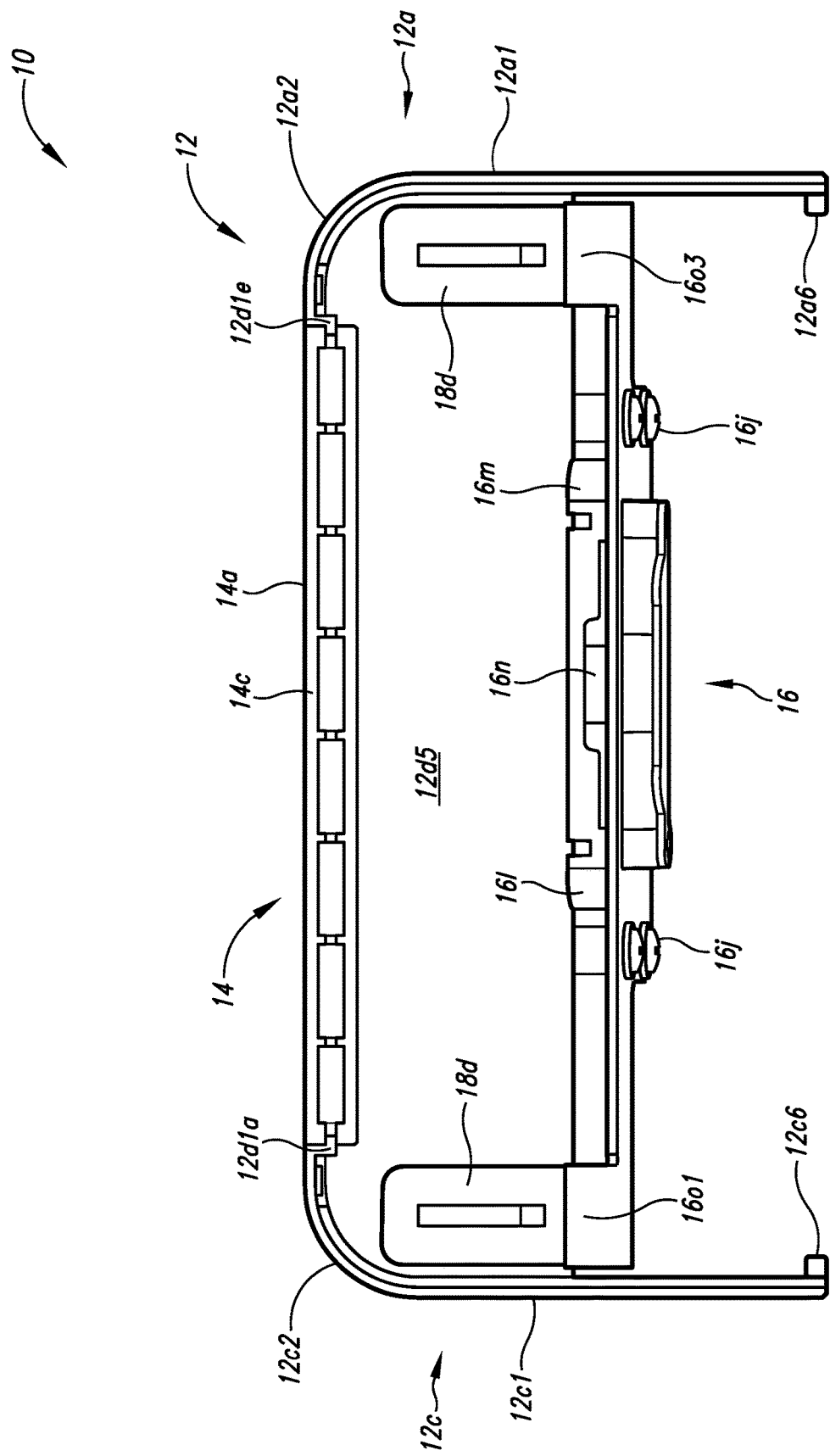
FIG. 12 is a front elevational view of the holder assembly of FIG. 1.

Turning to FIG. 12, depicted therein is a front elevational view of holder assembly 10.

Figure 13:
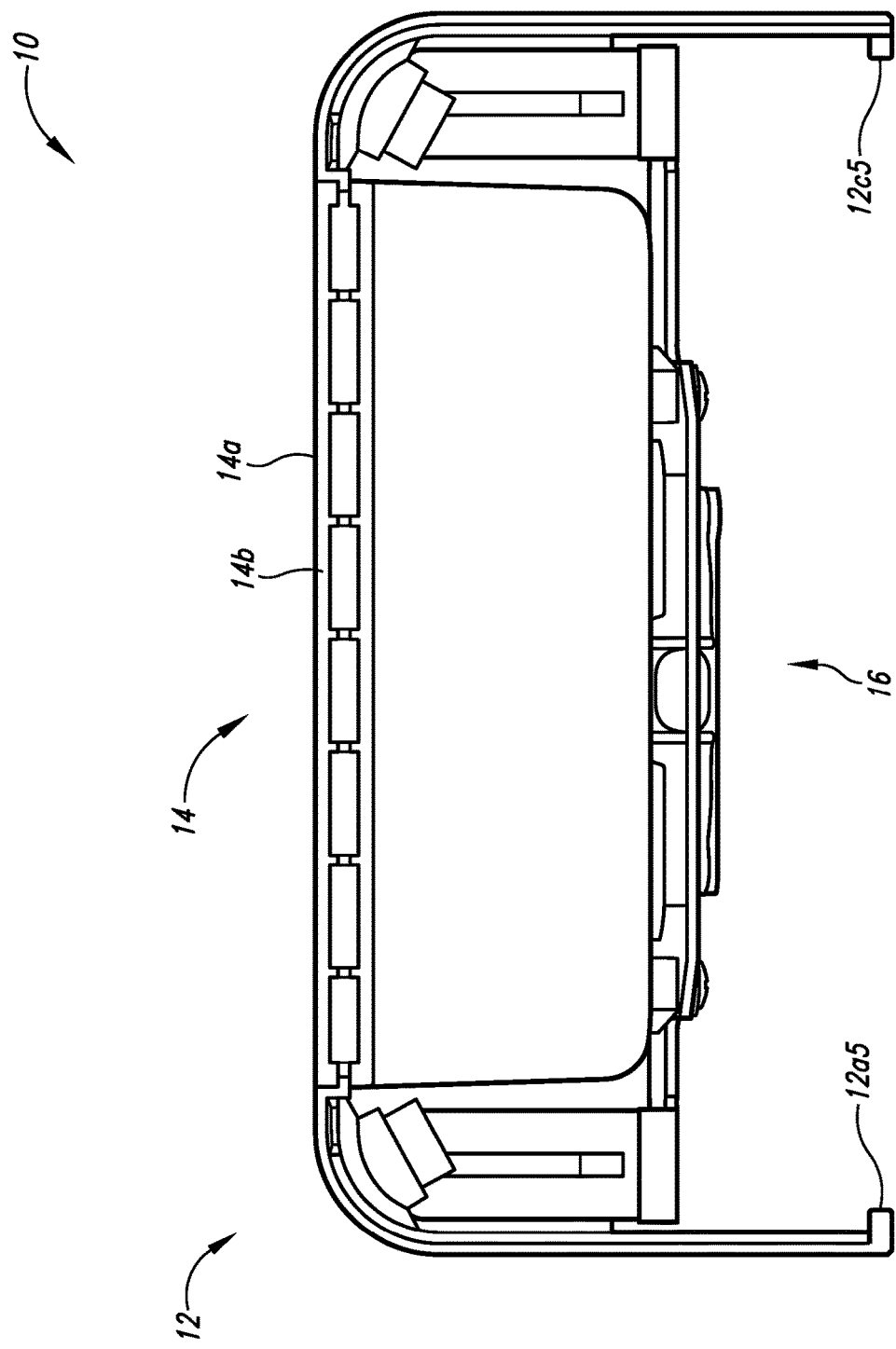
FIG. 13 is a rear elevational view of the holder assembly of FIG. 1.

Turning to FIG. 13, depicted therein is a rear elevational view of holder assembly 10.

Figure 14:
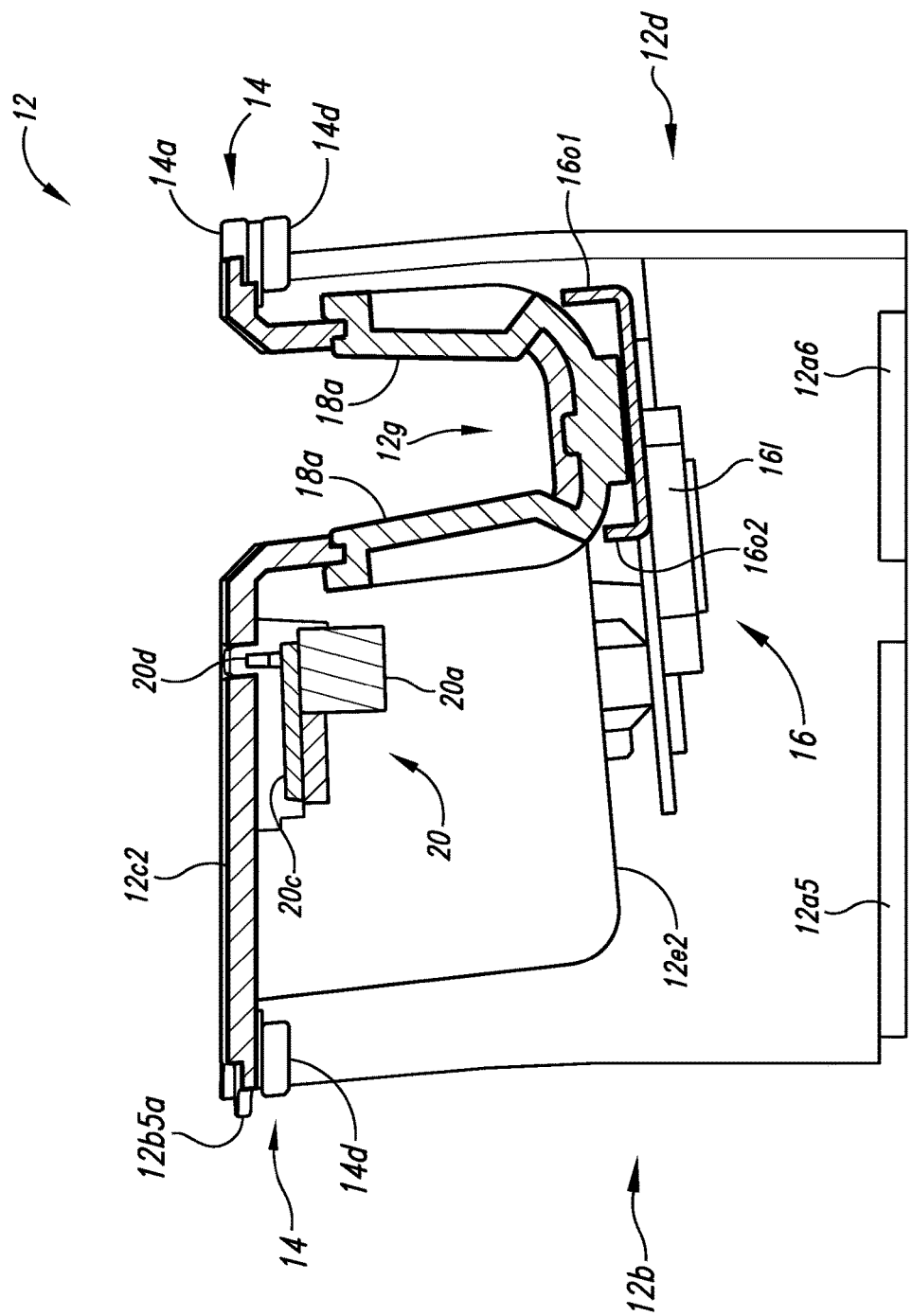
FIG. 14 is a left side-elevational view of the holder assembly of FIG. 1 taken along the 14-14 cutline of FIG. 8.

Turning to FIG. 14, depicted therein is a left side-elevational view of illuminator assembly 20 taken along the 14-14 cutline of FIG. 8.

Figure 15:
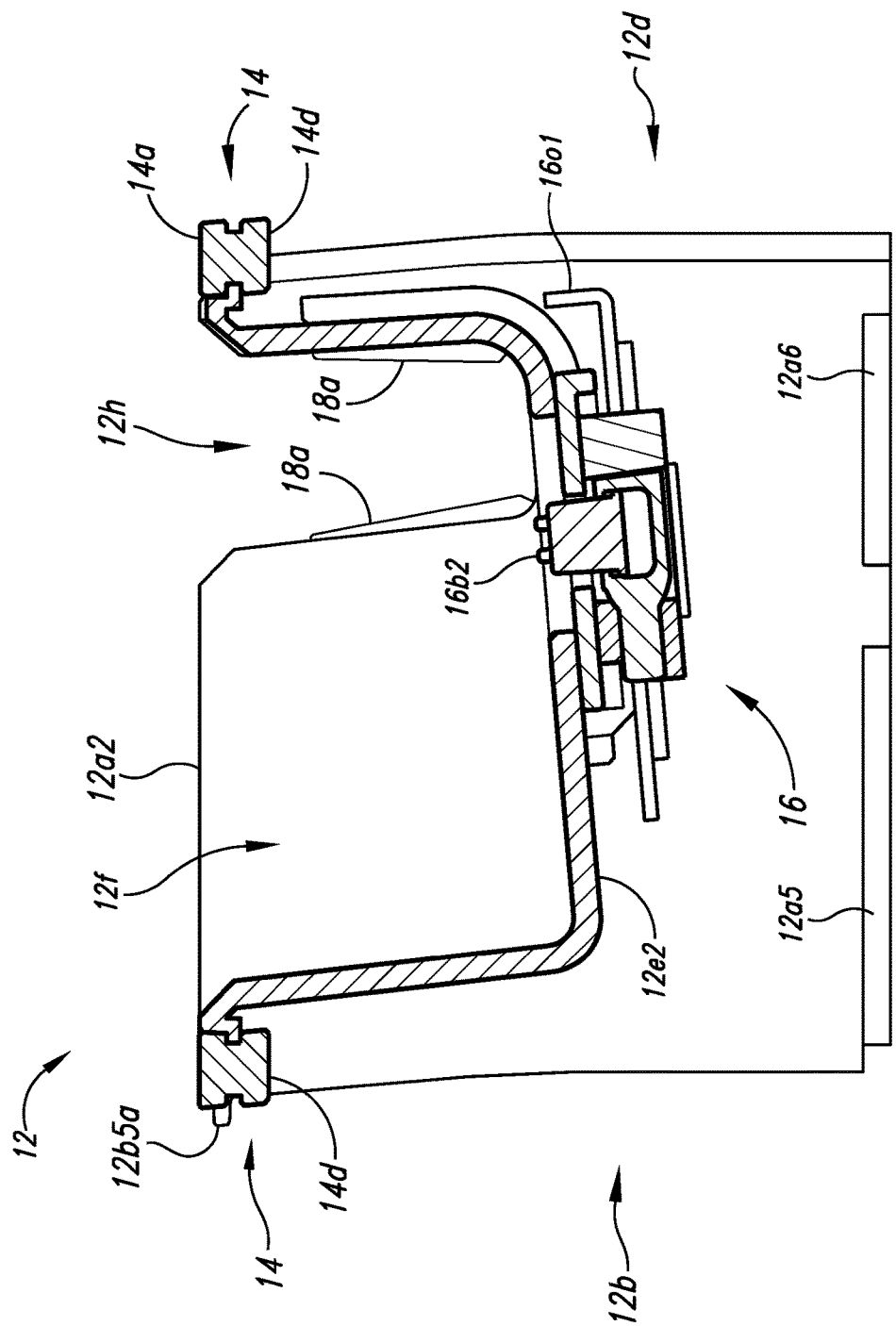
FIG. 15 is a left side-elevational view of the holder assembly of FIG. 1 taken along the 15-15 cutline of FIG. 8.

Turning to FIG. 15, depicted therein is a left side-elevational view of holder assembly 10 taken along the 15-15 cutline of FIG. 8.

Figure 16:
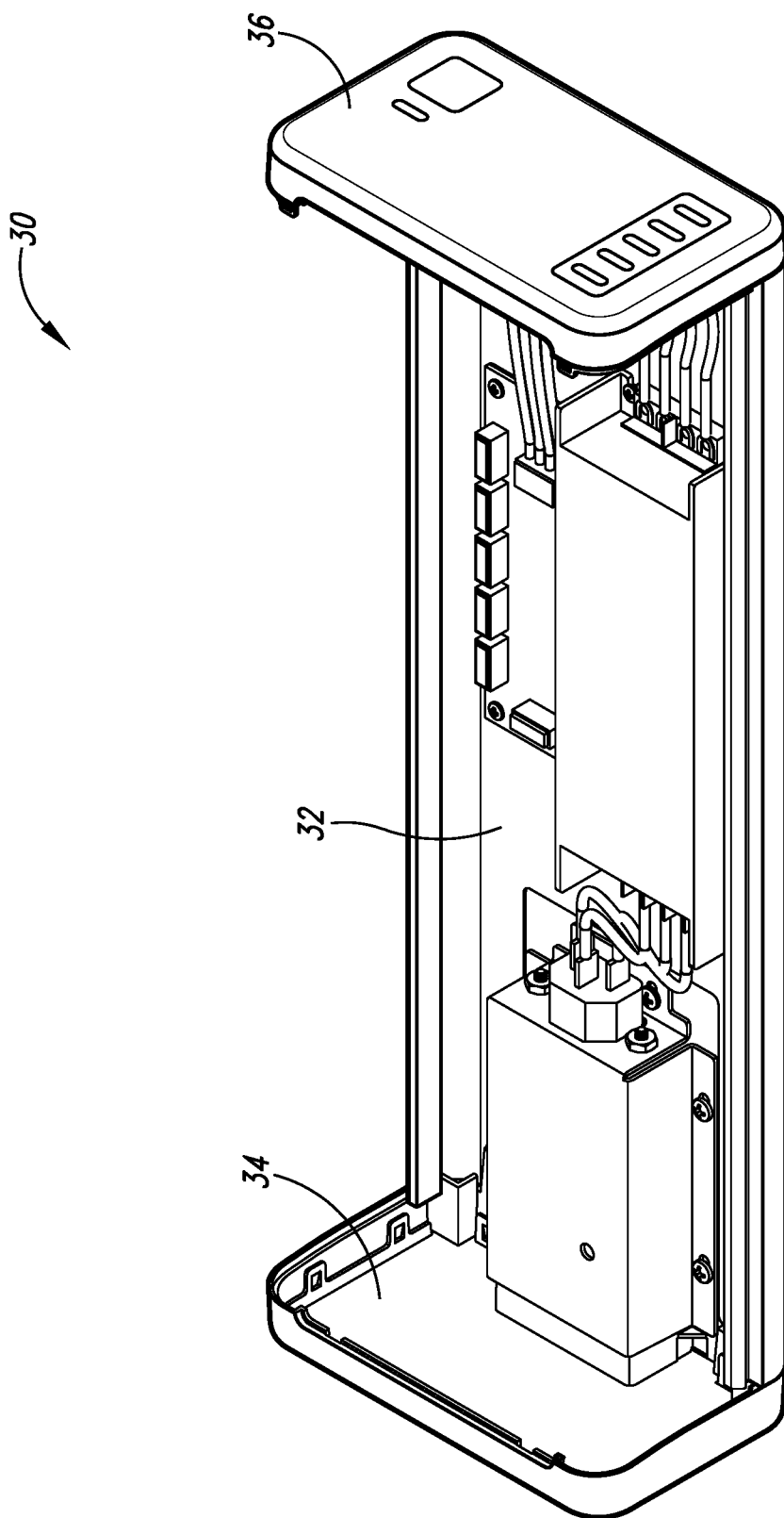
FIG. 16 is a left top front perspective view of a housing for the holder assembly of FIG. 1.

Turning to FIG. 16, depicted therein is a left top front perspective view of housing assembly 30 shown to include elongated base assembly 32, rear end plate 34, and front end plate 36.

Figure 17:
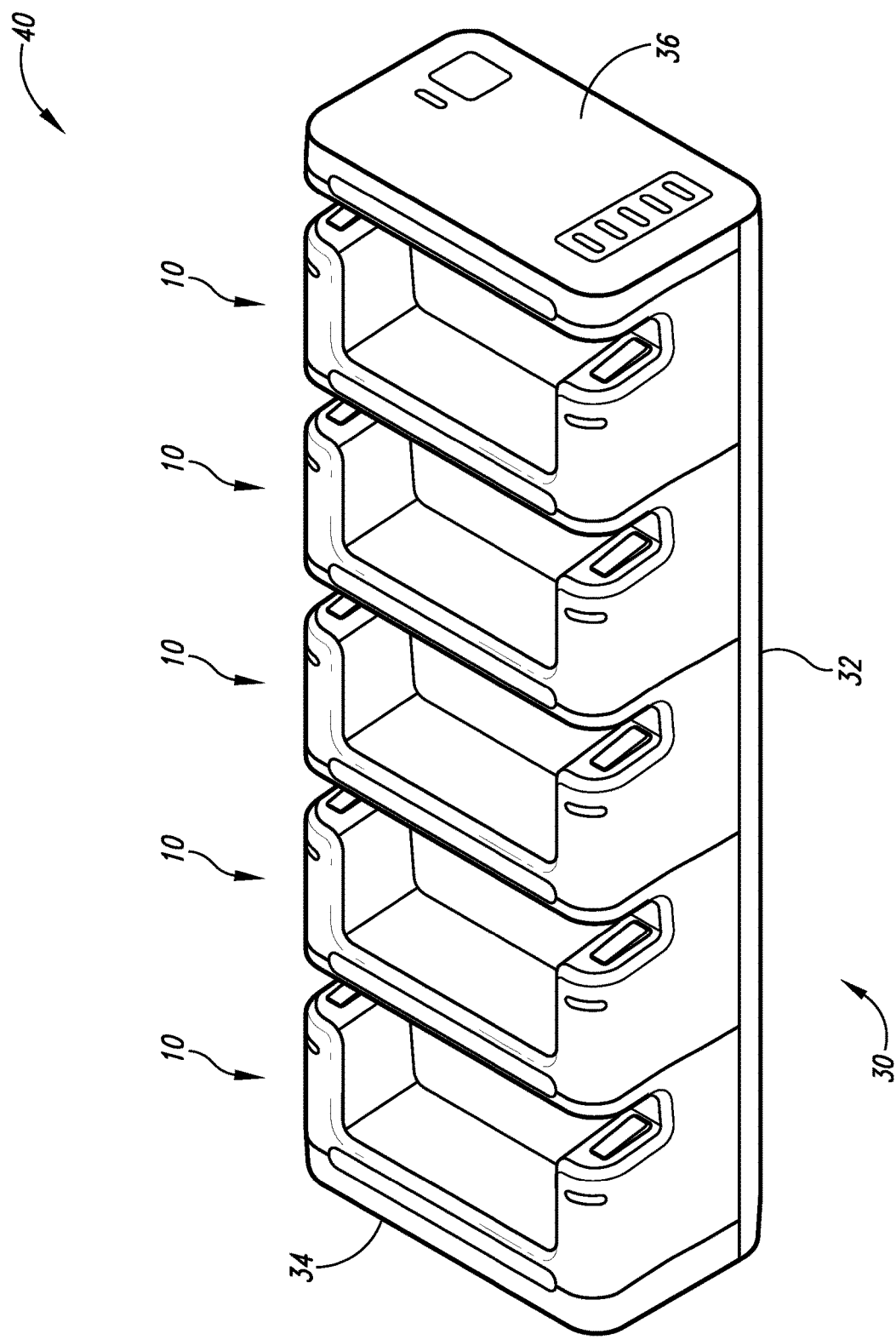
FIG. 17 is a left top front perspective view of the charging station with the housing of FIG. 14 containing the plurality of the holder assemblies of FIG. 1.

Turning to FIG. 17, depicted therein is a left top front perspective view of charger assembly 40 with housing assembly 30 the housing of FIG. 14 containing the plurality of holder assembly 10.

Figure 18:
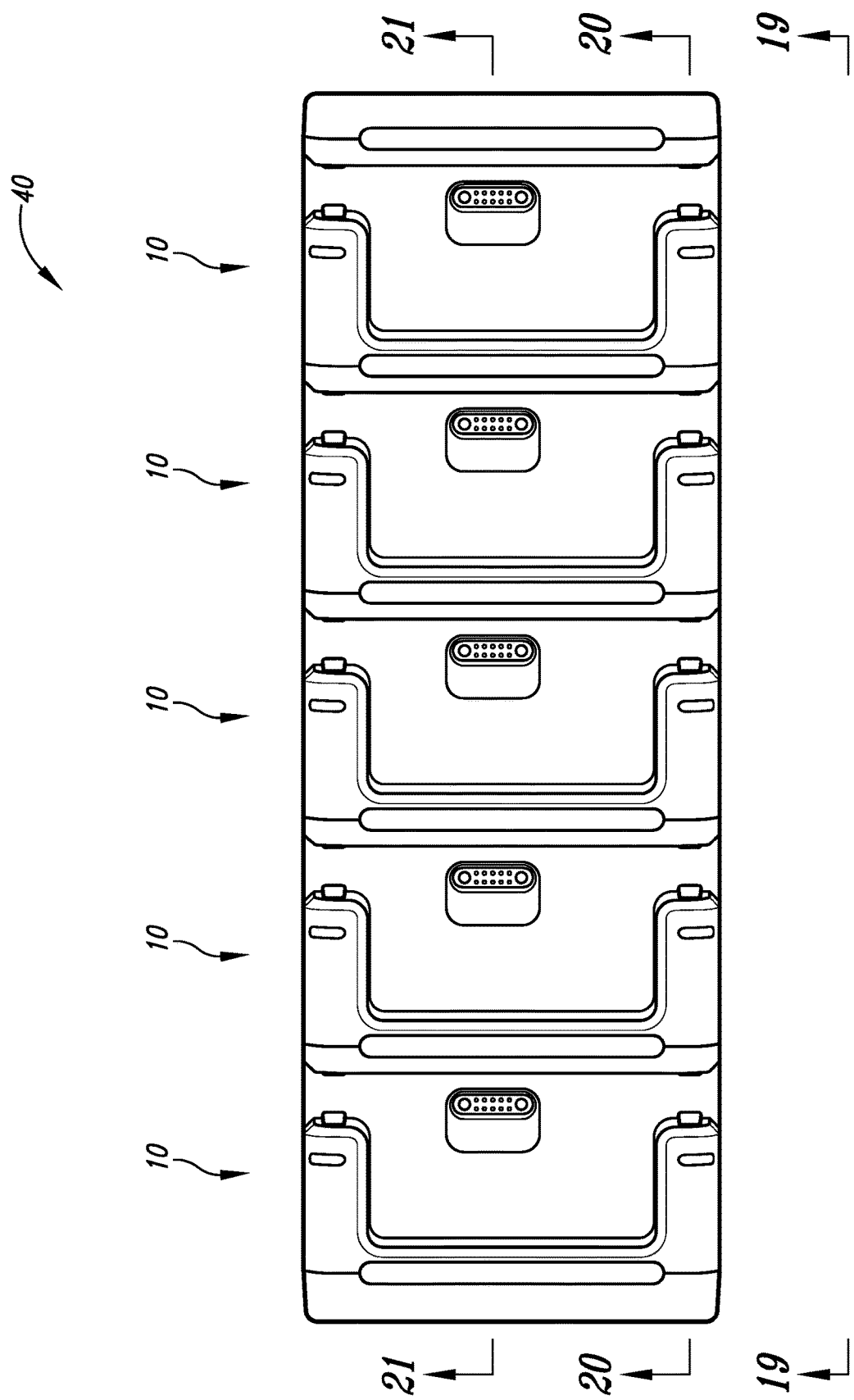
FIG. 18 is a top plan view of the charging station of FIG. 15 with the housing of FIG. 14 containing the plurality of the holder assemblies of FIG. 1.

Turning to FIG. 18, depicted therein is a top plan view of charger assembly 40 with housing assembly 30 containing the plurality of holder assembly 10.

Figure 19:
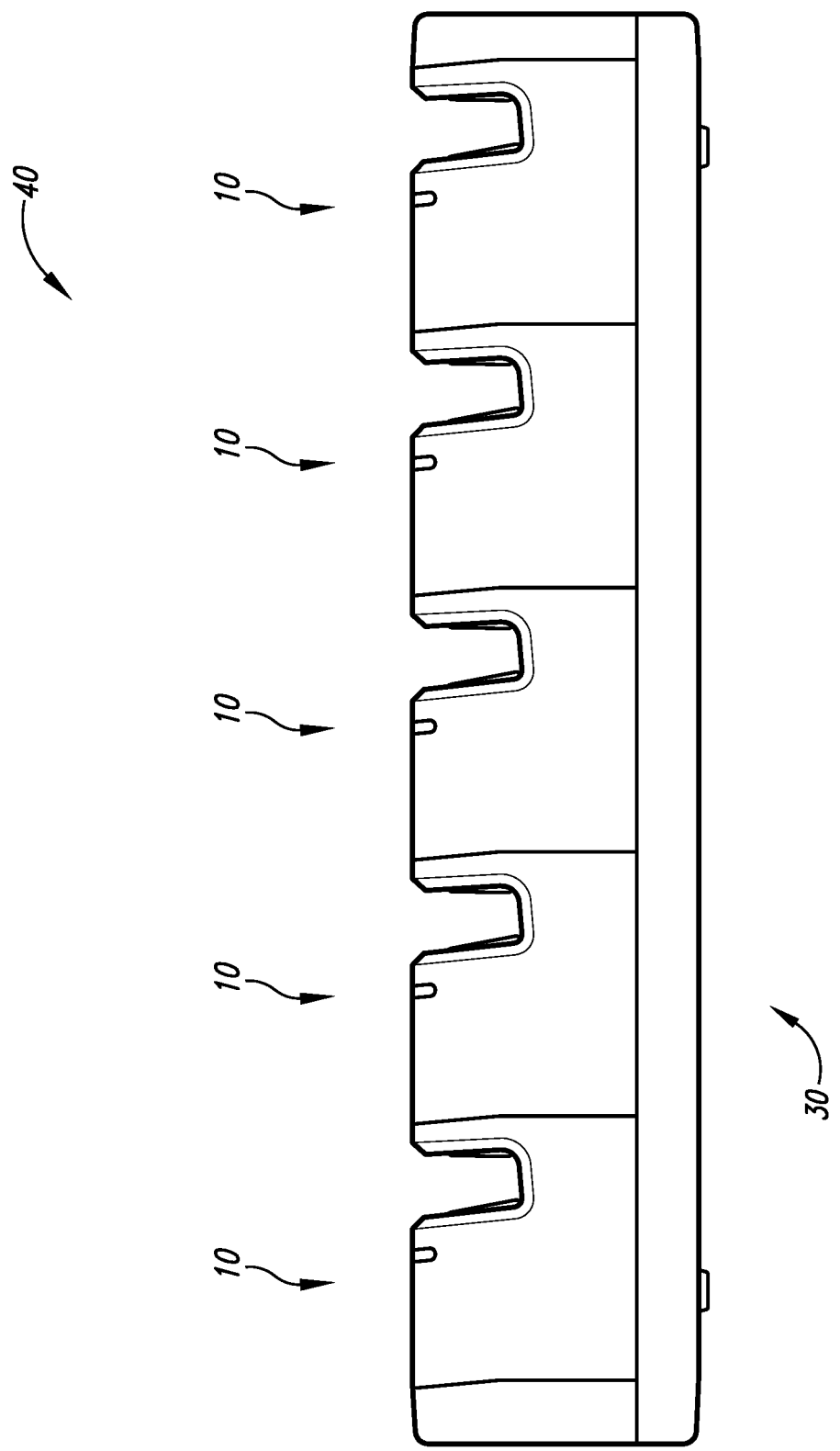
FIG. 19 is a left side-elevational view of the charging station taken along the 19-19 cutline of FIG. 18.

Turning to FIG. 19, depicted therein is a left side-elevational view of charger assembly 40 with housing assembly 30 taken along the 19-19 cutline of FIG. 18.

Figure 20:
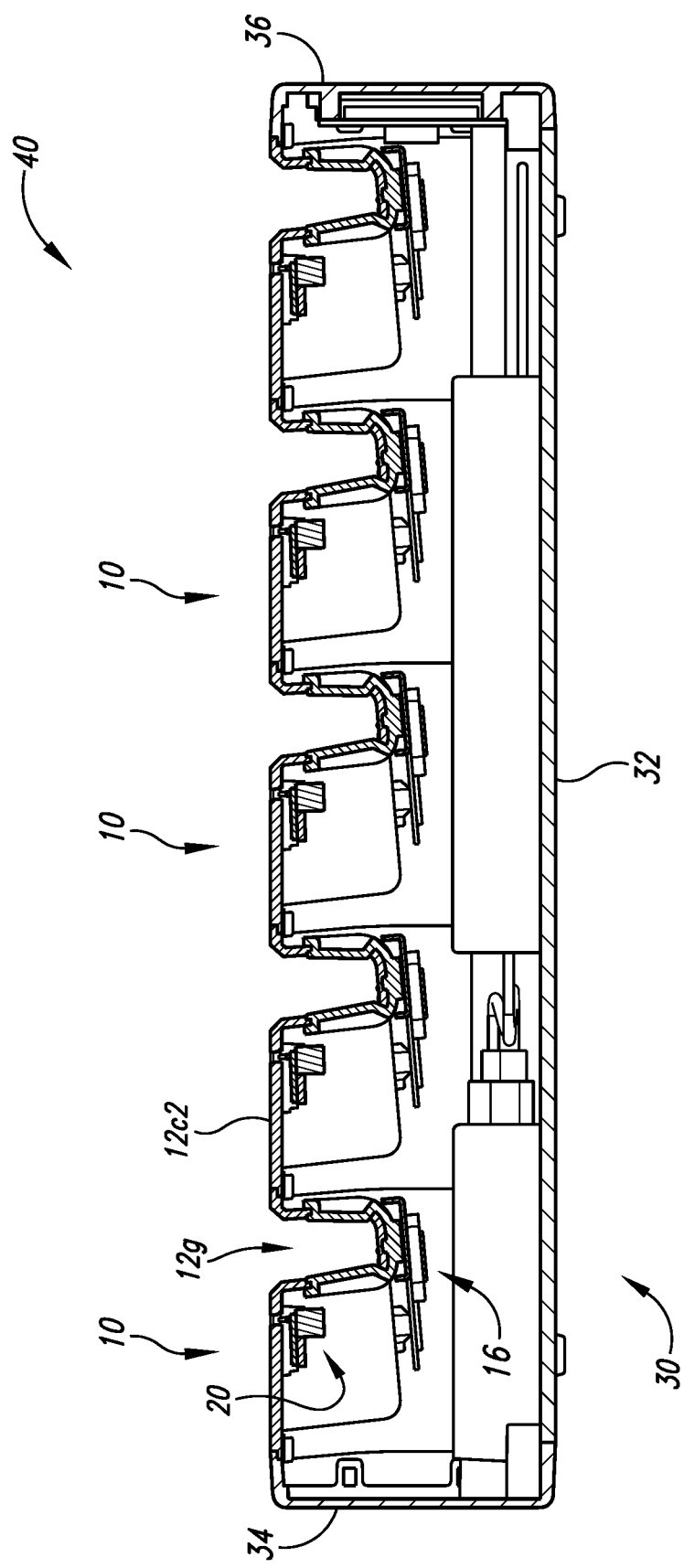
FIG. 20 is a side elevational cross-sectional view of the charging station taken along the 20-20 cutline of FIG. 18.

Turning to FIG. 20, depicted therein is a side elevational cross-sectional view of charger assembly 40 taken along the 20-20 cutline of FIG. 18.

Figure 21:
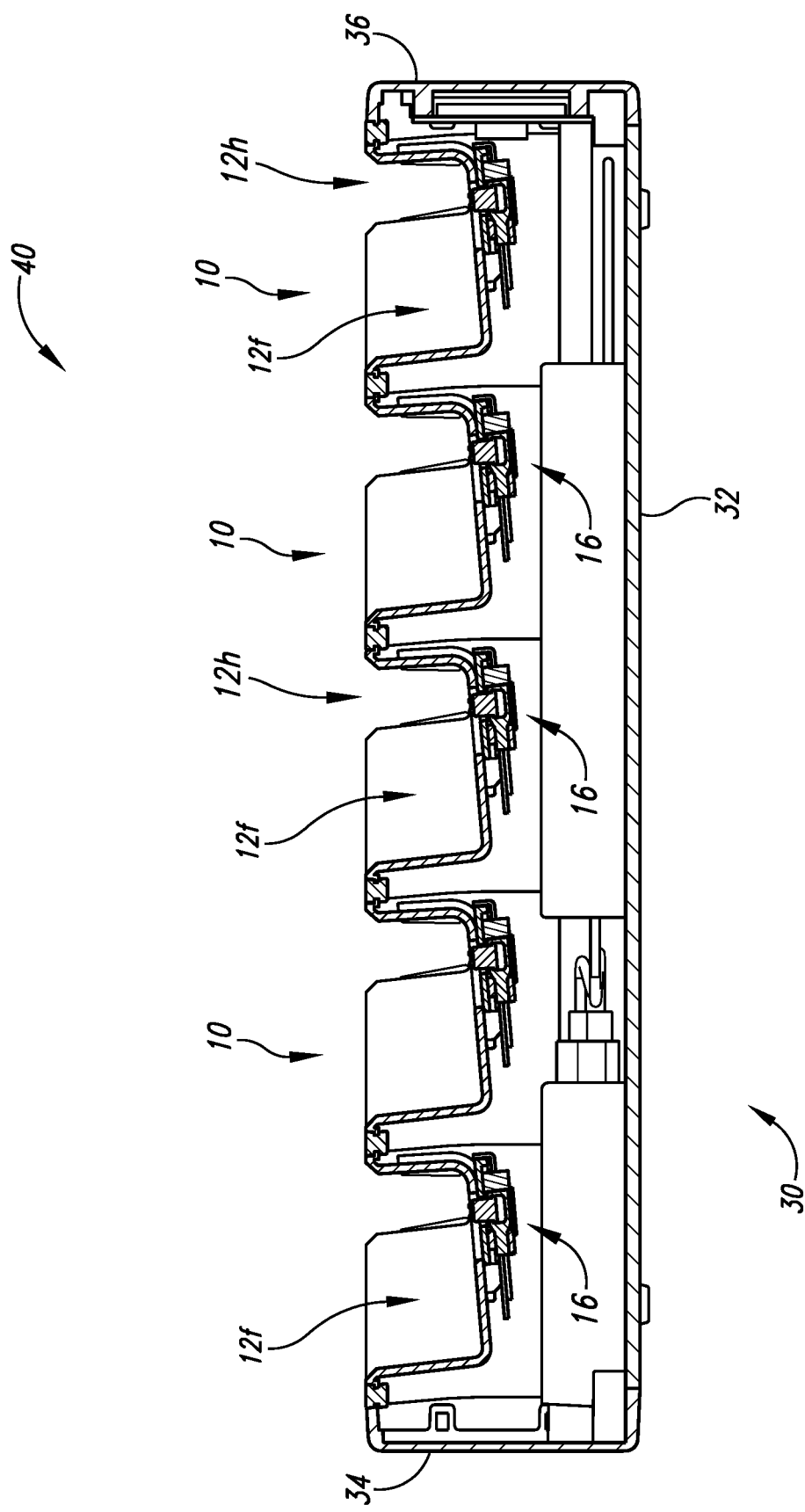
FIG. 21 is a side elevational cross-sectional view of the charging station taken along the 21-21 cutline of FIG. 18.

Turning to FIG. 21, depicted therein is a side elevational cross-sectional view of charger assembly 40 taken along the 21-21 cutline of FIG. 18.

Figure 22:
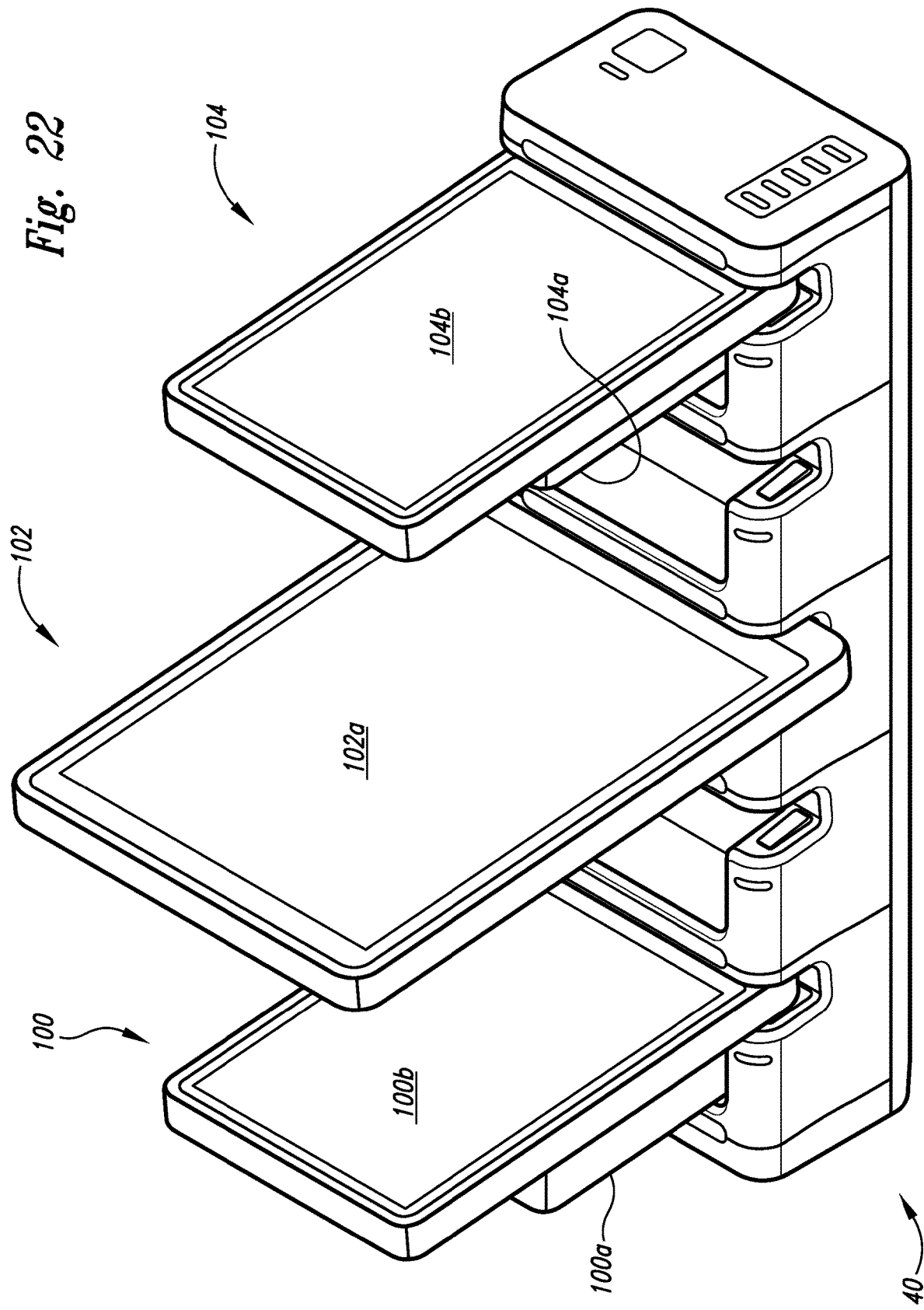
FIG. 22 is a top left perspective view of the charging station of FIG. 15 with the housing of FIG. 14 containing a plurality of the holder assemblies of FIG. 1 to accommodate a plurality of portable electronic devices some of which coupled with accessory backs of various thicknesses.

Turning to FIG. 22, depicted therein is a top left perspective view of charger assembly 40 with housing assembly 30 containing a plurality of holder assembly 10 to retain device 100 with back 100a and display 100b; device 102 with display 102a; and device 104 with back 104a and display 104b.

Figure 23:
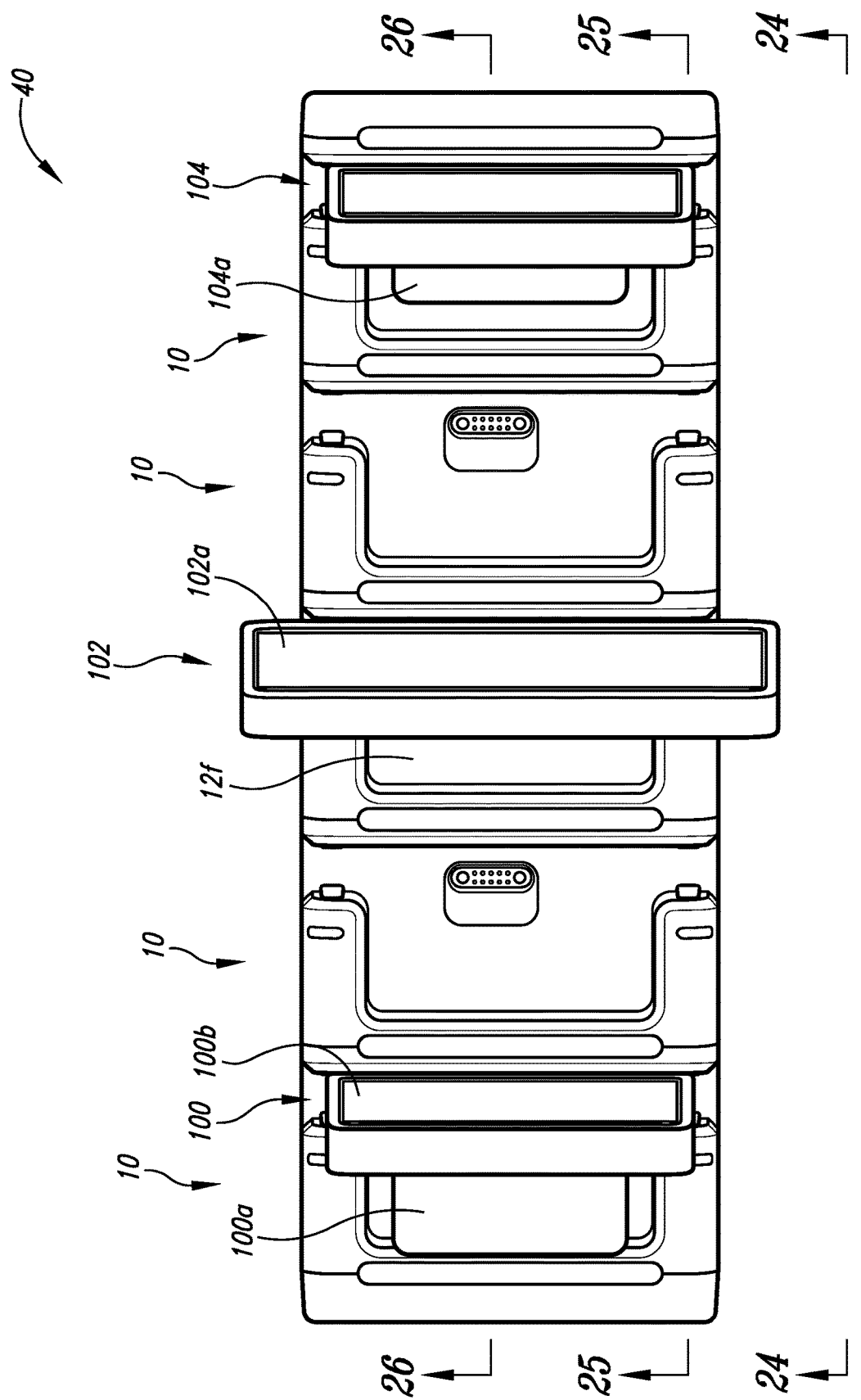
FIG. 23 is a top plan view of the charging station of FIG. 15 with the housing of FIG. 14 containing a plurality of the holder assemblies of FIG. 1 to accommodate a plurality of portable electronic devices some of which coupled with accessory backs of various thicknesses.

Turning to FIG. 23, depicted therein is a top plan view of charger assembly 40 of FIG. 22.

Figure 24:
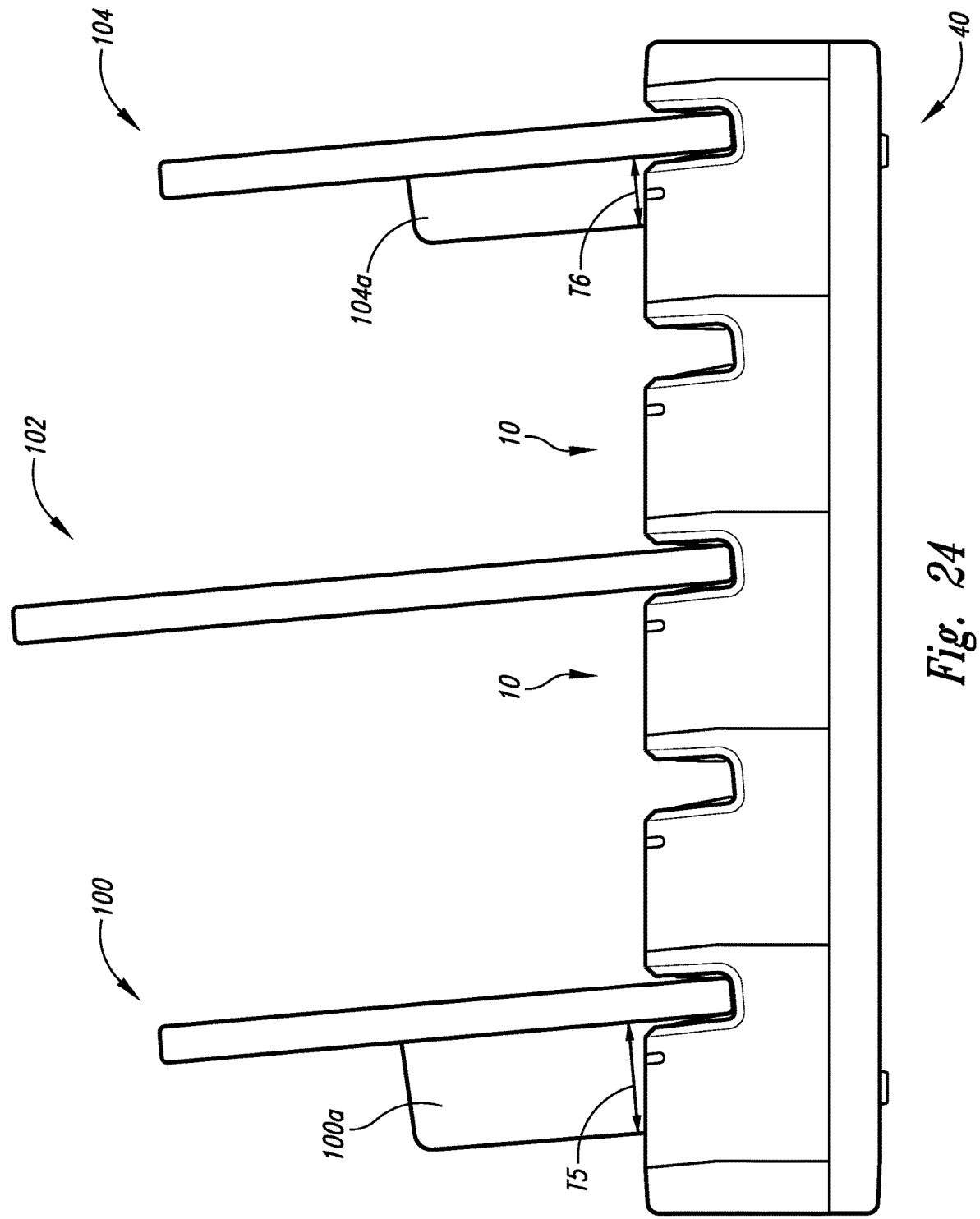
FIG. 24 is a left side-elevational view of the charging station of FIG. 15 with the housing of FIG. 14 containing a plurality of the holder assemblies of FIG. 1 to accommodate a plurality of portable electronic devices some of which coupled with accessory backs of various thicknesses taken along the 24-24 cutline of FIG. 23.

Turning to FIG. 24, depicted therein is a left side-elevational view of charger assembly 40 taken along the 24-24 cutline of FIG. 23 with housing assembly 30 retaining device 100 with back 100a having width dimension T5; and device 104 with back 104a and display 104b having width dimension T6.

Figure 25:
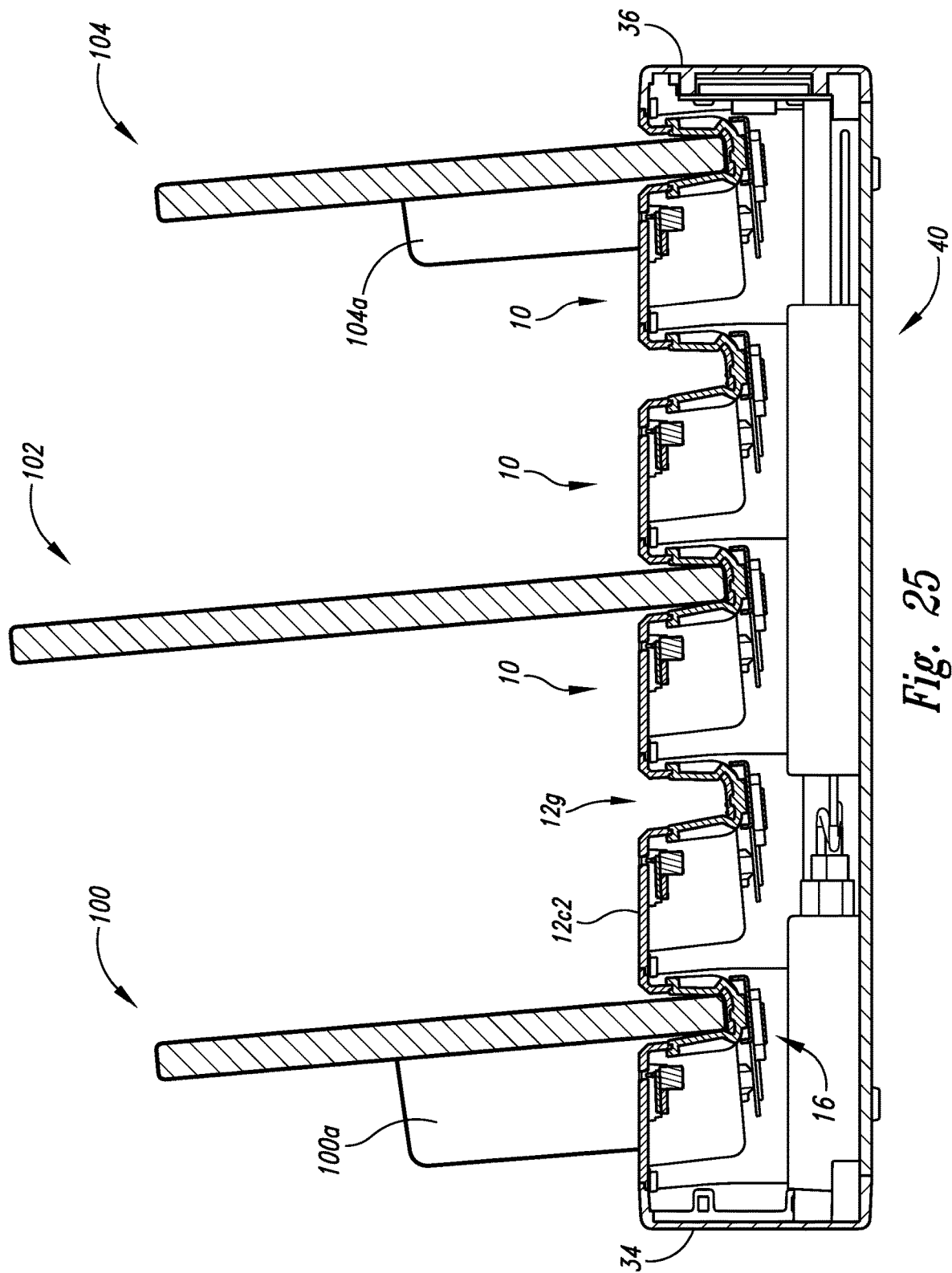
FIG. 25 is a left side-elevational view of the charging station of FIG. 15 with the housing of FIG. 14 containing a plurality of the holder assemblies of FIG. 1 to accommodate a plurality of portable electronic devices some of which coupled with accessory backs of various thicknesses taken along the 25-25 cutline of FIG. 23.

Turning to FIG. 25, depicted therein is a left side-elevational view of charger assembly 40 taken along the 25-25 cutline of FIG. 23.

Figure 26:
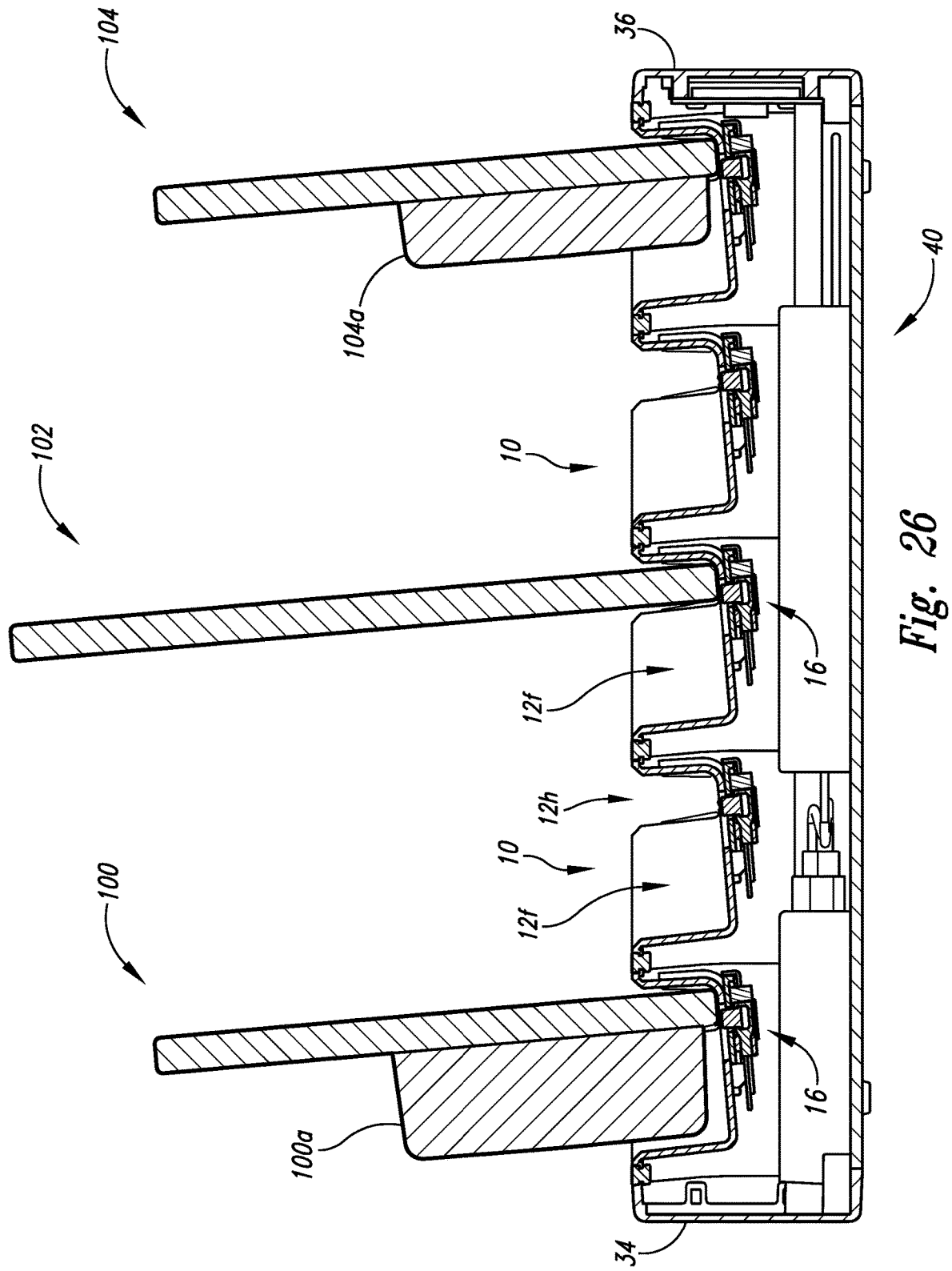
FIG. 26 is a left side-elevational view of the charging station of FIG. 15 with the housing of FIG. 14 containing a plurality of the holder assemblies of FIG. 1 to accommodate a plurality of portable electronic devices some of which coupled with accessory backs of various thicknesses taken along the 26-26 cutline of FIG. 23.

Turning to FIG. 26, depicted therein is a left side-elevational view of charger assembly 40.

Figure 27:
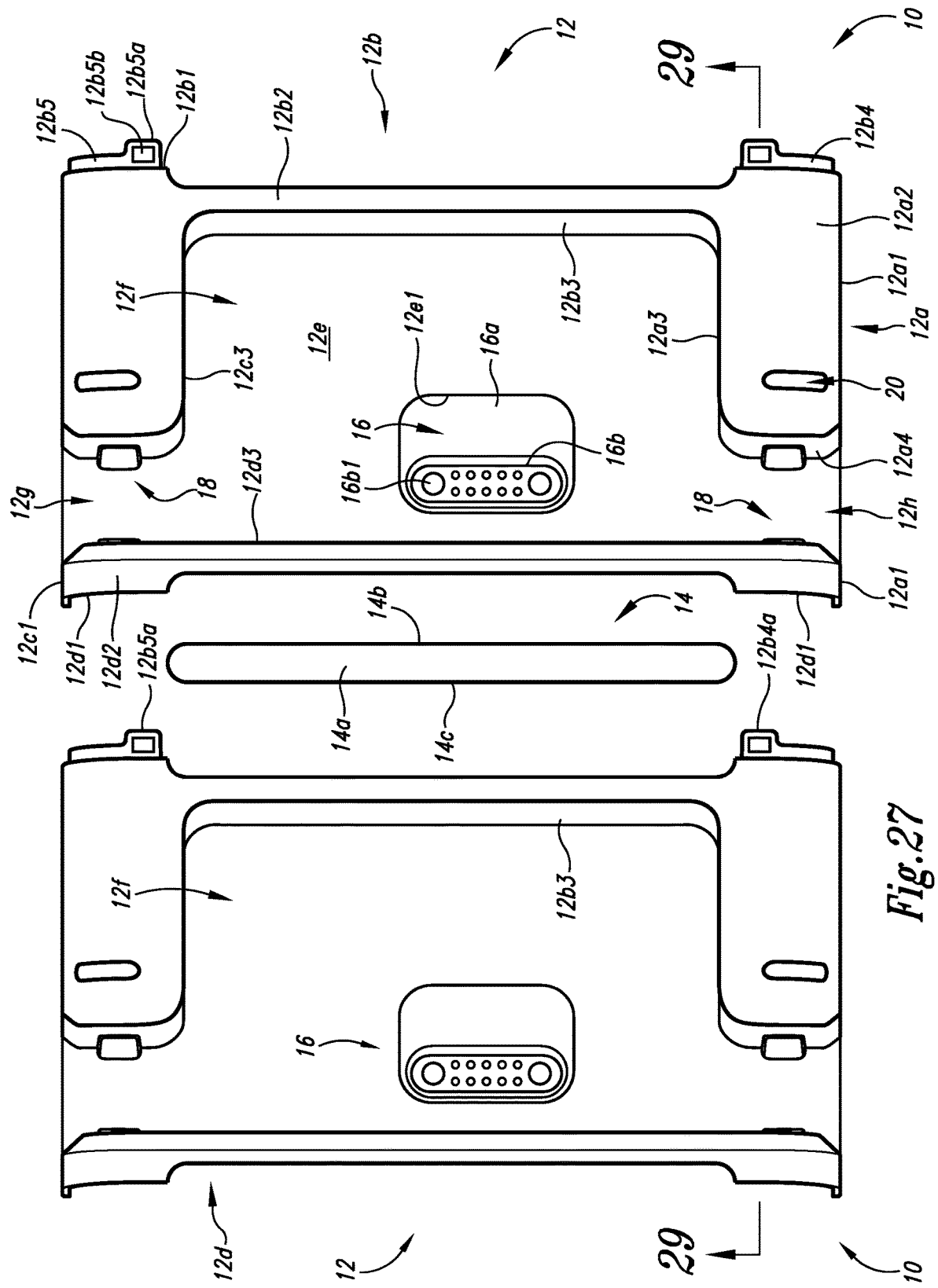
FIG. 27 is a top plan view of uncoupled two holder assemblies of FIG. 1.

Turning to FIG. 27, depicted therein is a top plan view of uncoupled two instances of holder assembly 10.

Figure 28:
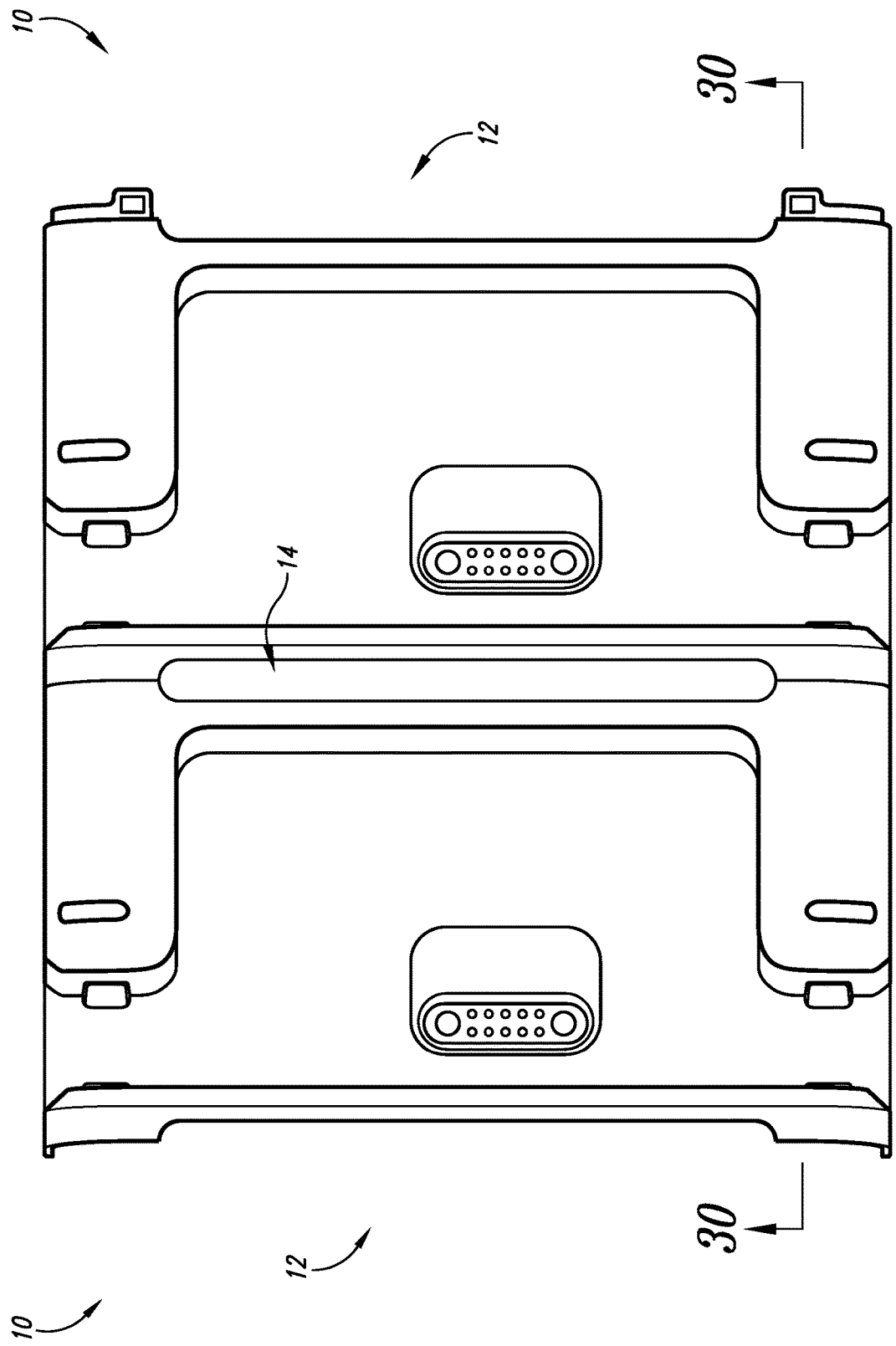
FIG. 28 is a top plan view of coupled two holder assemblies of FIG. 1.

Turning to FIG. 28, depicted therein is a top plan view of coupled two instances of holder assembly 10.

Figure 29:
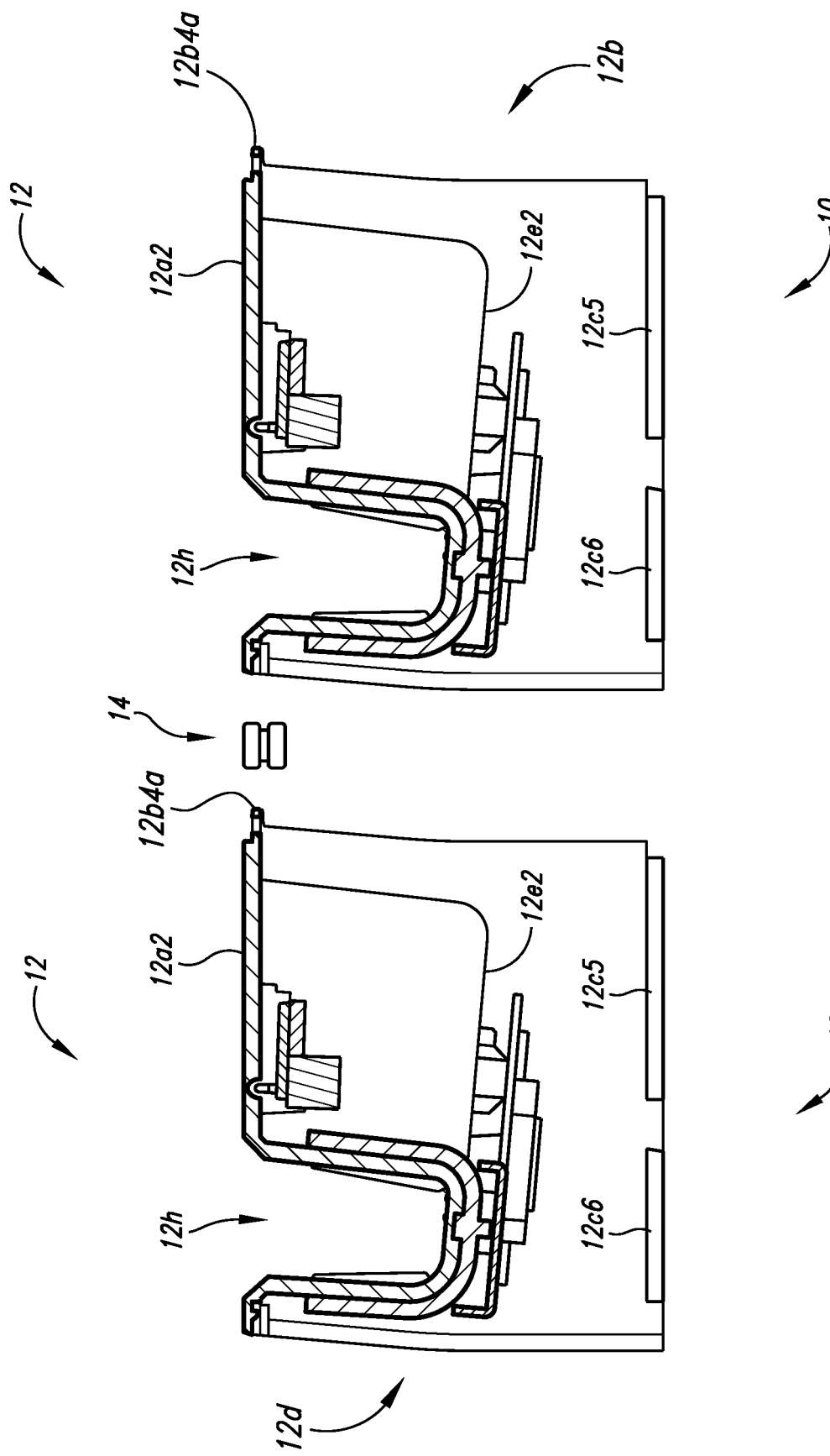
FIG. 29 is an elevational cross-sectional view of uncoupled two holder assemblies of FIG. 1 taken along the 29-29 cutline of FIG. 27.

Turning to FIG. 29, depicted therein is an elevational cross-sectional view of uncoupled two instances of holder assembly 10 taken along the 29-29 cutline of FIG. 27.

Figure 30:
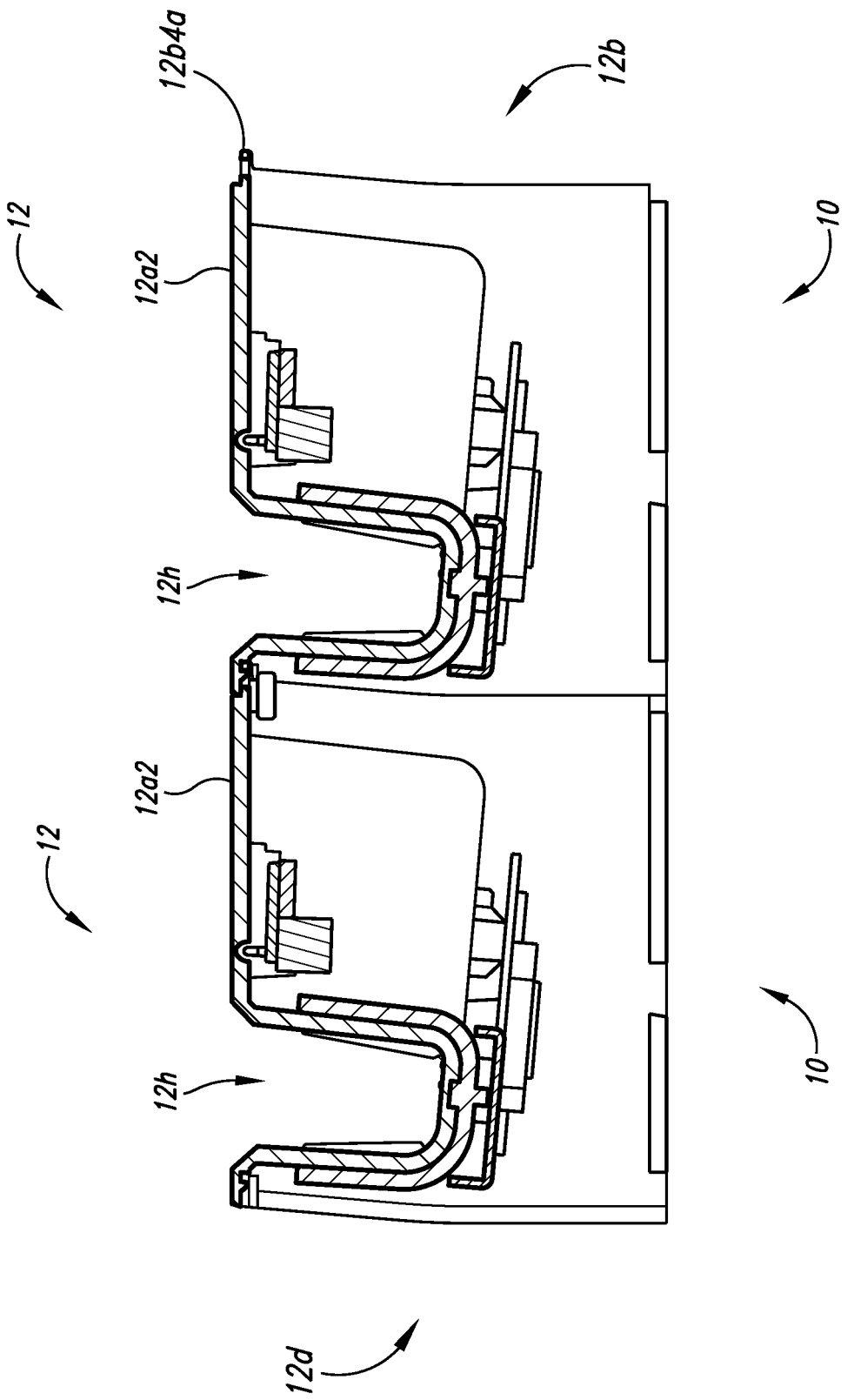
FIG. 30 is an elevational cross-sectional view of uncoupled two holder assemblies of FIG. 1 taken along the 30-30 cutline of FIG. 28.

Turning to FIG. 30, depicted therein is an elevational cross-sectional view of uncoupled two instances of holder assembly 10 taken along the 30-30 cutline of FIG. 28.

Figure 31:
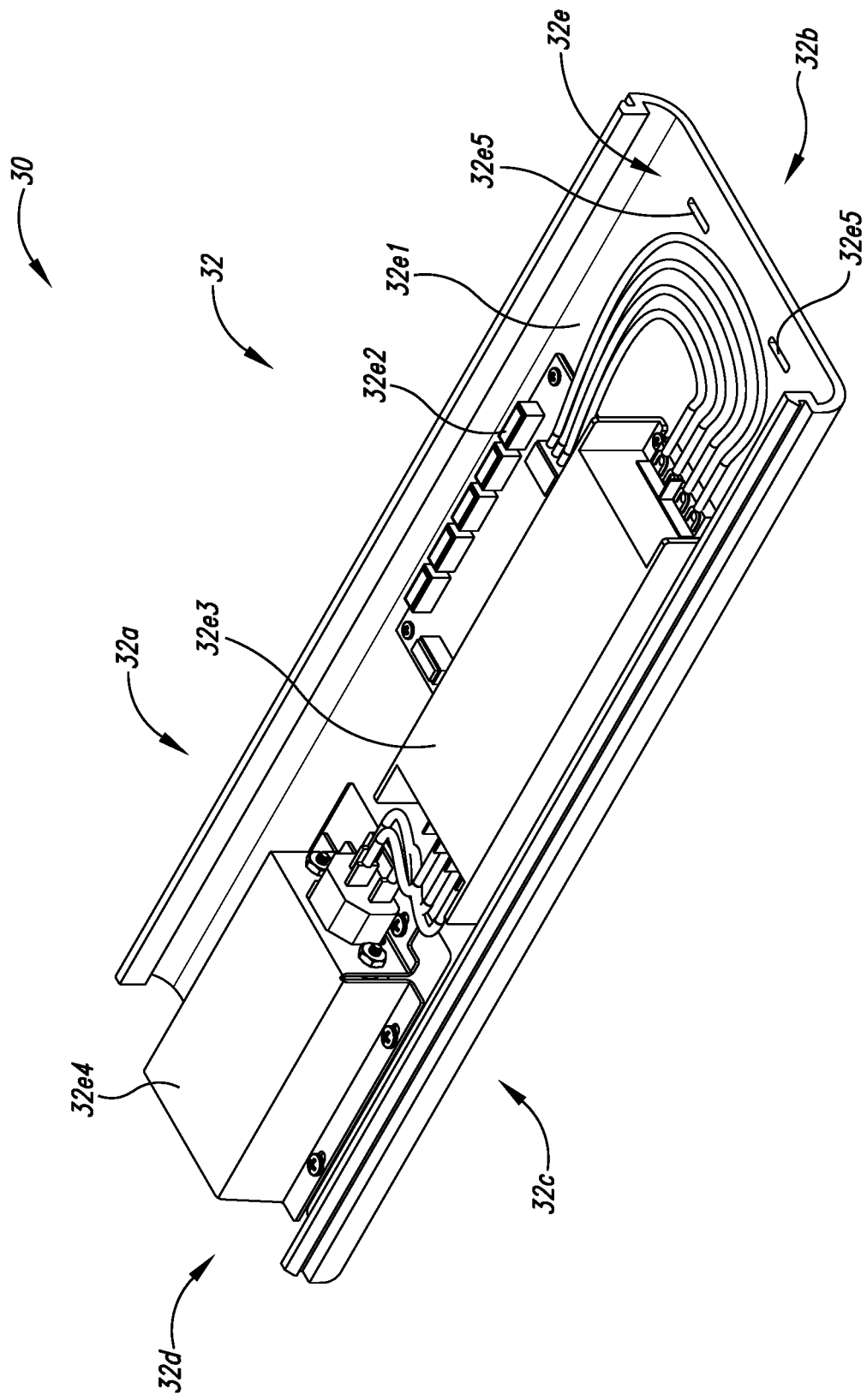
FIG. 31 is a left top front perspective view of the base of the housing of FIG. 16.

Turning to FIG. 31, depicted therein is a left front perspective view of elongated base assembly 32. Depicted implementation of elongated base assembly 32 is shown to include side assembly 32a, end 32b, side assembly 32c, end 32d, base 32e with interior 32e1, electronic portion 32e2, electronic portion 32e3, electronic portion 32e4, and aperture 32e5.

FIG. 32, depicted therein is an elevational front end view of elongated base assembly 32. Depicted implementation of elongated base assembly 32 is shown to include curvilinear portion 32a1, end portion 32b1, curvilinear portion 32c1, exterior 32e6, and foot portion 32e7.

Turning to FIG. 33, depicted therein is an elevational rear end view of elongated base assembly 32. Depicted implementation of elongated base assembly 32 is shown to include end portion 32d1.

Figure 34:
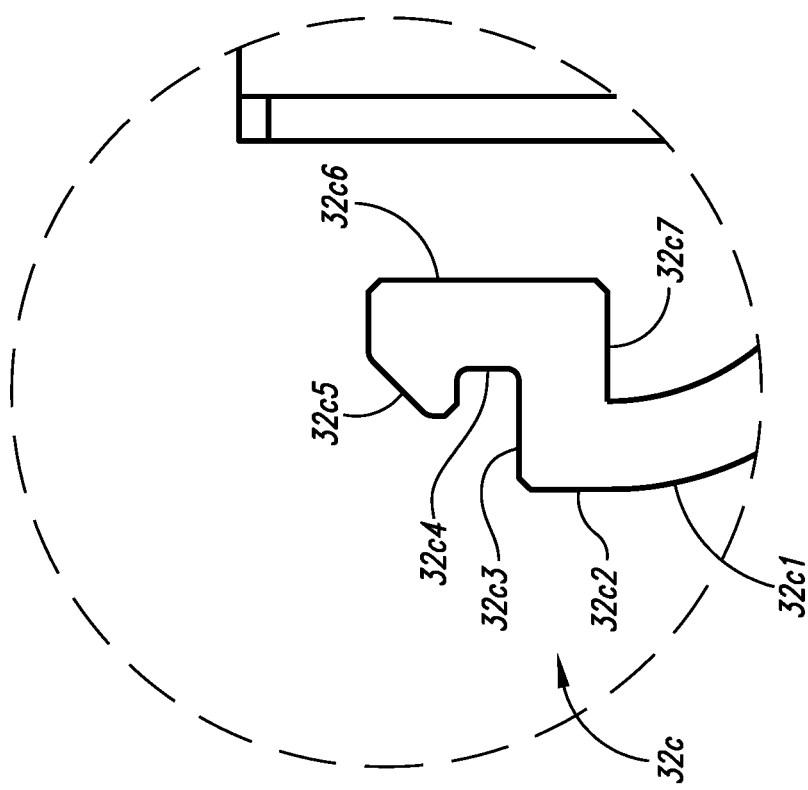
FIG. 34 is an elevational front end view of the base of FIG. 31 taken along the dashed circle labeled "34" of FIG. 32.

Turning to FIG. 34, depicted therein is an elevational front end view of elongated base assembly 32 taken along the dashed circle labeled "34" of FIG. 32. Depicted implementation of elongated base assembly 32 is shown to include exterior vertical portion 32c2, horizontal exterior portion 32c3, exterior groove 32c4, beveled portion 32c5, interior vertical portion 32c6, and interior horizontal portion 32c7.

Figure 35:
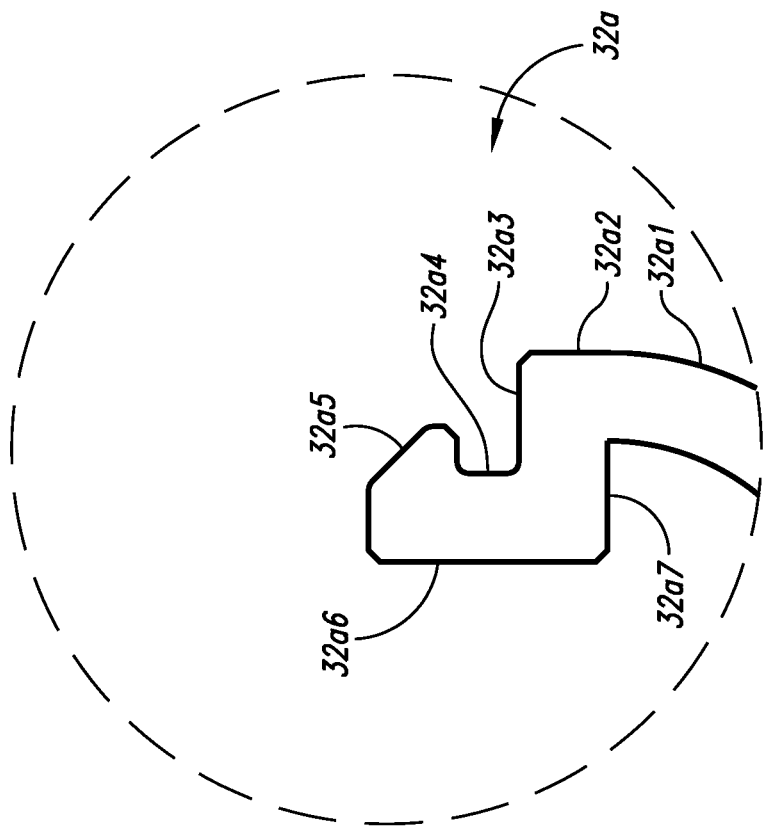
FIG. 35 is an enlarged elevational rear end view of the base of FIG. 31 taken along the dashed circle labeled "35" of FIG. 32.

Turning to FIG. 35, depicted therein is an enlarged elevational rear end view of elongated base assembly 32 taken along the dashed circle labeled "34" of FIG. 32. Depicted implementation of elongated base assembly 32 is shown to include exterior vertical portion 32a2, horizontal exterior portion 32a3, exterior groove 32a4, beveled portion 32a5, and interior vertical portion 32a6, and interior horizontal portion 32a7.

Figure 36:
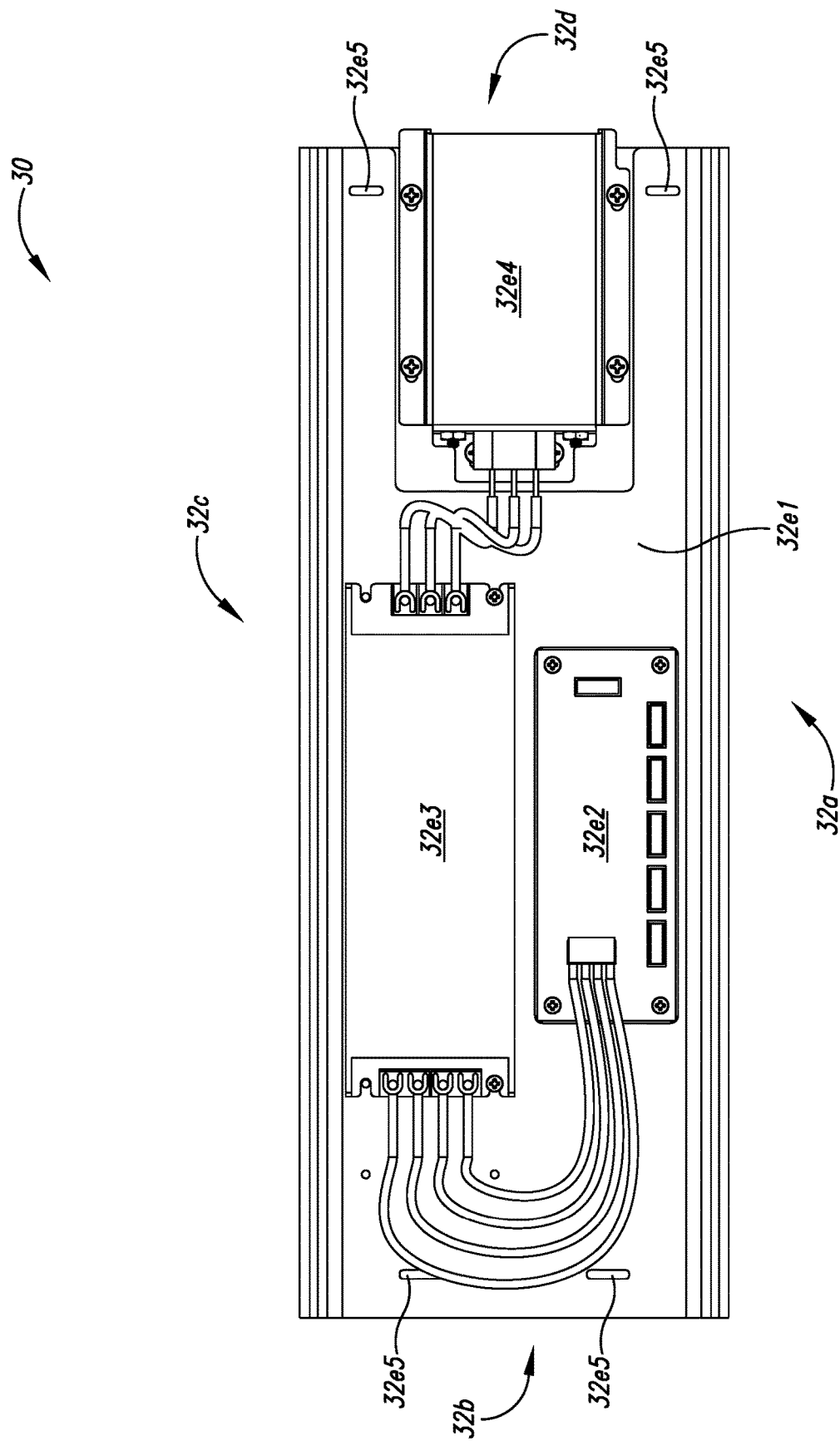
FIG. 36 is a top plan view of the base of FIG. 31.

Turning to FIG. 36, depicted therein is a top plan view of elongated base assembly 32.

Figure 37:
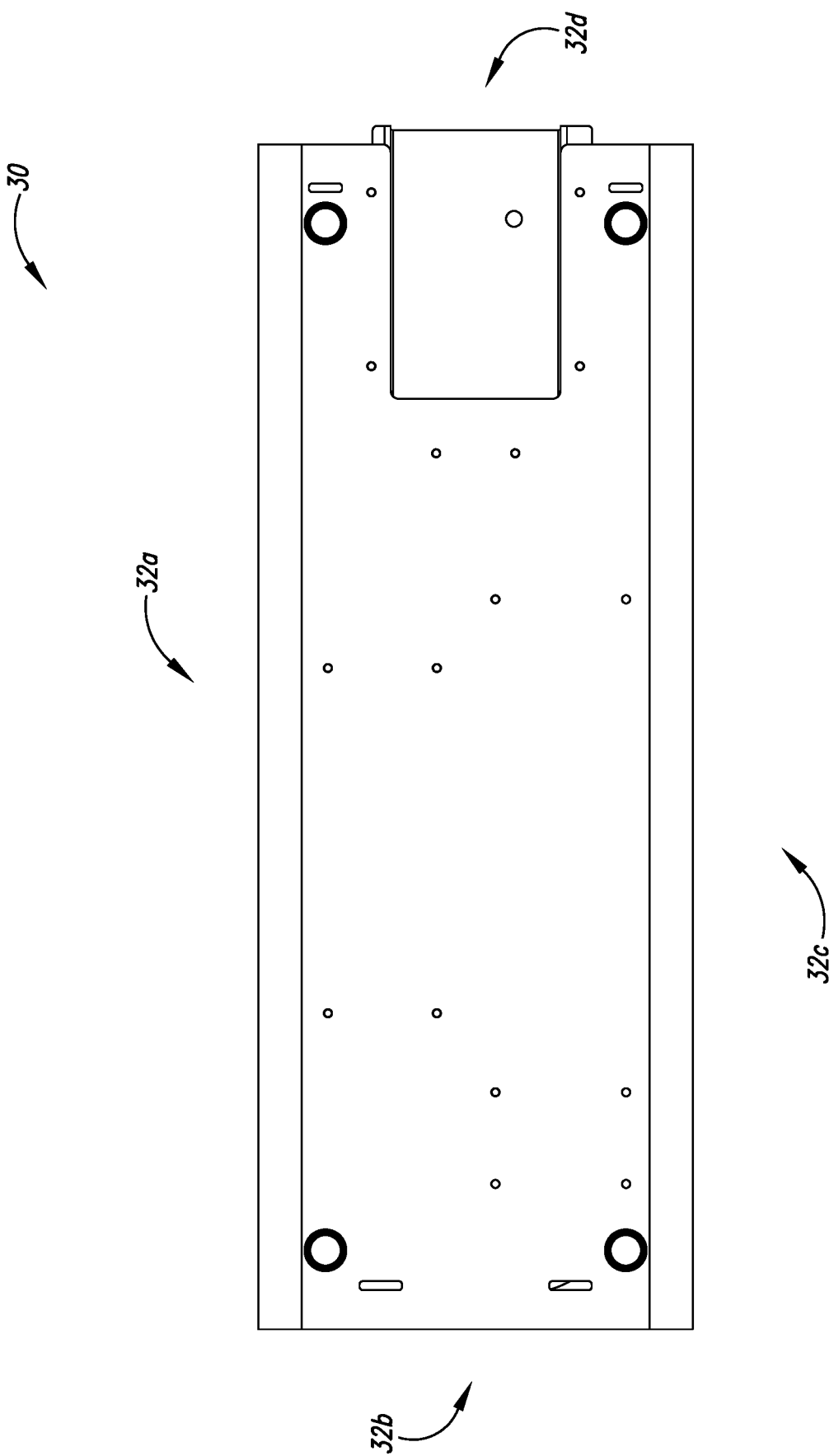
FIG. 37 is a bottom plan view of the base of FIG. 31.

Turning to FIG. 37, depicted therein is a bottom plan view of elongated base assembly 32.

Turning to FIG. 38, depicted therein is a side-elevational view of elongated base assembly 32.

Turning to FIG. 39, depicted therein is a side-elevational view of elongated base assembly 32.

Figure 40:
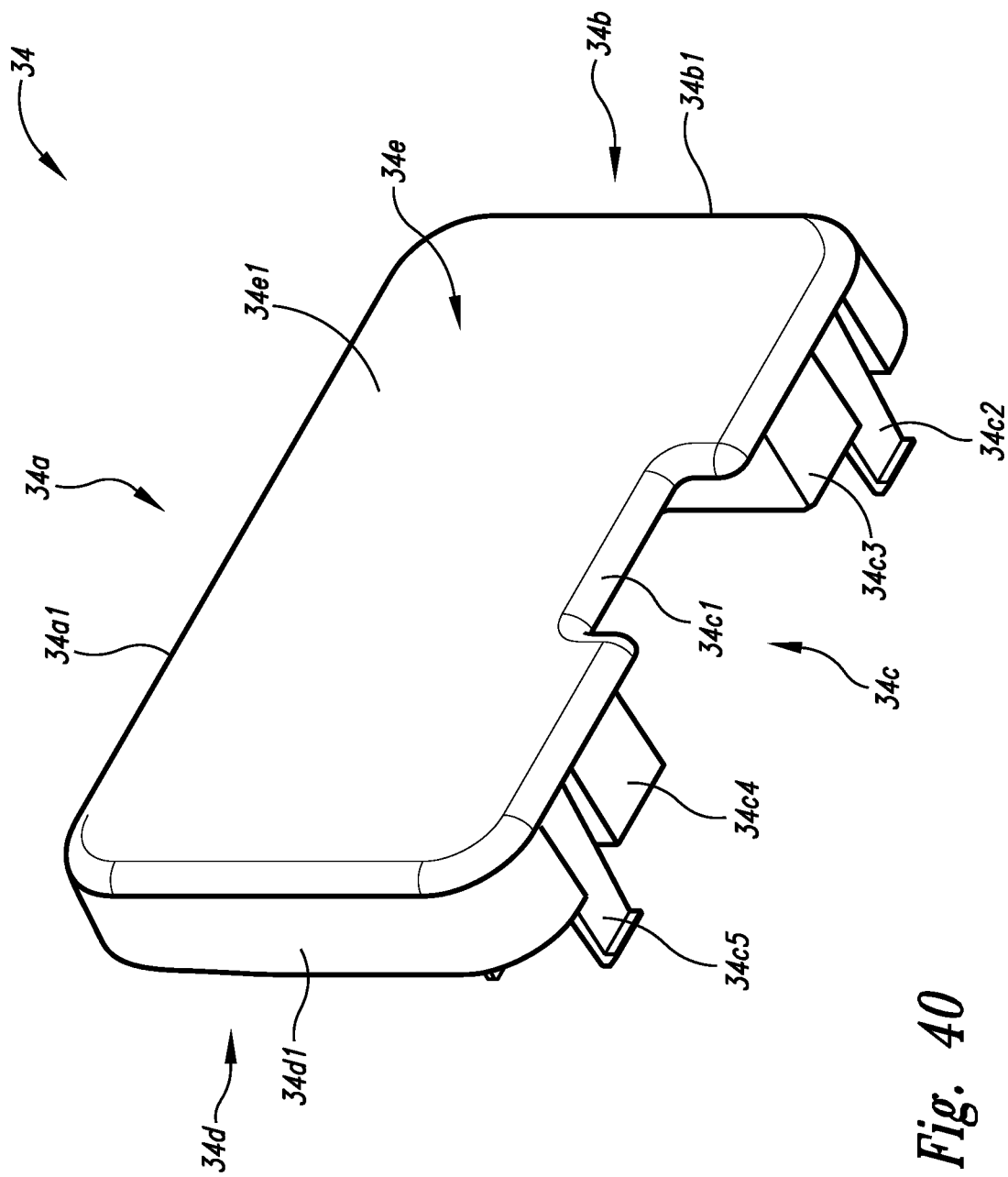
FIG. 40 is a left front perspective view of the rear end plate of the base of FIG. 16 coupled with the clip assembly of FIG. 1.

Turning to FIG. 40, depicted therein is a left front perspective view of rear end plate 34 coupled with clip assembly 14. Depicted implementation of rear end plate 34 is shown to include side 34a with side exterior 34a1, side 34b with side exterior 34b1, side 34c with notch 34c1, arm member 34c2, floor portion 34c3, floor portion 34c4, and arm member 34c5, side 34d with side exterior 34d1, and base 34e with side exterior 34e1.

Figure 41:
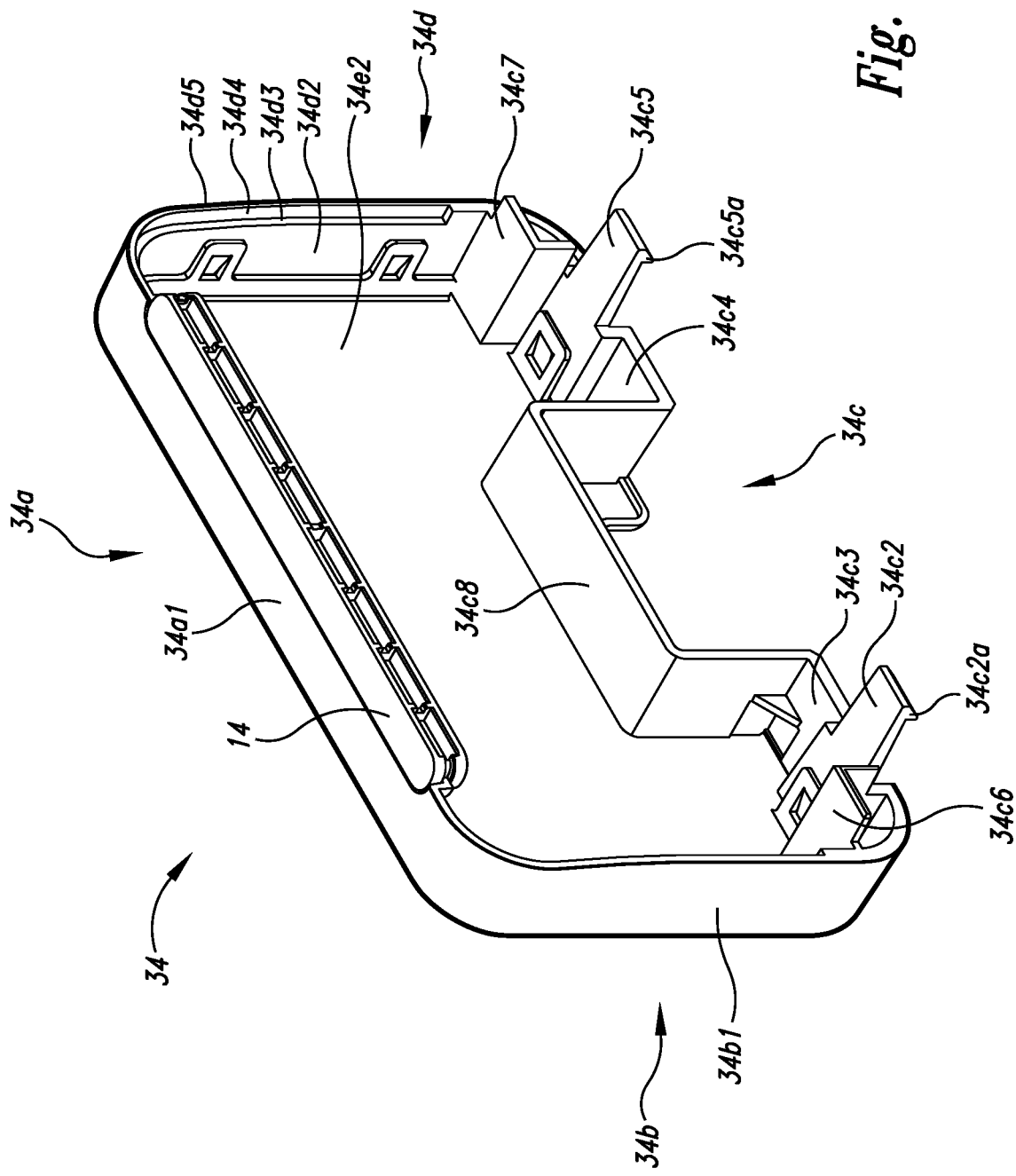
FIG. 41 is a rear right perspective view of the rear end plate coupled with the clip assembly of FIG. 40.

Turning to FIG. 41, depicted therein is a rear right perspective view of rear end plate 34 coupled with clip assembly 14. Depicted implementation of rear end plate 34 is shown to include barb 34c2a, barb 34c5a, ledge portion 34c6, ledge portion 34c7, frame portion 34c8, side 34d2, edge portion 34d3, side 34d4, edge portion 34d5, and interior 34e2.

Turning to FIG. 42, depicted therein is a top plan view of rear end plate 34 coupled with clip assembly 14.

Turning to FIG. 43, depicted therein is a bottom plan view of rear end plate 34.

Turning to FIG. 44, depicted therein is a side-elevational view of rear end plate 34 coupled with the clip assembly 14.

Turning to FIG. 45, depicted therein is a side-elevational view of rear end plate 34 coupled with clip assembly 14.

Figure 46:
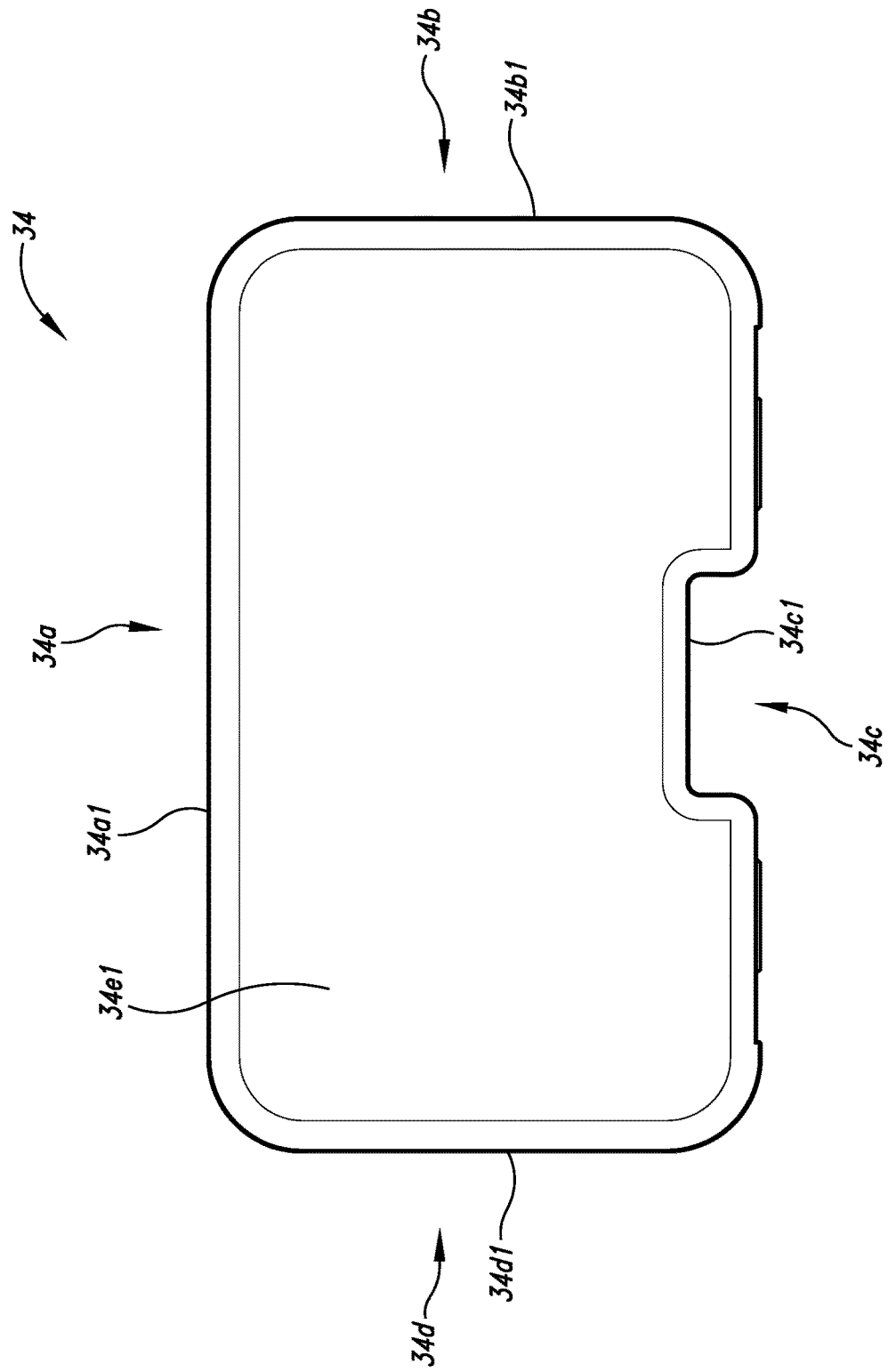
FIG. 46 is an external elevational view of the rear end plate of FIG. 40.

Turning to FIG. 46, depicted therein is an external elevational view of rear end plate 34.

Figure 47:
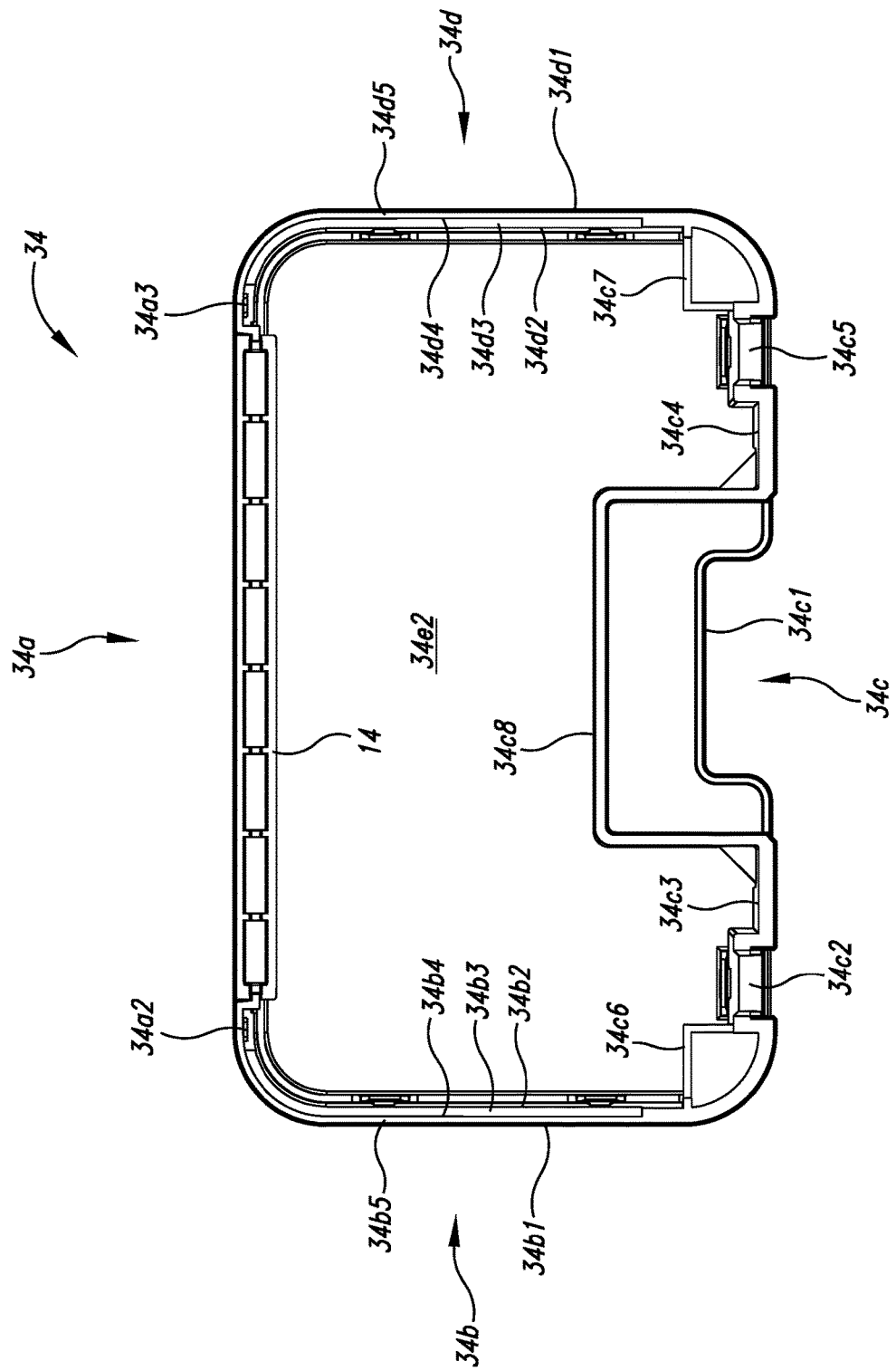
FIG. 47 is an internal elevational view of the rear end plate coupled with the clip assembly of FIG. 40.

Turning to FIG. 47, depicted therein is an internal elevational view of rear end plate 34 coupled with clip assembly 14. Depicted implementation of rear end plate 34 is shown to include protrusion 34a2, protrusion 34a3, side 34b2, edge portion 34b3, side 34b4, and edge portion 34b5.

Figure 48:
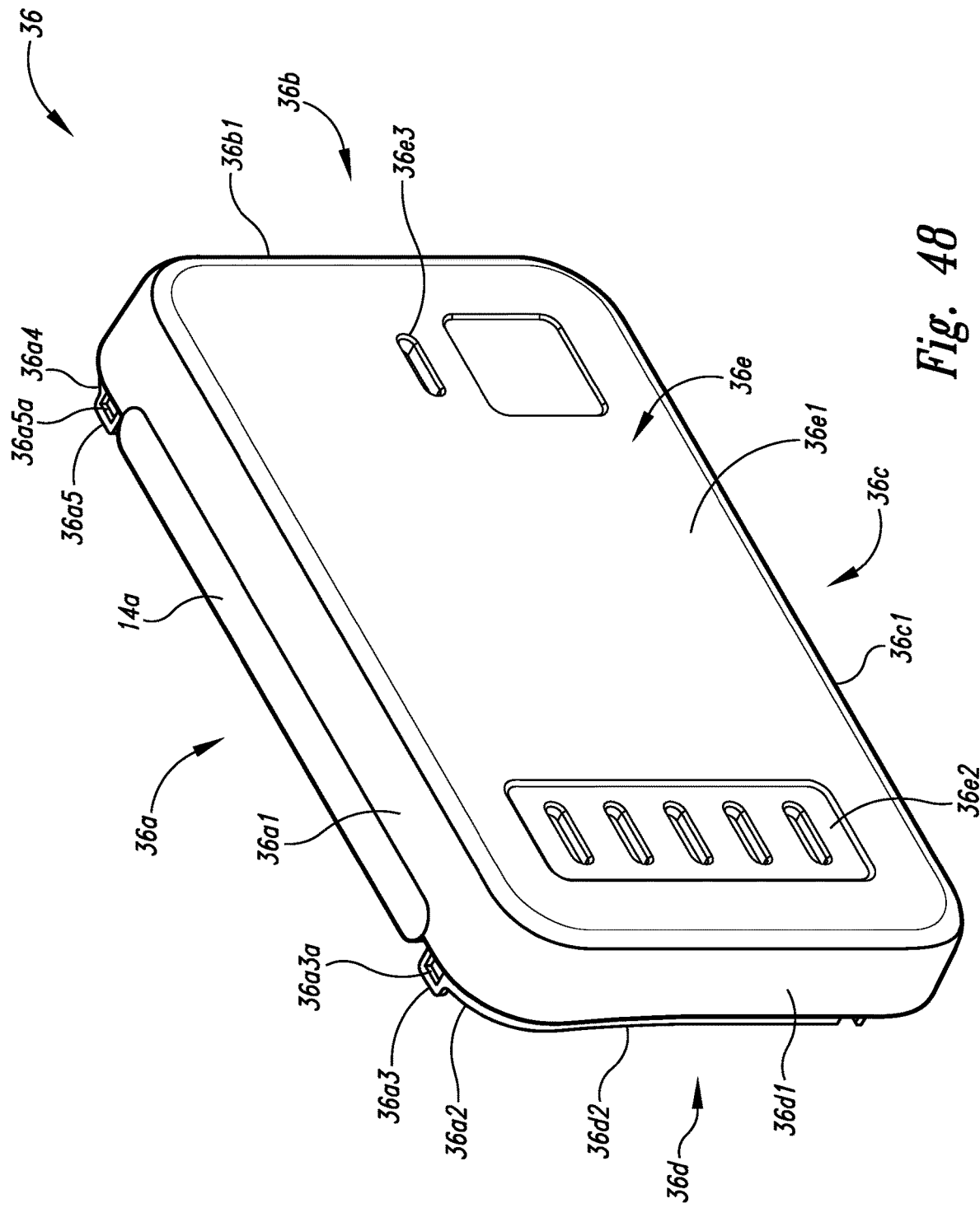
FIG. 48 is a left front perspective view of the front end plate of the base of FIG. 16 coupled with the clip assembly of FIG. 1.

Turning to FIG. 48, depicted therein is a left front perspective view of front end plate 36 coupled with clip assembly 14. Depicted implementation of front end plate 36 is shown to include side 36a, side exterior 36a1, edge portion 36a2, protrusion 36a3, with aperture 36a3a, edge portion 36a4, protrusion 36a5 with aperture 36a5a, side 36b, side exterior 36b1, side 36c, with side exterior 36c1, side 36d, with side exterior 36d1, edge portion 36d2, base 36e with side exterior 36e1, indicator assembly 36e2, and indicator 36e3.

Figure 49:
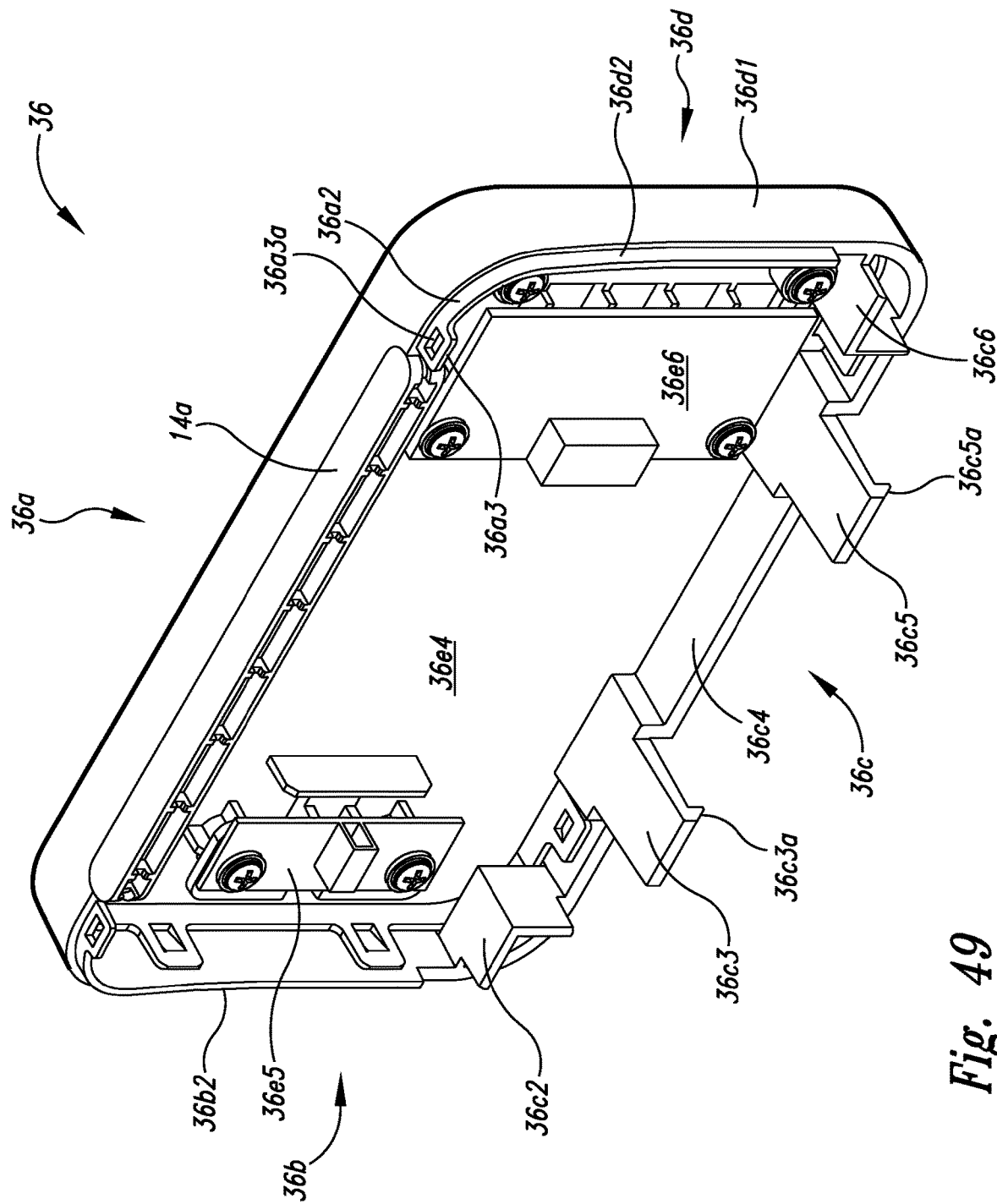
FIG. 49 is a left rear perspective view of the front end plate coupled with the clip assembly of FIG. 48.

Turning to FIG. 49, depicted therein is a left rear perspective view of front end plate 36 coupled with clip assembly 14. Depicted implementation of front end plate 36 is shown to include edge portion 36b2, ledge portion 36c2, arm member 36c3, barb 36c3a, interior 36c4, arm member 36c5, barb 36c5a, ledge 36c6, interior 36e4, indicator assembly 36e5, and indicator assembly 36e6.

Turning to FIG. 50, depicted therein is a top plan view of front end plate 36 coupled with clip assembly 14.

Turning to FIG. 51, depicted therein is a bottom plan view of front end plate 36 coupled with clip assembly 14.

Figure 52:
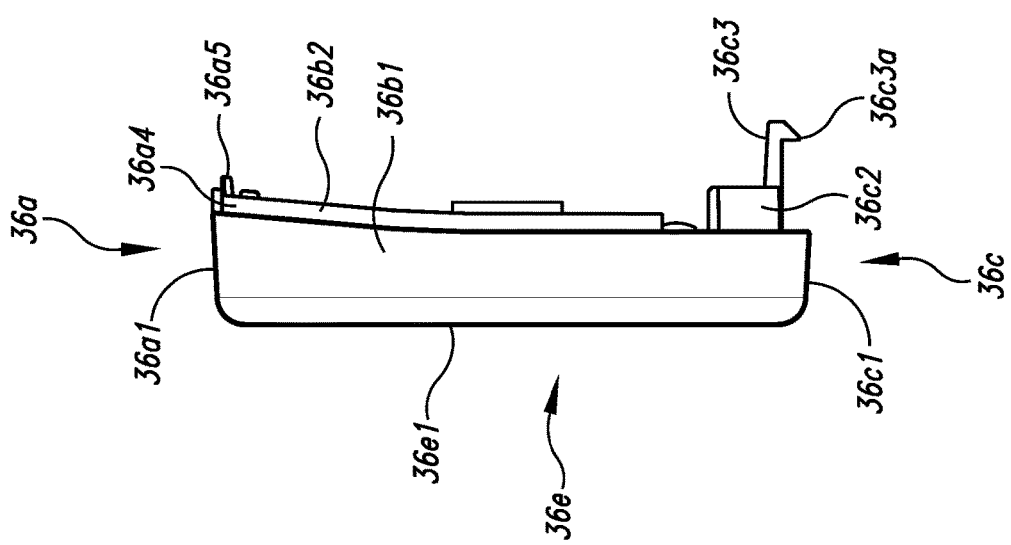
FIG. 52 is a side-elevational view of the front end plate of FIG. 48.

Turning to FIG. 52, depicted therein is a side-elevational view of front end plate 36.

Figure 53:
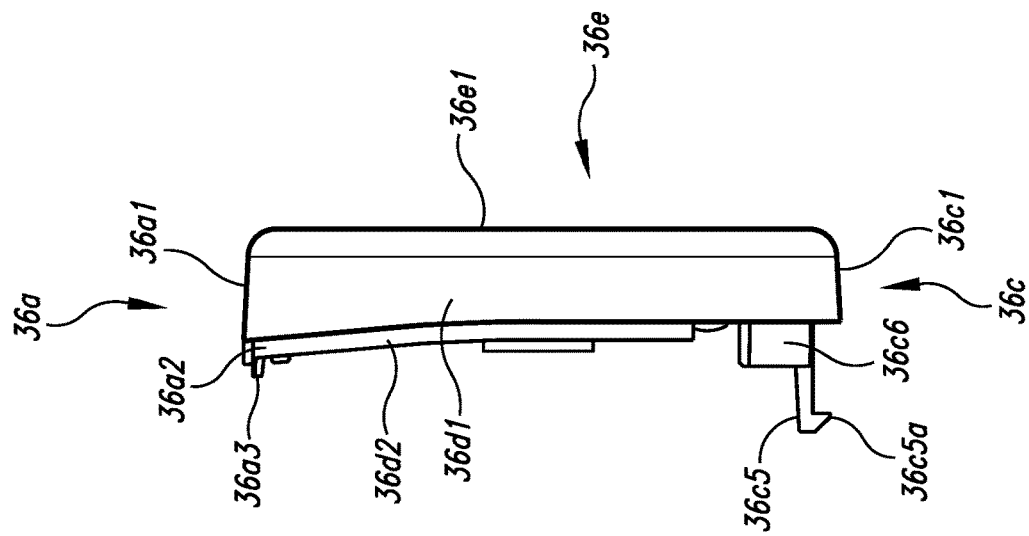
FIG. 53 is a side-elevational view of the front end plate of FIG. 48.

Turning to FIG. 53, depicted therein is a side-elevational view of front end plate 36.

Figure 54:
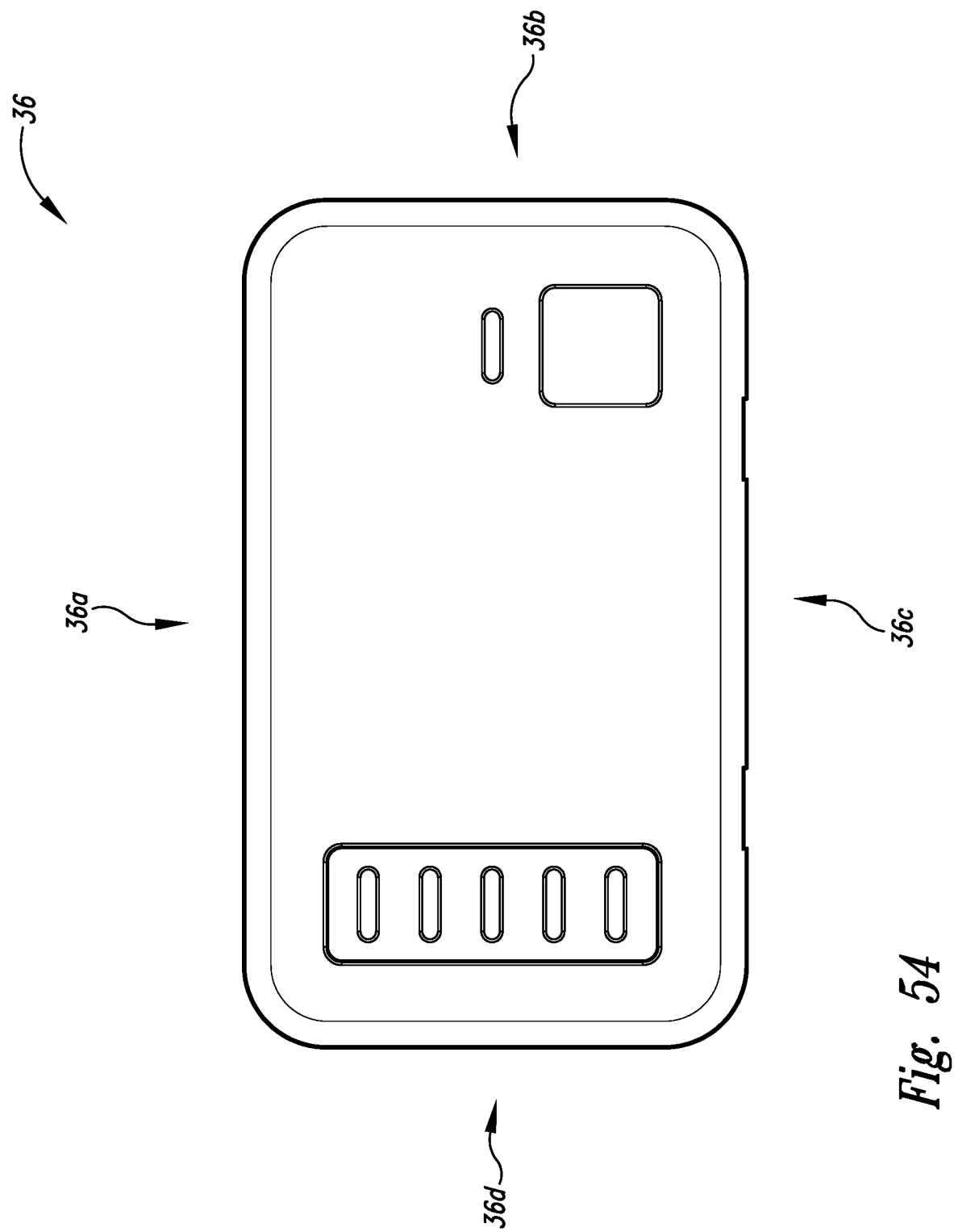
FIG. 54 is an external elevational view of the front end plate of FIG. 48.

Turning to FIG. 54, depicted therein is an external elevational view of front end plate 36.

Figure 55:
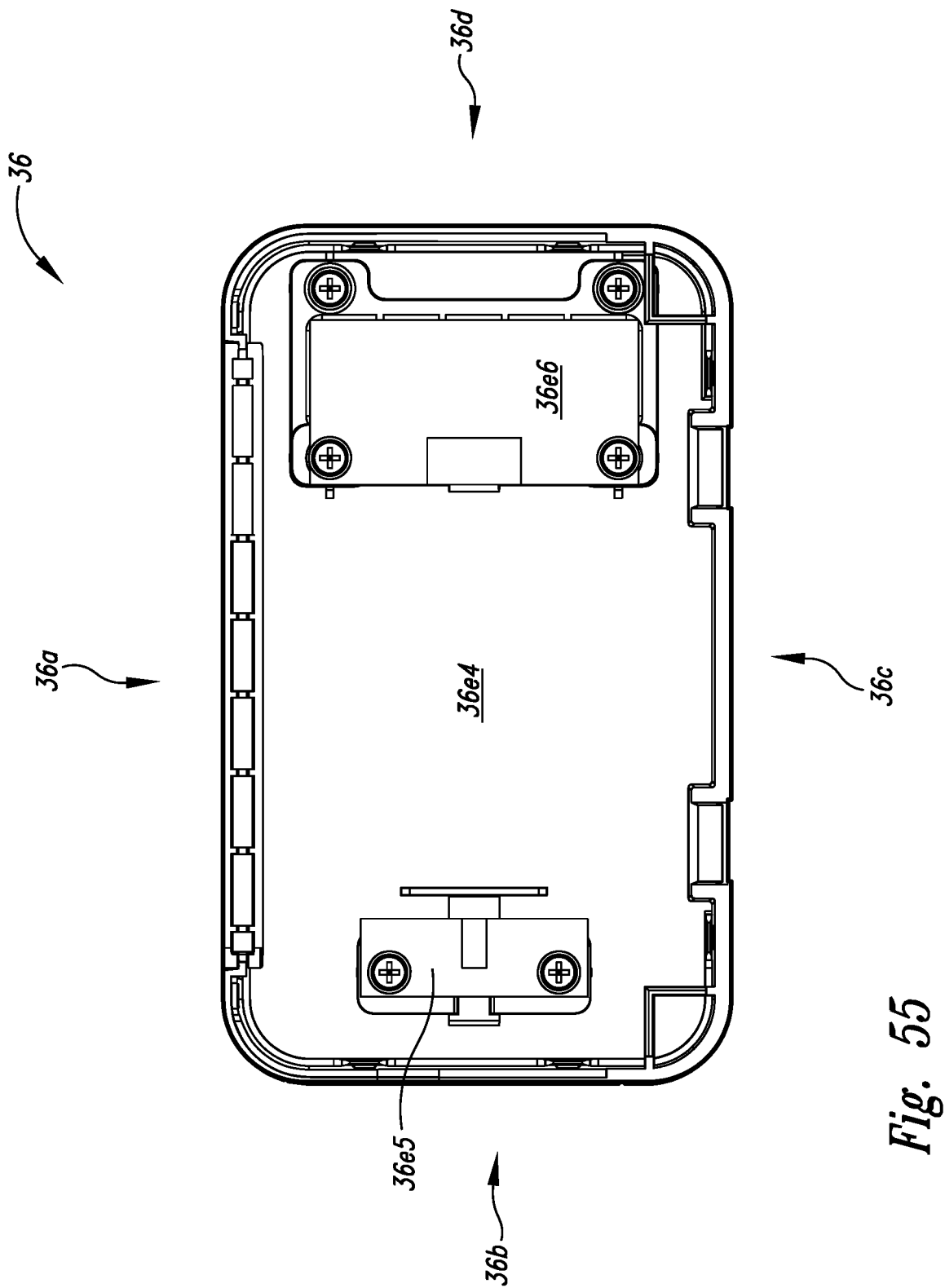
FIG. 55 is an internal elevational view of the front end plate of FIG. 48.

Turning to FIG. 55, depicted therein is an internal elevational view of front end plate 36.

Figure 56:
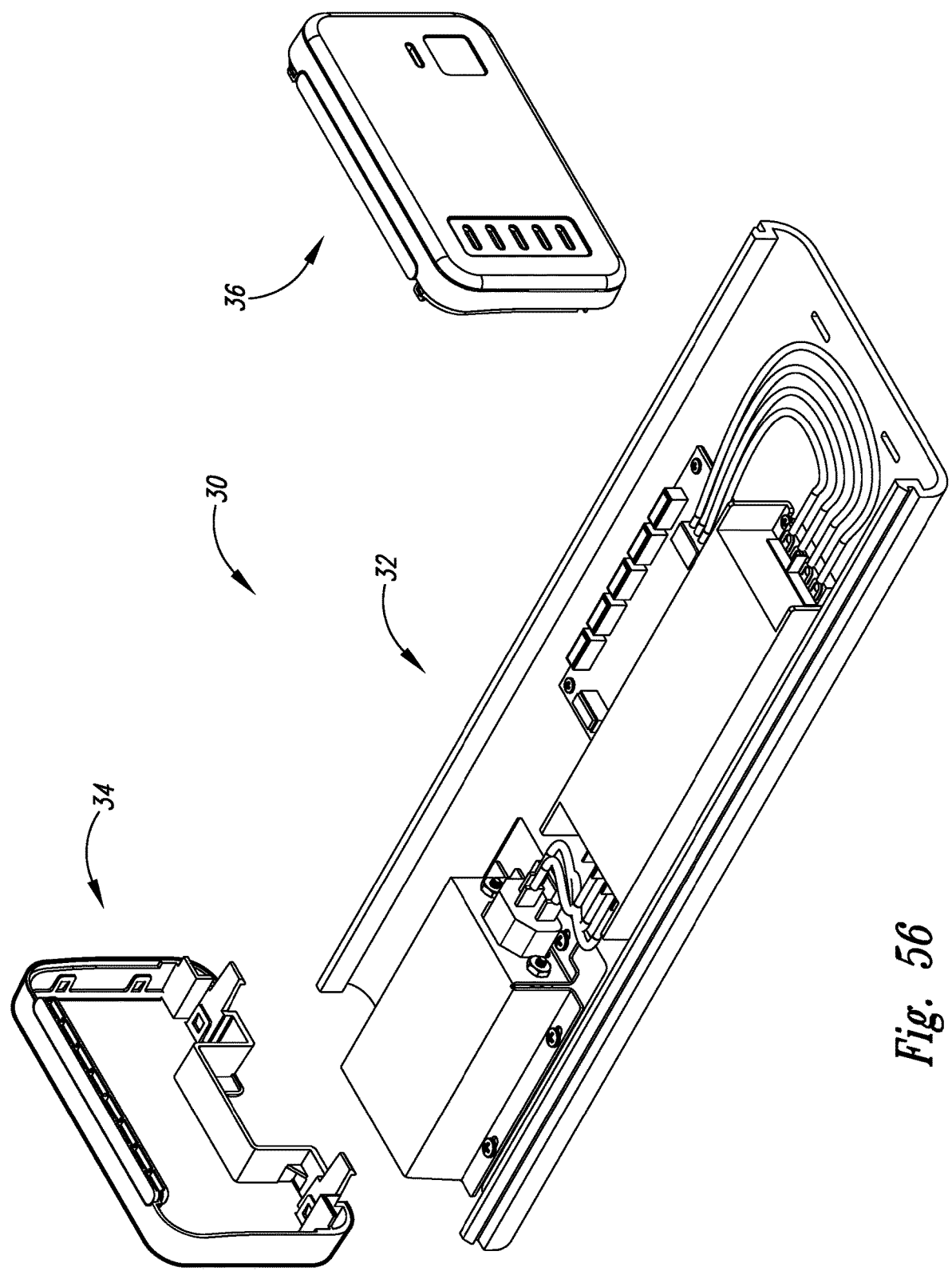
FIG. 56 is an exploded left top front perspective view of the housing of FIG. 16 for the holder assembly of FIG. 1.

Turning to FIG. 56, depicted therein is an exploded left top front perspective view of housing assembly 30.

Figure 57:
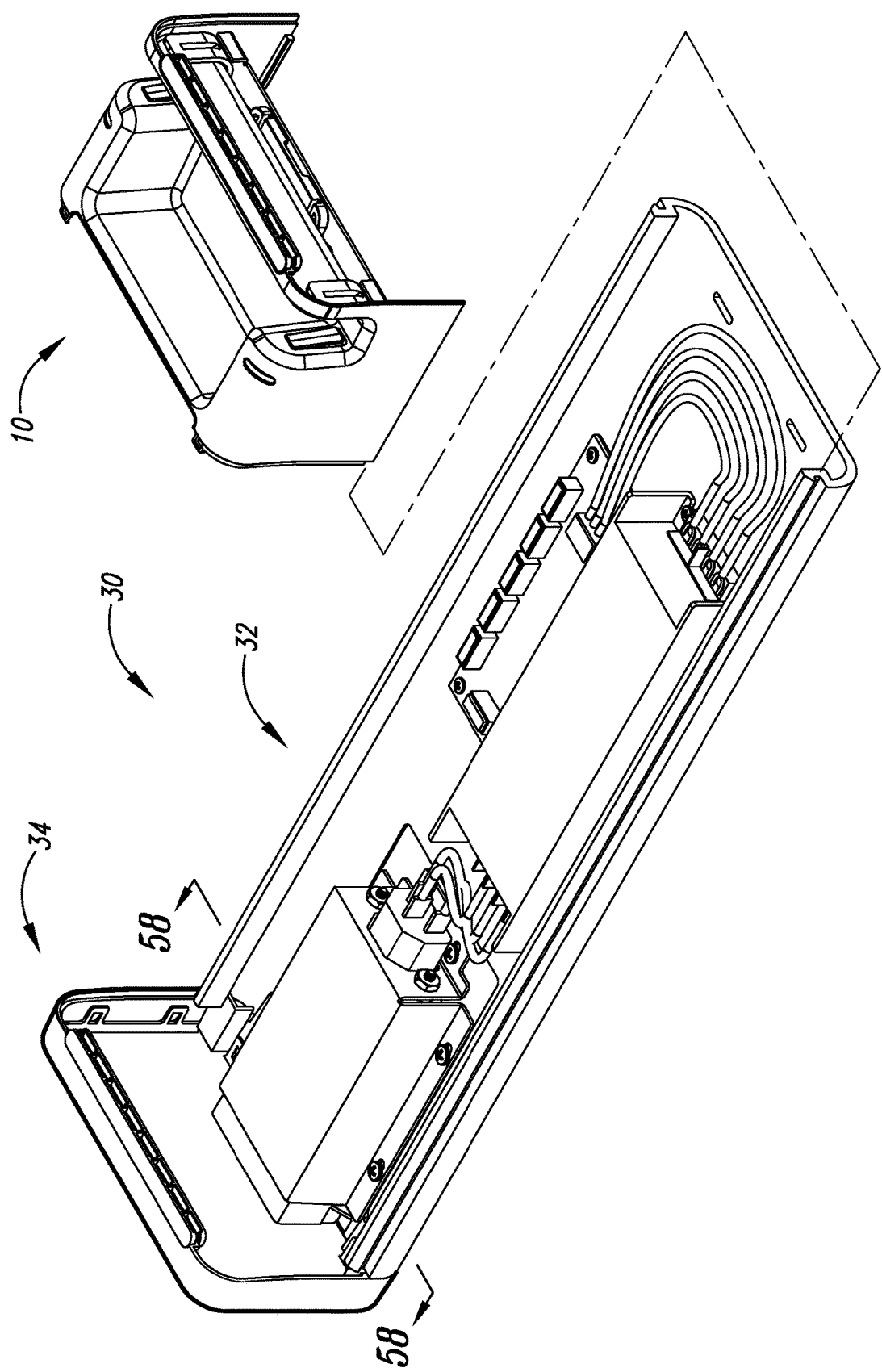
FIG. 57 is a left top front perspective view of a partial portion of the housing of FIG. 16 uncoupled from the holder assembly of FIG. 1.

Turning to FIG. 57, depicted therein is a left top front perspective view of a partial portion of housing assembly 30 uncoupled from the holder assembly 10.

Figure 58:
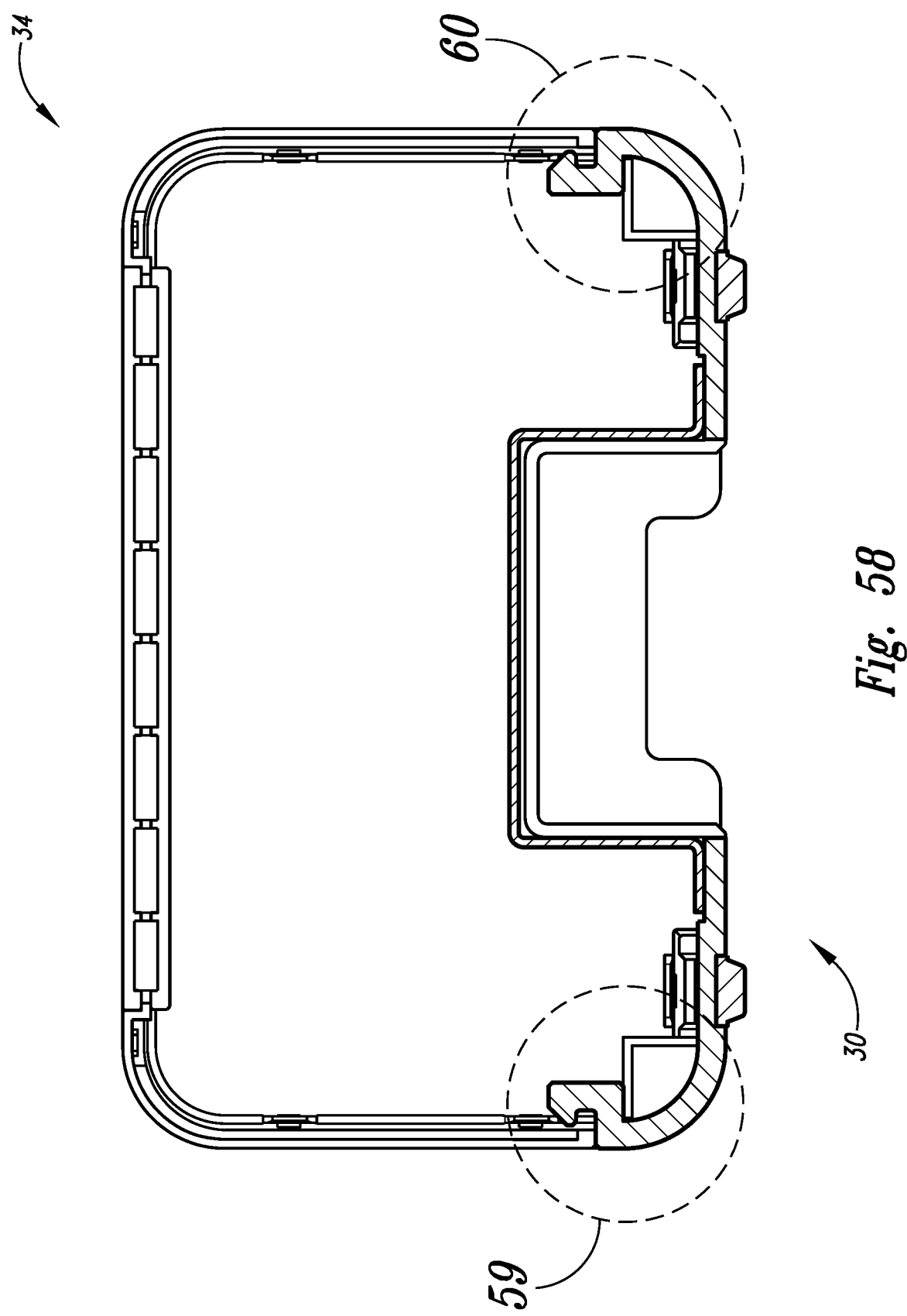
FIG. 58 is a cross-sectional internal elevational view of the rear end plate of FIG. 40 taken along the 58-58 cutline of FIG. 57.

Turning to FIG. 58, depicted therein is a cross-sectional internal elevational view of front end plate 36 taken along the 58-58 cutline of FIG. 57.

Figure 59:
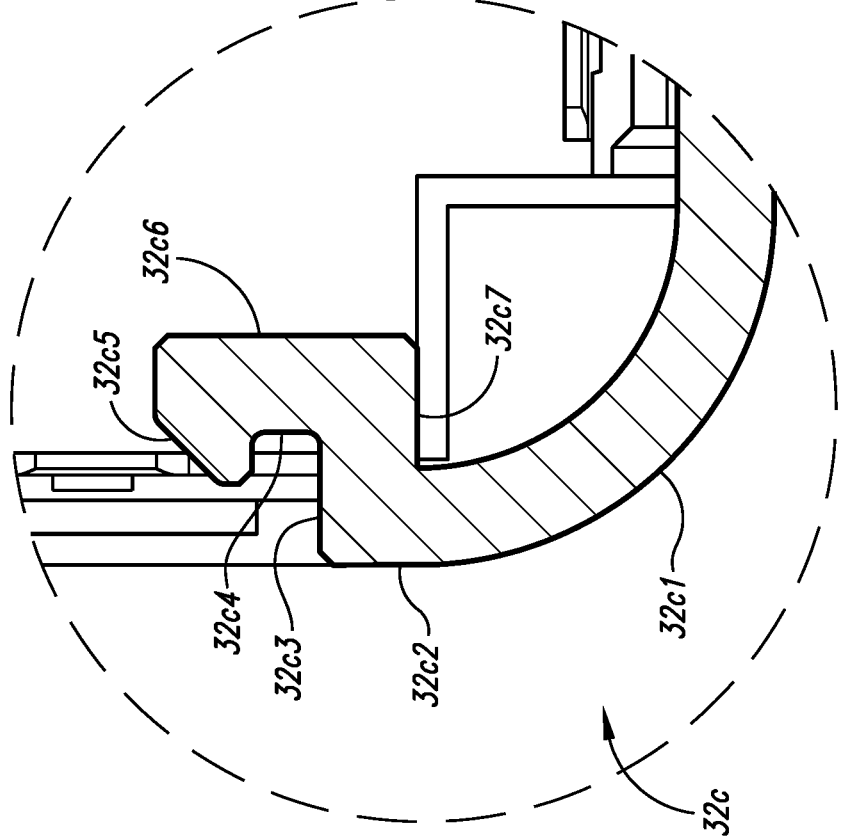
FIG. 59 is an enlarged cross-sectional internal elevational view of rear end plate of FIG. 40 taken along the dashed circle labeled "59" of FIG. 58.

Turning to FIG. 59, depicted therein is an enlarged cross-sectional internal elevational view of rear end plate 34 taken along the dashed circle labeled "59" of FIG. 58.

Figure 60:
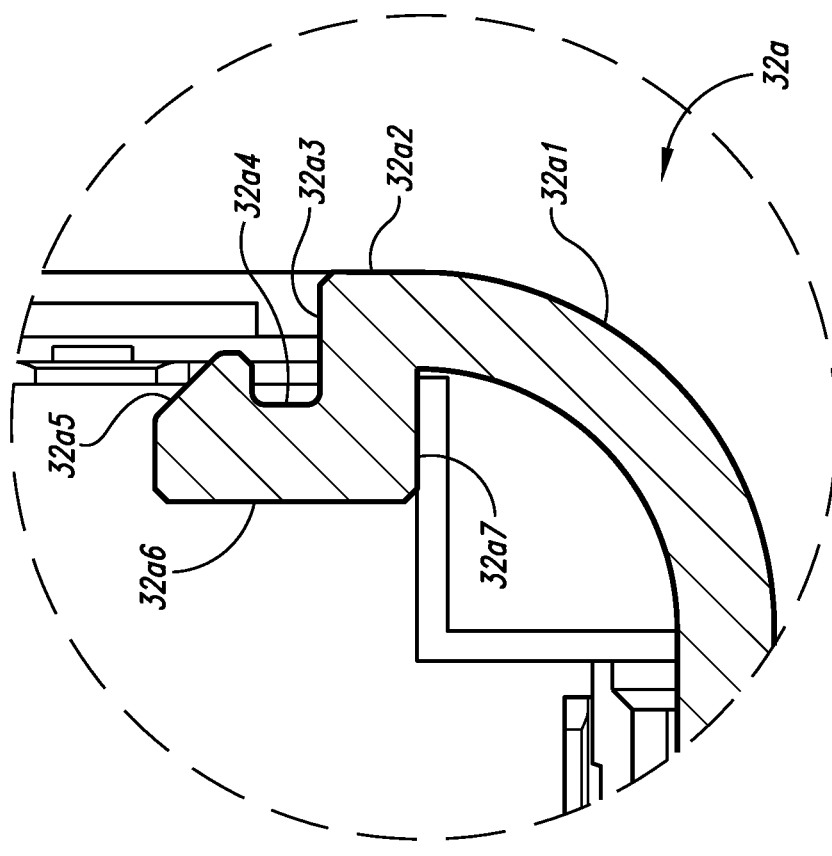
FIG. 60 is an enlarged cross-sectional internal elevational view of rear end plate of FIG. 40 taken along the dashed circle labeled "60" of FIG. 58.

Turning to FIG. 60, depicted therein is an enlarged cross-sectional internal elevational view of front end plate 36 taken along the dashed circle labeled "60" of FIG. 58.

Figure 61:
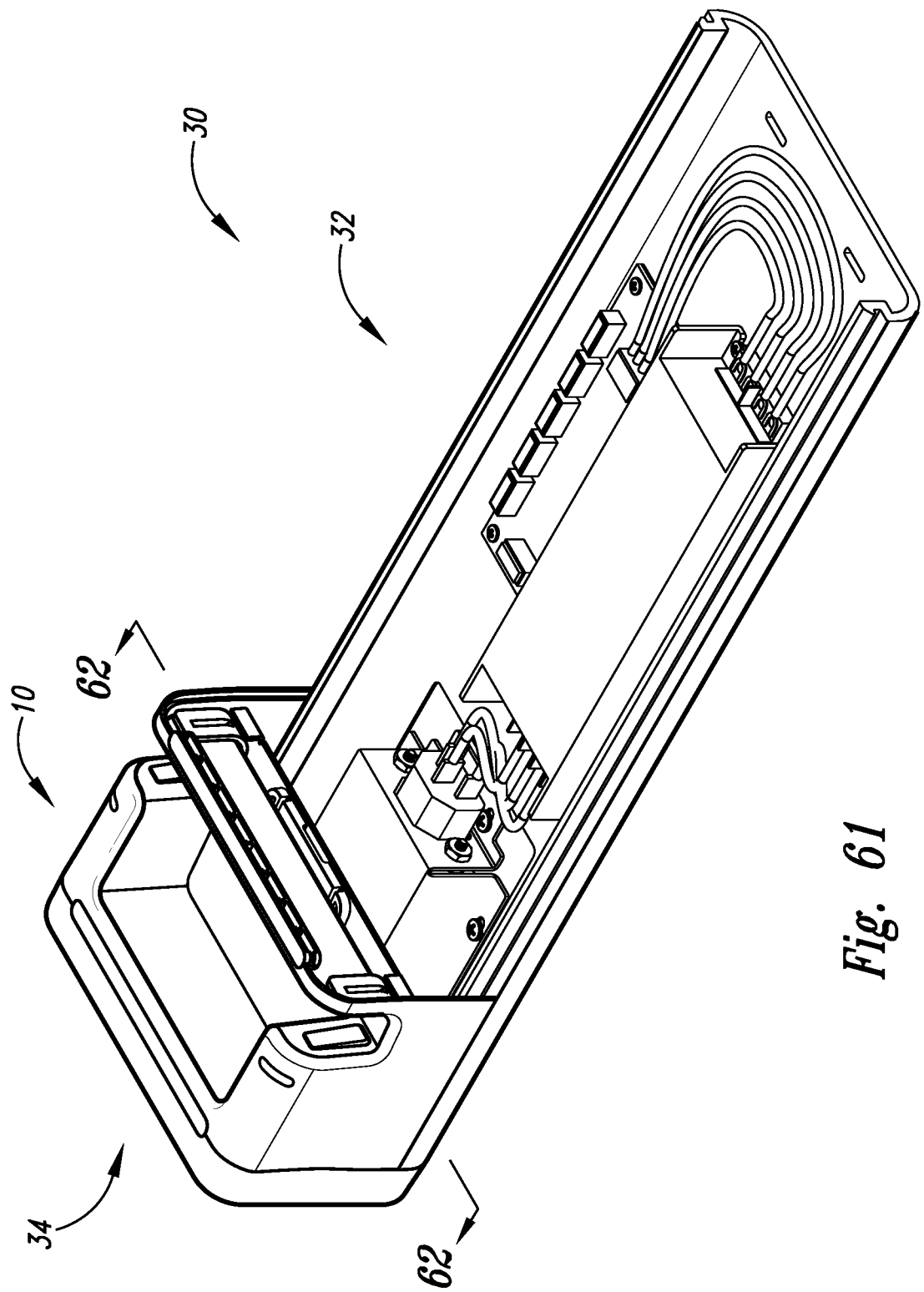
FIG. 61 is a left top front perspective view of a partial portion of the housing of FIG. 16 coupled with the holder assembly of FIG. 1.

Turning to FIG. 61, depicted therein is a left top front perspective view of a partial portion of housing assembly 30 coupled with housing assembly 30.

Figure 62:
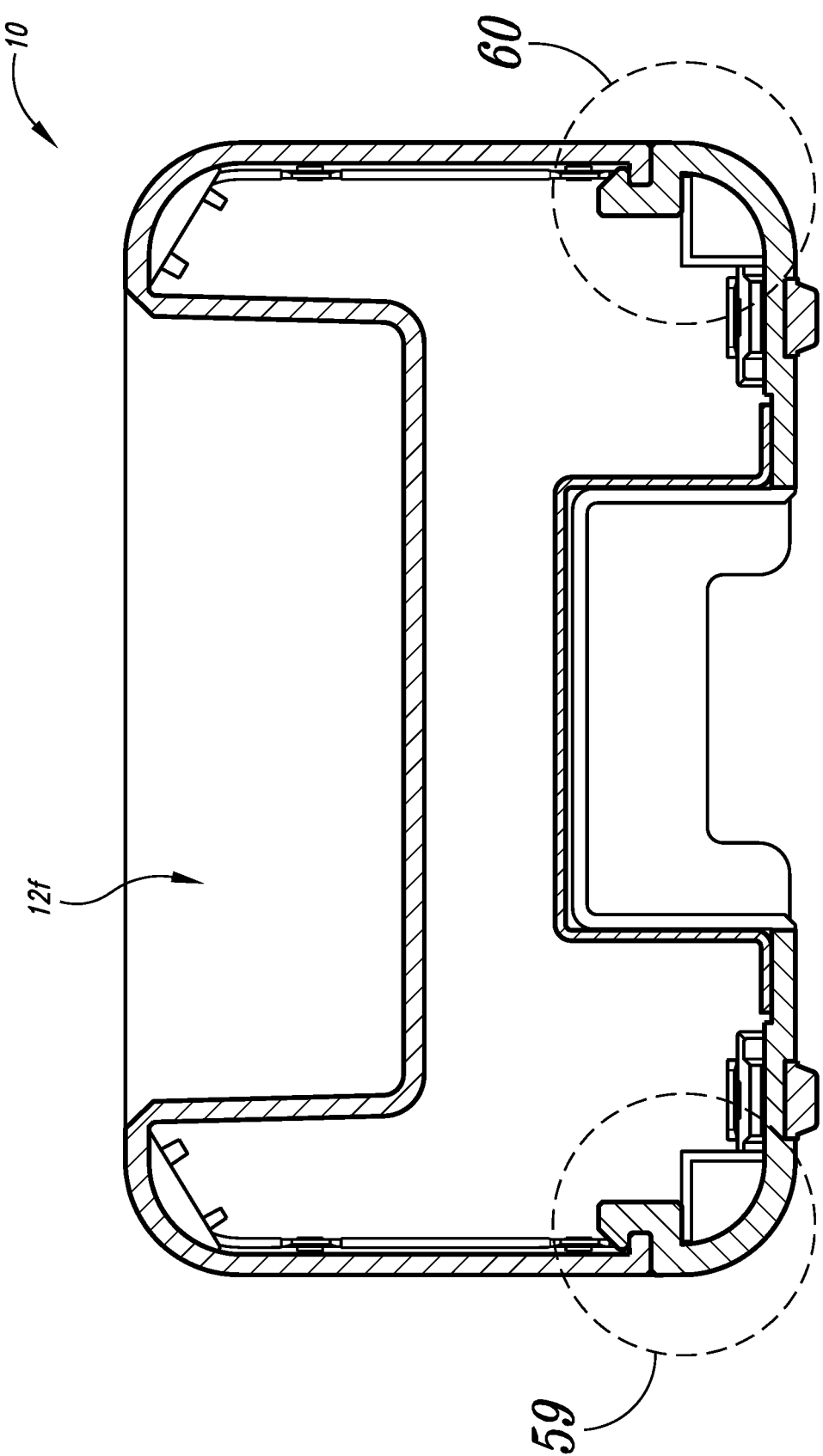
FIG. 62 is a cross-sectional internal elevational view of the rear end plate of FIG. 40 taken along the 62-62 cutline of FIG. 61.

Turning to FIG. 62, depicted therein is a cross-sectional internal elevational view of rear end plate 34 taken along the 61-61 cutline of FIG. 61.

Figure 63:
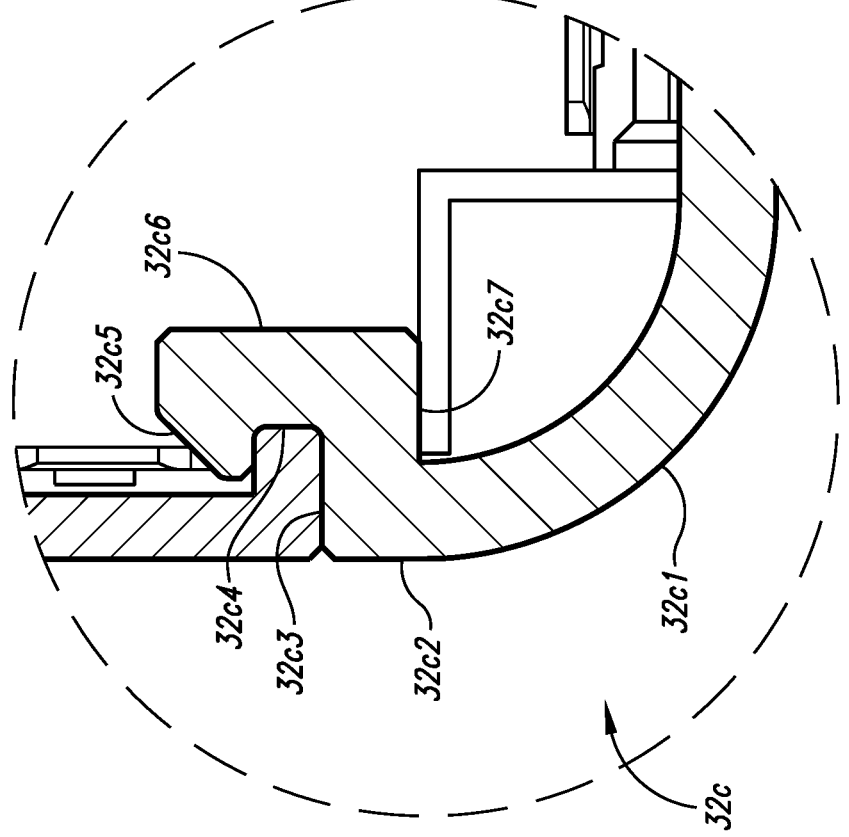
FIG. 63 is an enlarged cross-sectional internal elevational view of rear end plate of FIG. 40 taken along the dashed circle labeled "63" of FIG. 62.

Turning to FIG. 63, depicted therein is an enlarged cross-sectional internal elevational view of rear end plate 34 taken along the dashed circle labeled "63" of FIG. 62.

Figure 64:
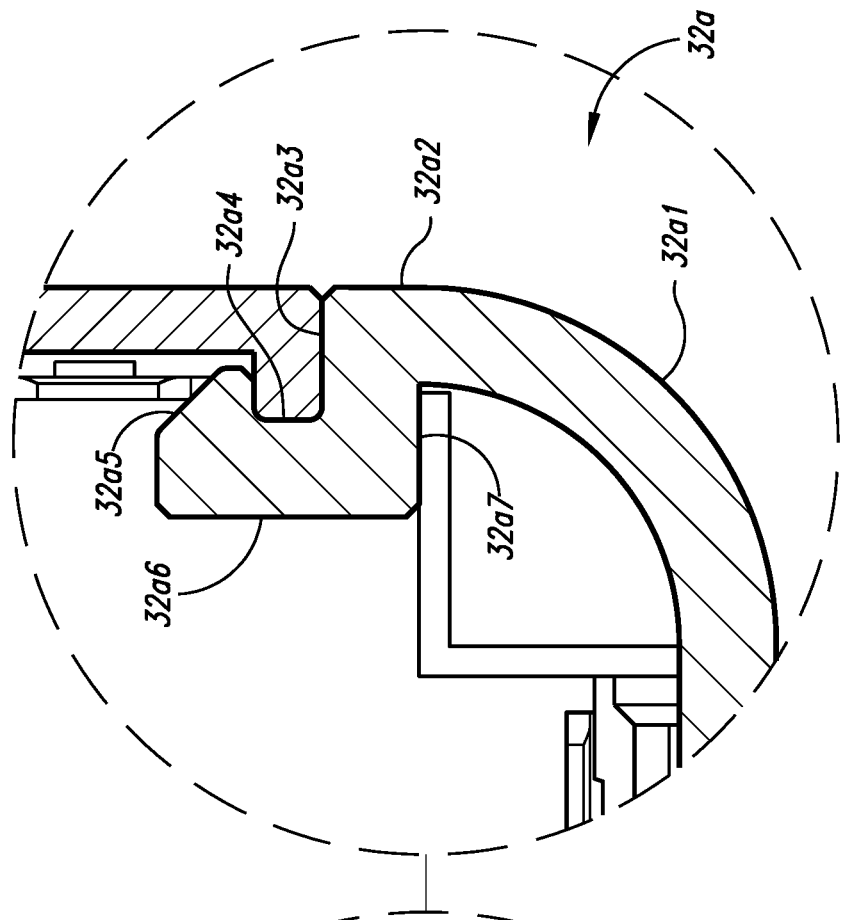
FIG. 64 is an enlarged cross-sectional internal elevational view of rear end plate of FIG. 40 taken along the dashed circle labeled "64" of FIG. 62.

Turning to FIG. 64, depicted therein is an enlarged cross-sectional internal elevational view of rear end plate 34 taken along the dashed circle labeled "64" of FIG. 62.

Figure 65:
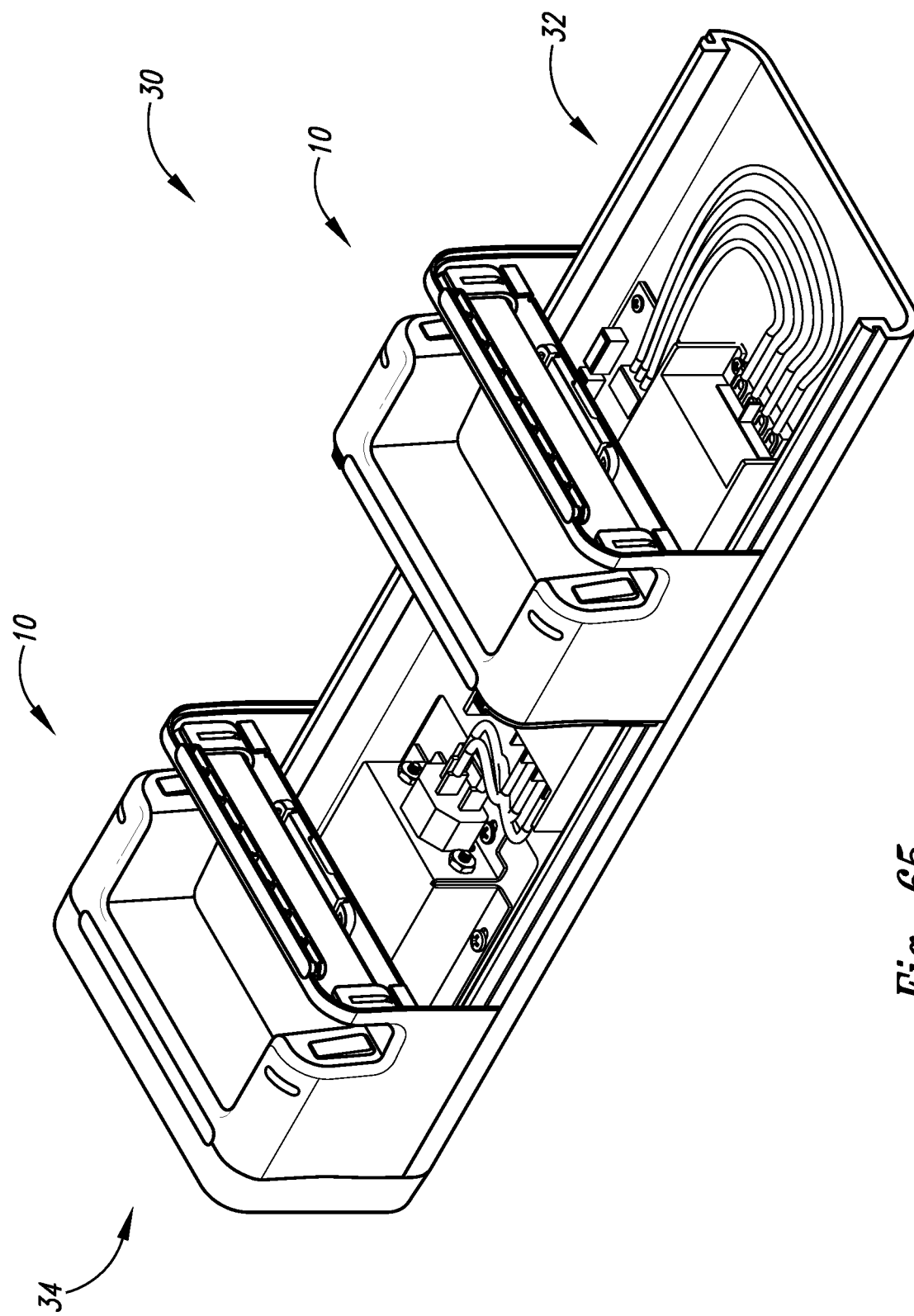
FIG. 65 is a left top front perspective view of a partial portion of the housing of FIG. 16 coupled with a plurality of the holder assembly of FIG. 1.

Turning to FIG. 65, depicted therein is a left top front perspective view of a partial portion of housing assembly 30 coupled with a plurality of the holder assembly 10.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have Alone, B alone, C alone, And B together, And C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have Alone, B alone, C alone, And B together, And C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "And B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A system for a portable electronic computing device, the system comprising:
   (I) at least one housing assembly including
      (A) an elongated base assembly with an elongated dimension, the elongated base assembly including
         (i) a first end,
         (ii) a second end,
         (iii) a first side assembly extending along the elongated dimension between the first end and the second end,
         (iv) a second side assembly extending along the elongated dimension between the first end and the second end, and
         (v) a base including an interior,
            (a) wherein the interior extends between the first and the second end, and
            (b) wherein the interior extends between the first side assembly and the second side assembly,
         wherein the first side assembly includes a first portion extending perpendicularly with respect to the interior of the base, the first portion extending along the elongated dimension of the base assembly,
         wherein the first portion of the first side assembly includes an externally facing groove extending along the longitudinal dimension of the base assembly,
         wherein the second side assembly includes a first portion extending perpendicularly with respect to the interior of the base, the first portion extending along the elongated dimension of the base assembly, and
         wherein the first portion of the second side includes an externally facing groove extending along the longitudinal dimension of the base assembly.

2. The system of claim 1
   wherein in the first side assembly includes a curvilinear portion extending from the base, and
   wherein in the second side assembly includes a curvilinear portion extending from the base.

3. The system of claim 1
   wherein the first side assembly includes a beveled edge coupled with the curvilinear portion of the first side assembly, and
   wherein in the second side assembly includes a beveled edge coupled with the curvilinear portion of the second side assembly.

4. The system of claim 1
   wherein the first side assembly includes a beveled edge coupled with the curvilinear portion of the first side assembly, and
   wherein in the second side assembly includes a beveled edge coupled with the curvilinear portion of the second side assembly.

5. The system of claim 1 wherein the at least one housing assembly further includes at least one end plate couplable with the first side assembly, the second side assembly, and the base of the elongated base assembly.

6. The system of claim 5 wherein the at least one end plate includes an interior and at least one arm extending from the interior.

7. The system of claim 6 wherein the at least one arm includes at least one barb.

8. The system of claim 7 wherein the base of the base assembly includes at least one aperture sized and positioned to receive the least one barb of the at least one end plate when the at least one end plate is coupled with the base.

9. The system of claim 5 wherein the at least one end plate includes at least a first horizontal ledge and a second horizontal ledge.

10. The system of claim 9
wherein the first horizontal ledge is sized, shaped, and positioned to couple with the first side assembly when the at least one end plate is coupled with the base assembly, and
wherein the second horizontal ledge is sized, shaped, and positioned to couple with the second side assembly when the end plate is coupled with the base assembly.

11. The system of claim 5 further including at least one clip assembly,
wherein the at least one clip assembly includes an upper portion including a first side edge and second side edge,
wherein the at least one clip assembly includes a lower portion including a first side edge and second side edge,
wherein the at least one clip assembly includes a plurality of beams extending between the upper portion and the lower portion,
wherein the plurality of beams includes a plurality of first notches and a plurality of second notches,
wherein the at least one clip assembly includes a first side and a second side,
wherein the first side of the at least one clip assembly includes the first side edge of the upper portion, the first side edge of the lower portion, and the plurality of first notches,
wherein the second side of the at least one clip assembly includes the second side edge of the upper portion, the second side edge of the lower portion, and the plurality of second notches, and
wherein the at least one end plate assembly includes a side exterior including a portion sized and shaped to couple with the first side of the least one clip assembly.

12. The system of claim 5 further including at least one container assembly,
wherein the at least one container assembly includes at least one side exterior including at least one edge portion,
wherein the at least one end plate assembly includes a side exterior including at least one groove, and
wherein the at least one edge portion of the at least one container assembly and the at least one groove portion of the at least one end plate assembly so shaped, sized, and positioned in order for the at least one edge portion of the at least one container assembly to couple with the at least one groove portion of the at least one end plate assembly.

13. The system of claim 5 further including at least one container assembly,
wherein the at least one end plate assembly includes at least one side exterior including at least one edge portion,
wherein the at least one container assembly includes a side exterior including at least one groove, and
wherein the at least one edge portion of the at least one end plate assembly and the at least one groove portion of the at least one container assembly are so shaped, sized, and positioned in order for the at least one groove portion of the at least one container assembly to couple with the at least one edge portion of the at least one end plate assembly.

14. The system of claim 1 further including at least one container assembly,
wherein in the at least one container assembly includes a first side, a second side, at least one first elongated engagement member, and at least one second elongated engagement member,
wherein the at least one first elongated engagement member is protruding from the first side,
wherein the at least one second elongated engagement member is protruding from the second side,
wherein the at least one first elongated engagement member is couplable with the externally facing groove of the first side assembly of the at least one housing assembly, and
wherein the at least one second elongated engagement member is couplable with the externally facing groove of the second side assembly of the at least one housing assembly.

15. A system for a portable electronic computing device, the system comprising:
(I) at least one housing assembly including
(A) an elongated base assembly with an elongated dimension, the elongated base assembly including
(i) a first end,
(ii) a second end,
(iii) a first side assembly extending along the elongated dimension between the first end and the second end, and
(iv) a second side assembly extending along the elongated dimension between the first end and the second end; and
(II) at least one container assembly including a first side and a second side,
wherein the first side of the at least one container assembly being couplable with at least one portion of the first side assembly of the elongated base assembly, and
wherein the second side of the at least one container assembly being couplable with at least one portion of the second side assembly of the elongated base assembly.

16. The system of claim 15
wherein the first side assembly including at least one groove portion being extended along the elongated dimension,
wherein the at least one container assembly being couplable with the at least one groove portion of the first side assembly,
wherein the second side assembly including at least one groove portion being extended along the elongated dimension, and
wherein the at least one container assembly being couplable with the at least one groove portion of the second side assembly.

17. The system of claim 15
wherein the first side of the at least one container assembly including at least one elongated engagement member being couplable with at least one portion of the first side assembly of the elongated base assembly, and
wherein the second side of the at least one container assembly including at least one elongated engagement member being couplable with at least one portion of the second side assembly of the elongated base assembly.

* * * * *